US007308146B2

(12) United States Patent
Becker et al.

(10) Patent No.: US 7,308,146 B2
(45) Date of Patent: Dec. 11, 2007

(54) DIGITAL VIDEO COMPRESSION

(75) Inventors: Axel Becker, Cammeray (AU); Stephen James Hardy, Leichhardt (AU); David Dominique M Poulouin, Saint Donan (FR); James Philip Andrew, Waverton (AU); Andrew Peter Bradley, North Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 794 days.

(21) Appl. No.: 10/673,862

(22) Filed: Sep. 30, 2003

(65) Prior Publication Data

US 2004/0146205 A1   Jul. 29, 2004

(30) Foreign Application Priority Data

| Sep. 30, 2002 | (AU) | ............................. 2002951802 |
| Sep. 30, 2002 | (AU) | ............................. 2002951803 |
| Sep. 30, 2002 | (AU) | ............................. 2002951804 |
| Sep. 30, 2002 | (AU) | ............................. 2002951805 |

(51) Int. Cl.
     *G06K 9/36* (2006.01)
(52) U.S. Cl. ...................... 382/233; 382/248; 382/275; 375/240.19; 375/240.24; 375/240.25
(58) Field of Classification Search ..................... None
    See application file for complete search history.

(56) References Cited

U.S. PATENT DOCUMENTS

| 5,790,705 | A  | * | 8/1998 | Anderson et al. ........... 382/244 |
| 6,246,798 | B1 |   | 6/2001 | Andrew et al. .............. 382/240 |
| 6,259,819 | B1 |   | 7/2001 | Andrew et al. .............. 382/248 |
| 6,263,110 | B1 |   | 7/2001 | Andrew et al. .............. 382/232 |
| 6,266,414 | B1 |   | 7/2001 | Bradley et al. .............. 380/240 |
| 6,351,568 | B1 |   | 2/2002 | Andrew ....................... 382/239 |
| 6,389,074 | B1 |   | 5/2002 | Andrew ................. 375/240.05 |
| 6,570,510 | B2 |   | 5/2003 | Chen et al. ..................... 341/51 |
| 6,606,416 | B1 |   | 8/2003 | Yip et al. ..................... 382/240 |
| 6,683,991 | B1 |   | 1/2004 | Andrew et al. .............. 382/240 |

(Continued)

OTHER PUBLICATIONS

Tubman, "High performance Scalable Image Compression with EBCOT" Proceedings of the 1999 International Confrence on Image processing vol. 3 p. 344-348, 1999.*

(Continued)

*Primary Examiner*—Samir Ahmed
*Assistant Examiner*—Sean Motsinger
(74) *Attorney, Agent, or Firm*—Fitzpatrick, Cella, Harper & Scinto

(57) ABSTRACT

A method of compressing a current image of a sequence of images is disclosed. Firstly, the current image is transformed with a predetermined transform such as the DWT to provide a set of transform coefficients (step 2202). The method then retrieves (step 2303), for at least one transform coefficient of a current image, a predetermined number of bits, preferably two, of a corresponding transform coefficient of a previously compressed image of the sequence. The corresponding transform coefficient is truncated at a truncation bitplane and the retrieved bits are the least significant bits of the truncated corresponding transform coefficient. The transform coefficient of the current image is set to a new value that is a function of the retrieved bits (step 2306) and bits of the transform coefficients of the current image are stored for use in compressing one or more subsequent images of the sequence (step 2208).

31 Claims, 23 Drawing Sheets

U.S. PATENT DOCUMENTS

| | | | |
|---|---|---|---|
| 6,778,709 B1* | 8/2004 | Taubman | 382/240 |
| 6,898,323 B2* | 5/2005 | Schwartz et al. | 382/240 |
| 2001/0017887 A1* | 8/2001 | Furukawa et al. | 375/240.03 |
| 2002/0051583 A1 | 5/2002 | Brown et al. | 382/299 |
| 2002/0131084 A1 | 9/2002 | Andrew et al. | 358/1.16 |
| 2002/0168112 A1 | 11/2002 | Schwartz et al. | 382/240 |
| 2003/0031370 A1 | 2/2003 | Andrew | 382/233 |
| 2003/0063809 A1 | 4/2003 | Andrew | 382/240 |
| 2003/0113027 A1 | 6/2003 | Chan et al. | 382/240 |
| 2004/0047511 A1* | 3/2004 | Tzannes et al. | 382/232 |

OTHER PUBLICATIONS

Jacquin, et al. "Content-Adaptive Postfiltering for Very Low Bit Rate Video", (DCC '97) Proceedings of the 1997 Data Compression Conference (DCC '97), p. 111-120, IEEE, 1997.

Shepard, et al. "Harmony: Static Noise Analysis of Deep Submicron Digital Integrated Circuits", IEEE Transactions on Computer-Aided Design of Integrated Circuits and Systems, vol. 18, No. 8, p. 1132-1150, Aug. 1999.

Segall, et al., "Pre-and Post-Processing Algorithms for Compressed Video Enhancement", Proceedings of the Asilomar Conference on Systems, Signals and Computer, 5 pages, Pacific Grove, CA, Oct. 29-Nov. 2000.

Fukuhara, et al., "Results of MJ2 Core Experiment No. 1 (Visual Weighting)", Motion JPEG2000 Document, ISO/IEC JTCI/SC29 WG1 N1689, p. 1-4, May 2000.

D. Taubman, "High Performance Scalable Image Compression with EBCOT", Proceedings of the 1999 International Conference on Image Processing, 1999 (ICIP 99), vol. 3, pp. 344-348, 1999.

* cited by examiner

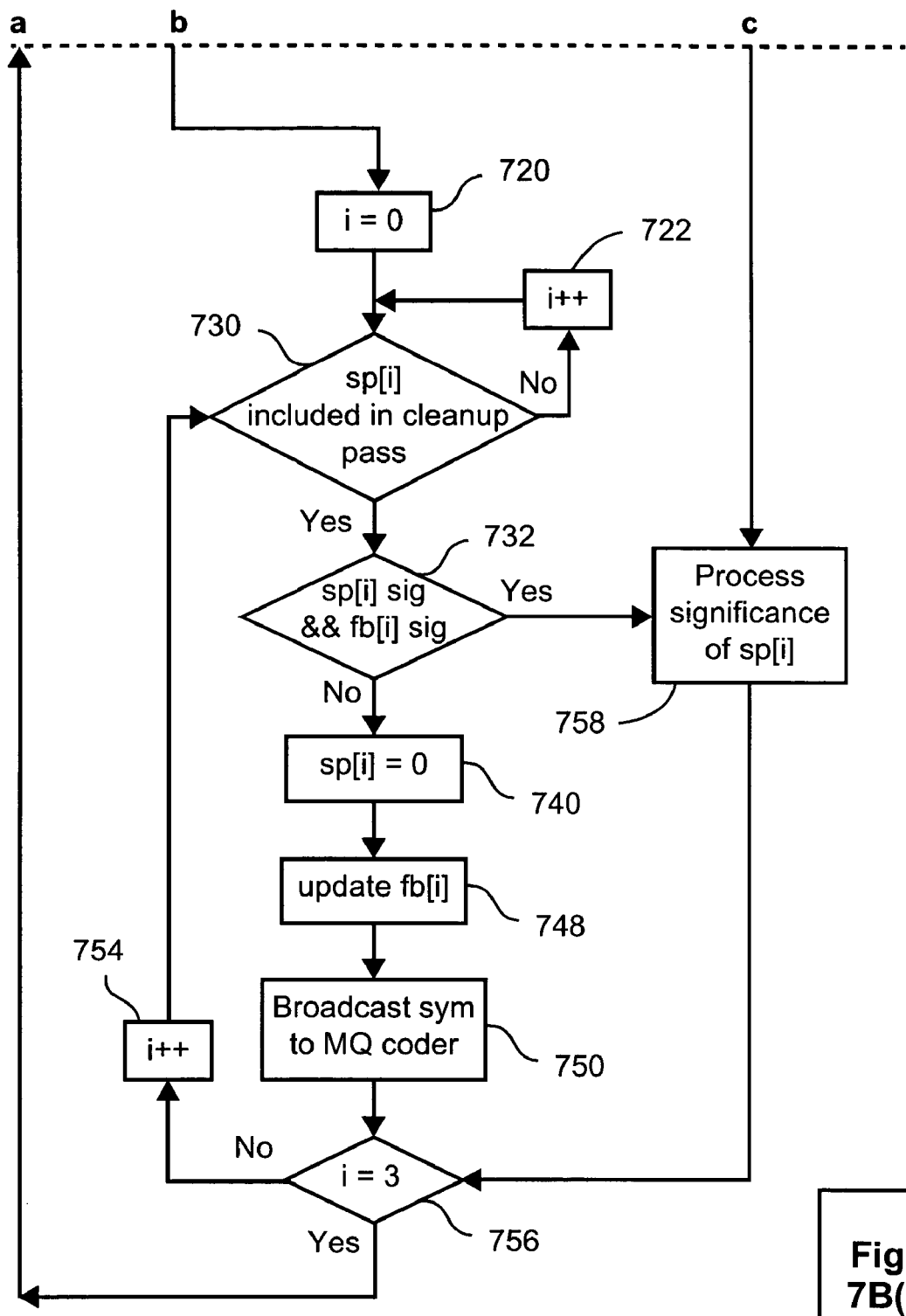
Fig. 7B(ii)

DIGITAL VIDEO COMPRESSION

FIELD OF THE INVENTION

The present invention relates to the field of digital video compression and in particular, to a method of encoding a sequence of video frames. The present invention also relates to an apparatus and a computer program for encoding a sequence of video frames.

BACKGROUND

Digital images and videos are stored and used on many devices, including general-purpose computers, digital still cameras and digital video cameras. Digital images and videos are typically stored in compressed form on devices in order to reduce storage, memory and bandwidth costs. A widely used standard for image compression is the "Joint Photographic Experts Group" or JPEG standard. An emerging new standard for image compression is the JPEG2000 standard. Both JPEG and JPEG2000 are nominally still image compression standards. While JPEG is predominantly used to compress a still image, there are various video encoding formats known loosely as "Motion JPEG". Motion JPEG encodes each frame of a video as a still image using JPEG, and provides a compressed video stream format for wrapping all the encoded frames of a video into a Motion JPEG encoded stream. However, Motion JPEG was never formally standardized. Currently, the JPEG2000 standard provides for a still image compression mode, which is described in the JPEG 2000 Final Committee Draft Version 1.0, 16 Mar. 2000, ISO/IEC FCD 15444-1 (Part I), and the JPEG 2000 Final Committee Draft, 7 Dec. 2000, ISO/IEC FCD 15444-2 (Part II) publications. It is also proposed that the JPEG2000 standard provide for a video encoding mode known as Motion JPEG2000, which is described in the publication Motion JPEG 2000 Final Committee Draft 1.0, 14 Mar. 2001 ISO/IEC 15444:3 (Part III) 2000. Motion JPEG2000 is analogous to Motion JPEG in that single frames of a video are encoded with JPEG2000 (in a still image mode) and the resulting compressed frames wrapped into a compressed video stream (eg. file format). While there are other video encoding formats, such as the MPEG family, that potentially offer better compression than the JPEG motion family (Motion JPEG or Motion JPEG2000), the JPEG motion family offers several different advantages. In addition Motion JPEG2000 offers a suite of features inherited from JPEG2000 in still image mode.

For the purpose of this description the term "JPEG2000" will be used to refer to the JPEG2000 standard in a still image mode—that is for compressing/decompressing a still image (one frame of a video), and "Motion JPEG2000" (MJ2K) when referring to JPEG2000 standard in a video compressing/decompressing mode.

An important decision to be made when compressing images or videos is how many bytes are available for the compressed images and videos. The higher the compression rate the lower the number of bytes required for storage and transmission. The trade-off is that quality of the resulting decompressed image or video generally decreases as the compression rate increases. One goal is to maximise the compression while maintaining an acceptable level of quality or alternatively maximising the image or video quality within a constant number of bytes. A technique recommended by the JPEG2000 standard to maximise image quality at a given rate is to use a rate control strategy called the post-coding rate distortion optimisation (PCRD-opt). It is employed when the actual coding itself is complete but the available byte budget is exceeded. PCRD-opt is then used to trim back (i.e. to discard part of the compressed data) the compressed data to fit the desired target bit-rate at for example, the highest achievable image quality. One problem with the compression scheme utilising PCRD-opt is that often code-blocks are substantially overcoded. Such overcoding slows the compression scheme. Furthermore, overcoding increases the memory required for buffering the intermediate compressed data.

In addition to rate control there are various important compression system parameters affecting quality. For example, in JPEG and JPEG2000 a set of subband or coefficient weights is used to emphasize the importance of low frequencies as opposed to high frequencies commensurate with the response of the human visual system. In JPEG2000 these are typically referred to as "human visual weights".

Compressing a video sequence introduces further distortions in addition to the distortion that arises when encoding a single frame. For example, when MJ2K videos are decoded and displayed, distortion can appear as a type of rapidly moving noise, called flicker. Often this flicker is not readily apparent in each decompressed frame, and only becomes apparent when the frames are displayed in rapid succession, as when displaying the decoded video. Various sets of human visual weights have been proposed as means of ameliorating this flicker. These visual weightings are generally derived according to the human contrast sensitivity function (CSF). Visual weighting typically consists of a fixed weighting for the luminance and chrominance components according to the CSF. However, the improvement from such specific weights for reducing flicker is not substantial, and further improvement remains.

Other methods have been proposed to reduce flicker which make use of previous video frames in encoding a current video frame. In many applications it is too disadvantageous to store an entire video frame.

SUMMARY

It is an object of the present invention to substantially overcome, or at least ameliorate, one or more disadvantages of existing arrangements.

According to a first aspect of the invention there is provided a method of compressing a current image of a sequence of images, the method comprising the steps of:

(a) transforming the current image with a predetermined transform to provide a set of transform coefficients;

(b) retrieving, for at least one transform coefficient of the current image, one or more, but not all, bits of a corresponding transform coefficient of a previously compressed image of the sequence, wherein the corresponding transform coefficient is truncated at a truncation bitplane and the retrieved bits comprise the least significant bit of the truncated corresponding transform coefficient;

(c) setting the at least one transform coefficient of the current image to a new value that is a function of the retrieved bits;

(d) storing one or more, but not all, bits of the at least one transform coefficient for use in compressing one or more subsequent images of the sequence; and (e) coding the transform coefficients of the current image to provide a compressed bitstream of the current image.

According to a second aspect of the invention there is provided method of decompressing a compressed bitstream representative of a sequence of images, wherein the method comprises the steps of:

decoding the compressed bitstream to provide transform coefficients of a current image in the sequence;

retrieving, for at least one transform coefficient of the current image, one or more, but not all, bits of a corresponding transform coefficient of a previously decompressed image in the sequence;

setting the at least one transform coefficient of the current image to a new value that is a function of the retrieved bits; and inverse transforming the current image with a predetermined inverse transform.

According to a further aspect of the invention there is provided an apparatus for compressing a current image of a sequence of images, comprising:

(a) means adapted to transform the current image with a predetermined transform to provide a set of transform coefficients;

(b) means adapted to retrieve, for at least one transform coefficient of the current image, one or more, but not all, bits of a corresponding transform coefficient of a previously compressed image of the sequence, wherein the corresponding transform coefficient is truncated at a truncation bitplane and the retrieved bits comprise the least significant bit of the truncated corresponding transform coefficient;

(c) means adapted to set the at least one transform coefficient of the current image to a new value that is a function of the retrieved bits;

(d) means adapted to store one or more, but not all, bits of the at least one transform coefficient for use in compressing one or more subsequent images of the sequence; and (e) means adapted to code the transform coefficients of the current image to provide a compressed bitstream of the current image.

According to a further aspect of the invention there is provided a computer program comprising machine-readable program code for controlling the operation of a data processing apparatus on which the program code executes to compress a current image of a sequence of images, the program comprising:

(a) code for transforming the current image with a predetermined transform to provide a set of transform coefficients;

(b) code for retrieving, for at least one transform coefficient of the current image, a predetermined number of bits of a corresponding transform coefficient of a previously compressed image of the sequence, wherein the corresponding transform coefficient is truncated at a truncation bitplane and the retrieved bits are the least significant bits of the truncated corresponding transform coefficient;

(c) code for setting the at least one transform coefficient of the current image to a new value that is a function of the retrieved bits;

(d) code for storing the predetermined number of bits of a subset of the transform coefficients of the current image for use in compressing one or more subsequent images of the sequence, the subset including the at least one transform coefficient; and (e) code for encoding the transform coefficients of the current image to provide a compressed bitstream of the current image.

According to a further aspect of the invention there is provided computer program product comprising machine-readable program code recorded on a machine-readable recording medium, for controlling the operation of a data processing apparatus on which the program code executes to perform a method of compressing a current image of a sequence of images, the method comprising the steps of:

(a) transforming the current image with a predetermined transform to provide a set of transform coefficients;

(b) retrieving, for at least one transform coefficient of the current image, one or more, but not all, bits of a corresponding transform coefficient of a previously compressed image of the sequence, wherein the corresponding transform coefficient is truncated at a truncation bitplane and the retrieved bits comprise the least significant bit of the truncated corresponding transform coefficient;

(c) setting the at least one transform coefficient of the current image to a new value that is a function of the retrieved bits;

(d) storing one or more, but not all, bits of the at least one transform coefficient for use in compressing one or more subsequent images of the sequence; and (e) coding the transform coefficients of the current image to provide a compressed bitstream of the current image.

Other aspects of the invention are also disclosed.

BRIEF DESCRIPTION OF THE DRAWINGS

Some aspects of the prior art and a number of arrangements of the present invention will now be described with reference to the drawings, in which.

DETAILED DESCRIPTION INCLUDING BEST MODE

Figure 1:
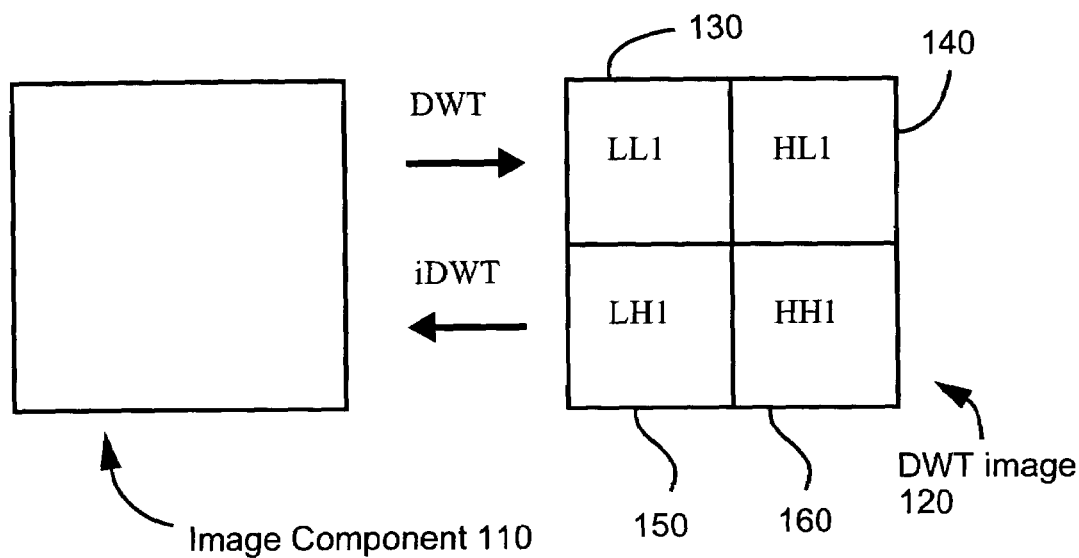
FIG. 1 illustrates the transformation of an original image component into a corresponding single level DWT image and into a two level DWT image according to the prior art JPEG2000 standard.
Figure 1:
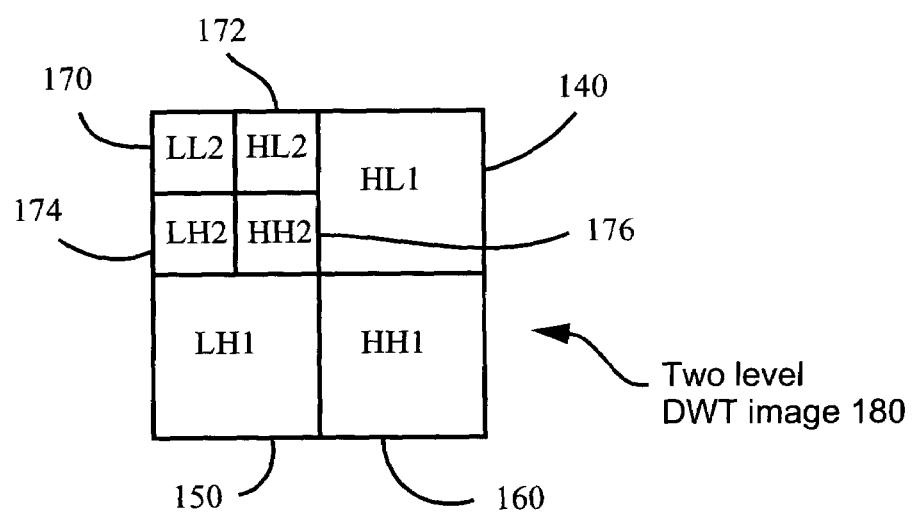

Where reference is made in any one or more of the accompanying drawings to steps and/or features, which have the same reference numerals, those steps and/or features have for the purposes of this description the same function(s) or operation(s), unless the contrary intention appears.

The principles of the arrangements described herein have general applicability to encoding a sequence of video frames. However, for ease of explanation, the arrangements are described with reference to Motion JPEG2000. However, it is not intended that the present invention be limited to the described arrangements. For example, the invention may have application to a number of intra-frame video compression methods based on wavelet encoding.

1.0 Overview of JPEG2000

Before describing the preferred implementations of the invention, a brief review of JPEG2000 will be first undertaken in order to assist in the understanding of the invention. In particular the review will concentrate on the parts of JPEG2000 most relevant to the present invention. Furthermore, for the purposes of the description of the arrangements of the invention, the terminology used herein is the same as that described in the aforementioned JPEG2000 (part 1, part 2, and part 3) publications, unless the contrary intention appears.

The encoding of a JPEG2000 image is summarised as follows. An input image is optionally level shifted and transformed with a component transform. Thus for example an input RGB colour space image can be transformed to a YCbCr colour space image. Each component of the (subsequent) image is transformed independently with a discrete wavelet transform. The wavelet transform coefficients are quantized to integer values and tiled into code-blocks. Each code-block is encoded in bit-planes, or fractions thereof, down to some minimum fractional bit-plane with an arithmetic coder. The encoded code-blocks are then grouped along with header information into a JPEG2000 codestream. A JPEG2000 image is decoded by performing the inverse of each of these steps, as far as is possible. Each of the following sections describes some of these steps in a bit more detail.

1.1 The Discrete Wavelet Transform and Multi-resolution Decoding

A single level discrete wavelet transform (DWT) of an image component is illustrated in FIG. 1. The image component 110 is decomposed into 4 subbands, LL1 130, HL1 140, LH1 150 and HH1 160, which form a single level DWT image 120. The DWT gives a multi-resolution description of an image. The LL1 subband 130 represents the image component at a reduced resolution. In particular the image is represented at a size with nominally half as many pixels per row, and nominally half as many pixels per column, as the original image.

A single level inverse DWT can be performed on the DWT image 120 (the LL1, HL1, LH1 and HH1 subbands) to give the original image 110. Thus the DWT image 120 implicitly represents the image at two resolutions: namely the original image, referred to as resolution 1, and the LL1 subband, referred to as resolution 0.

Another single level DWT can be performed on the LL1 subband 130 analysing the LL1 subband into four subbands, LL2 170, HL2 172, LH2 174 and HH2 176, and giving a two-level DWT image 180, comprising the subbands LL2, HL2, LH2, HH2, HL1, LH1 and HH1. The LL2 subband represents the original image at a further lower resolution (and also represents the LL1 subband at a lower resolution). In particular the image is represented at a size with nominally a quarter as many pixels per row, and nominally a quarter as many pixels per column, as the original image. The subbands HL1, LH1 and HH1 are referred to as level 1 subbands. The subbands LL2, HL2, LH2 and HH2 are referred to as level 2 subbands. For convenience the original image may be referred to as the LL0 subband.

Higher level DWT images, and further reduced resolution representations of the image component, are obtained by further applications of the single level DWT on ensuing LL subbands. An S level DWT comprises a LLS subband and subbands HLS, LHS, HHS, HL(S-1), LH(S-1), HH(S-1), . . . , HL1, LH1, and HH1. The number after the two-letter subband denomination refers to the DWT level. Thus HL(S-1) refers to the HL subband at level S-1. An S level DWT image implicitly represents the image at S+1 resolutions. These resolutions are referred to as resolution 0, resolution 1, . . . , resolution S. Resolution 0 refers to the LLS subband, resolution 1 to the LL(S-1) subband, and so on. Thus resolution S refers to the original image.

JPEG2000 uses a DWT on each image component. Each subband is coded independently. Each subband can be decoded from the compressed image code-stream independently. For example, for a single level DWT image the LL1 subband (or resolution 0 of the image) can be decoded and displayed without decoding the other level 1 subbands, HL1, LH1 and HH1. For higher level DWT images other resolution versions of the image can also be decoded and displayed by reconstructing the various LL subbands at each stage of the DWT analysis. For example, for a 3 level DWT image, the image can be displayed at resolution 1 by reconstructing the LL2 subband from the LL3, HL3, LH3 and HH3 subbands.

1.2 Code-Blocks, Sub-Passes and Layers

Figure 2:
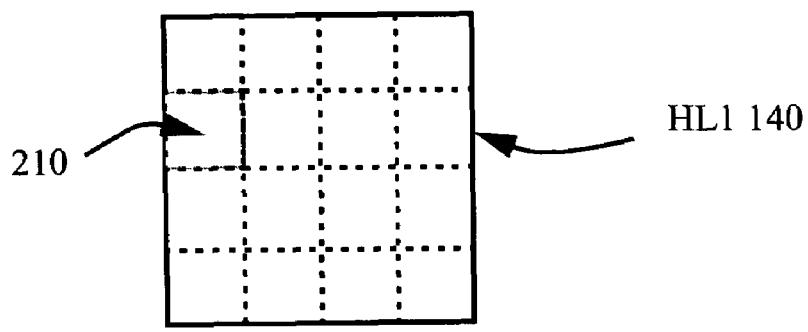
FIG. 2 illustrates the tiling of a subband into code-blocks according to the prior art JPEG2000 standard.

Each subband of JPEG2000 is tiled into blocks, referred to as code-blocks. FIG. 2 illustrates a tiling of the HL1 subband 140 into 16 blocks, with one block indicated by shading 210. Each code-block is quantized giving an integer representation of the code-block coefficients. Each code-block is then (entropy) coded substantially independently. Each code-block is coded in order from its most significant bit-plane to its least significant bit-plane, with nominally three coding passes, referred to as sub-passes, per bit-plane.

Figure 3:
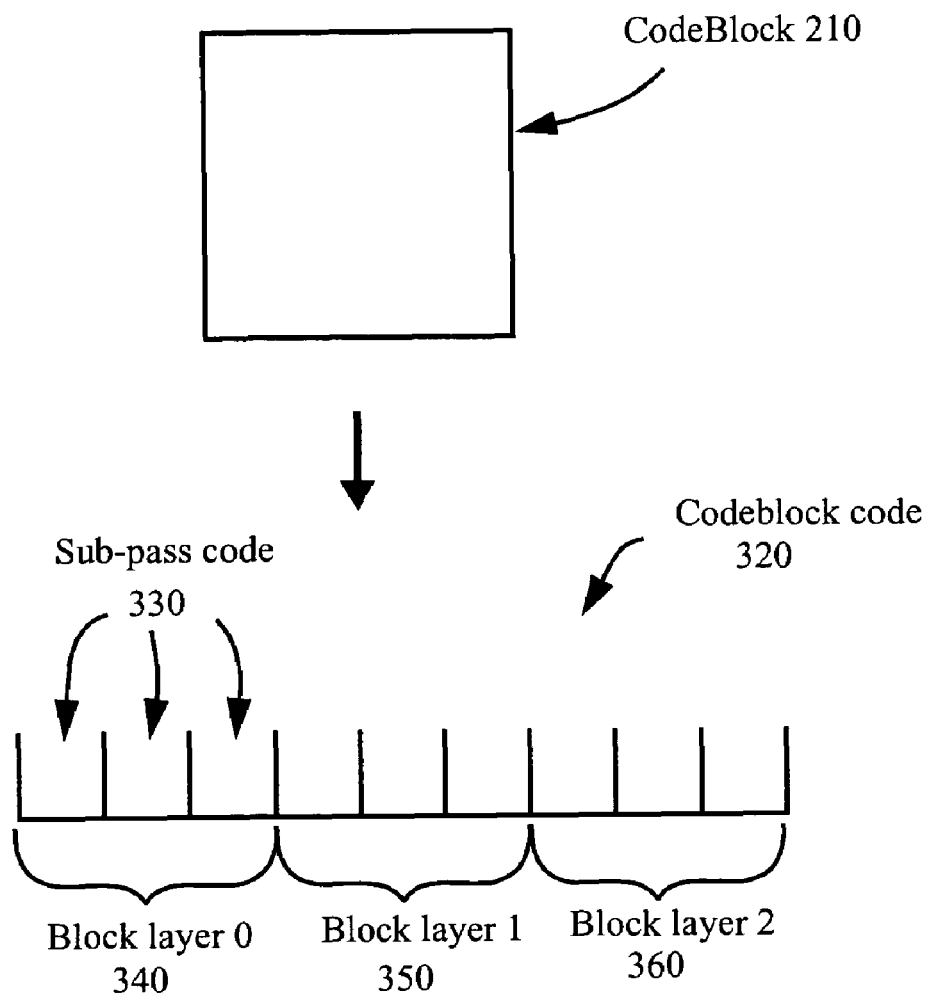
FIG. 3 illustrates the coding of a code block into block layers according to the prior art JPEG2000 standard.

FIG. 3 illustrates the coding of such a code-block. A code-block 210 is coded into a compressed code-block which is sometimes simply referred to as a code-block 320. The code-block comprises a sequence of sub-pass code segments 330. The code-block is thus an ordered sequence of sub-pass code segments (or simply sub-passes). A code-block can be partitioned into block layers. For ease of explanation the term block layer is used herein to refer to those sub-passes of a code-block, which contribute to a corresponding quality layer. Each quality layer successively improves the image quality, so that a decoder shall be able to decode the code-block contributions contained in each layer in sequence. Thus a quality layer can be said to be a collection of corresponding block layers at all resolutions. FIG. 3 shows an example of a code-block partitioned into three layers: namely block layer 0, 340, block layer 1, 350, and block layer 2, 360. Each block layer contains a non-negative number of sub-passes. The first layer comprises the first number of sub-passes, the second layer, a next number of sub-passes and so on. It is important to note that a block layer of a code-block can be empty.

A decoder reconstructs the code-block from the block code, by undoing the entropy encoding. A lower quality representation of the code-block can be obtained by decoding only a first number of sub-passes. For example, in FIG. 3 the code-block could be reconstructed from layer 0 only, or layers 0 and 1. Thus truncating a block code at some sub-pass boundary represents the code-block at a lower quality. Truncating a block in this way is a form of quantization. By coding bit-planes an embedded form of quantization of the code-block is effected. For each extra bit-plane included in the block code the effective quantization step size decreases by a factor of two.

A layer of the image is constructed from a collection of corresponding block layers. That is layer 0 comprises block layer 0 for each code-block in the DWT image, layer 1 comprises block layer 1 for each code-block and so on. A block layer can be empty, in that no sub-passes are contained within the block layer. An image can be decoded by decoding layer 0 only (and performing the appropriate inverse DWT, component transform etc). Decoding layer 0, means decoding block layer 0 for each code-block. Thus each code-block, and hence the image, is decoded at a lower quality that is represented in the compressed image code-stream.

1.3 Rate Distortion Optimisation

As described above each code-block is coded in sub-passes. The rate for a given sub-pass is the number of bits used to encode all sub-passes up to and including the given sub-pass (for the given code-block). The distortion is a model of the quality degradation associated with the block (image) as compared to the original block (image) when only the sub-passes up to and including the given sub-pass are decoded. In general the distortion will decrease (equivalently the quality will increase) for each further sub-pass, as more information is encoded: that is the precision of the code-block is increased from the perspective of a decoder. Thus associated with each sub-pass is a rate distortion point. Each code-block then has a set of rate distortion points that comprise the pair (rate, distortion) for each sub-pass. The set of distortion points characterize the efficiency of the compression algorithm.

For block n, let the ordered finite number of rate points be denoted by $r_0^n, r_1^n, r_2^n, \ldots, r_N^n$ and associated distortion points by $d_0^n, d_1^n, d_2^n, \ldots, d_N^n$. By terminating the code for block n at the sub-pass $i_n$, that is keeping only the first $i_n$ sub-passes for block n, the total rate for the coded image (viz summing all the code blocks) is given by $$R_{total} = \sum_n r_{i_n}^n, \qquad (1)$$

while the total distortion can be modelled by, $$D_{total} = \sum_n d_{i_n}^n. \qquad (2)$$

Note that the rate distortion point $(r_0^n, d_0^n)$ refers to the point where no sub-passes are included for the block. A truncation point for a block refers to the sub-pass termination point: that is the last sub-pass maintained in the block code. One goal is to minimise the distortion for a given rate. That is to find, $$\min_{i_n} D_{total} \text{ such that } R_{total} \leq R_{desired} \qquad (3)$$

This can be achieved using a method of Lagrange multipliers. That is, find $\lambda \geq 0$ (if possible) and a set $i_n$ such that the functional, $$\{D_{total} + \lambda R_{total}\}, \qquad (4)$$

is minimal under the constraint $R_{total} = R_{desired}$. Then this set of $i_n$ also solves the constrained problem of (3). In practice we settle for a rate $R_{total} \approx R_{desired}$ (and where typically $R_{total} < R_{desired}$) as the exact constraint may not be met by any $\lambda$.

Figure 19:
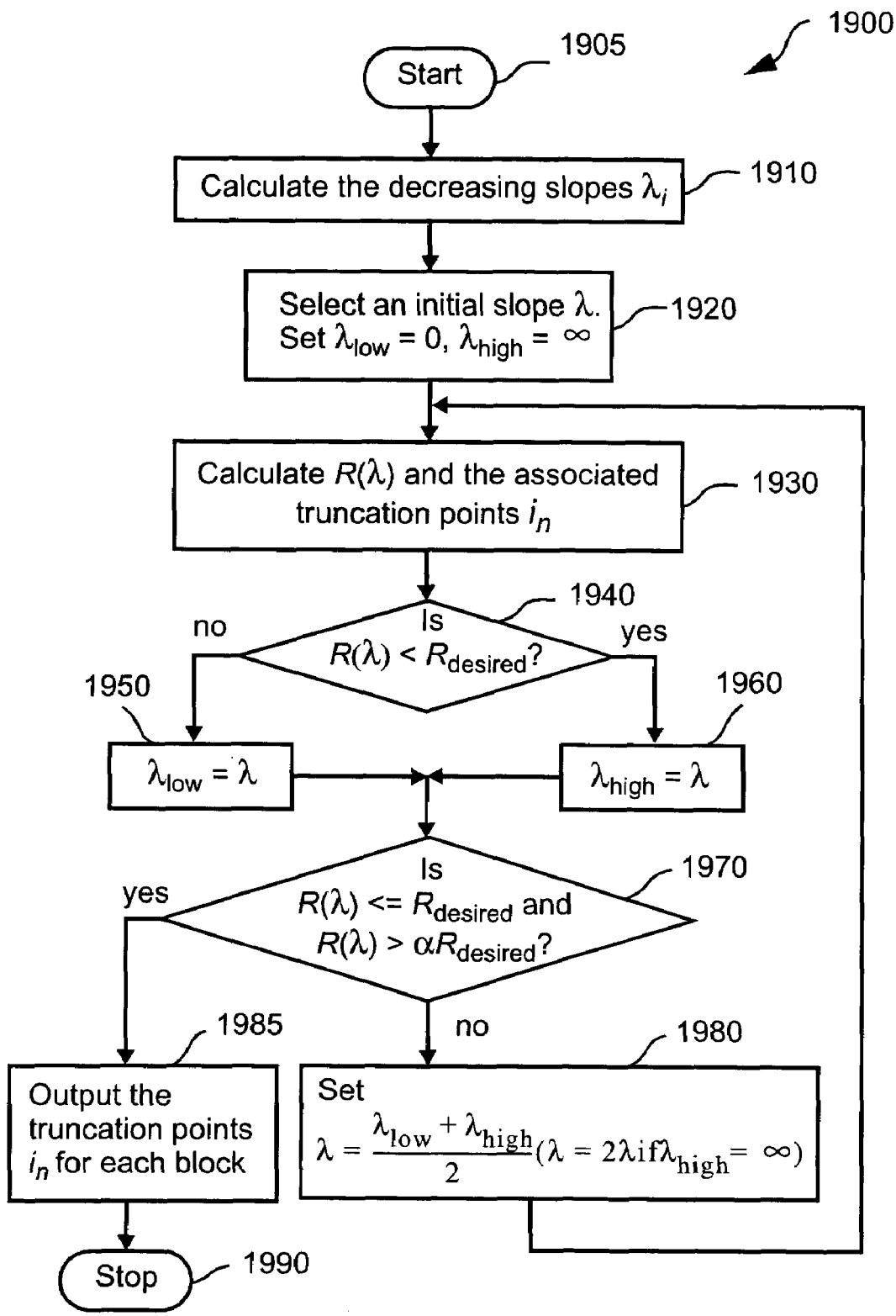
FIG. 19 shows a flow chart of a post-compression rate-distortion optimisation process for use in step 530 of FIG. 5, step 950 of FIG. 8, and step 1570 of FIG. 15 in accordance with the first, third, and fourth arrangements respectively.

A procedure for solving (3) via (4) is described with reference to FIG. 19 as follows. The procedure 1900 after commencement 1905 proceeds to step 1910. At step 1910 for each block the slope corresponding to each rate distortion point is calculated. For block n the set of slopes, $\lambda_0^n$, $\lambda_1^n, \lambda_2^n, \ldots, \lambda_{N+1}^n$, is given by, $$\lambda_i^n = \begin{cases} \infty & i = 0 \\ \dfrac{d_{i-1}^n - d_i^n}{r_i^n - r_{i-1}^n} & i = 1, \ldots, N \\ 0 & i = N+1 \end{cases} \quad (5)$$

These slopes are assumed to be decreasing: that is $\lambda_0^n \geq \lambda_1^n \geq \lambda_2^n \geq \ldots \geq \lambda_{M+1}^n$ for each block n. If $\lambda_i^n < \lambda_{i+1}^n$ then the rate distortion point $(r_i^n, d_i^n)$ is removed from the set of possible rate distortion points for block n. The remaining rate distortion points are then relabelled and the slopes recalculated. This process continues until the slopes are decreasing. Assuming that at the end of this process there are M rate distortion points, where $M \leq N$, we then have $\lambda_0^n \geq \lambda_1^n \geq \lambda_2^n \geq \ldots \geq \lambda_{M+1}^n$. This set of slopes is called the set of rate-distortion slopes for block n.

At next step 1920 an initial slope $\lambda$ is selected, and $\lambda_{low}$ and $\lambda_{high}$ are set to 0 and $\infty$ respectively. Preferably a slope of $\lambda=10$ is selected as an initial slope. At step 1930 the optimum termination point $i_n$ for each block n is determined and the optimum associated total rate $R(\lambda)$ is calculated. These termination points are the solution to the Lagrangian minimisation problem in (4). This step 1930 is described below in more detail. After completion of step 1930, a check is made at decision block 1940 to determine if $R(\lambda) < R_{desired}$. If decision block 1940 returns a "no", processing continues at step 1950. At step 1950 $\lambda_{low}$ is set to $\lambda$. Processing then resumes at step 1970. If decision block 1940 returns a "yes", then processing continues at step 1960. At step 1960 $\lambda_{high}$ is set to $\lambda$. Processing then resumes at step 1970.

At decision block 1970 a check is made to determine if $R(\lambda) <= R_{desired}$ and $R(\lambda) > \alpha R_{desired}$, where $\alpha$ is some rate tolerance less than 1. Preferably $\alpha = 0.99$ is used. Although it is not shown in FIG. 19 an iteration count is to be kept, and if this count is exceeded then decision block 1970 returns a "yes". The purpose of this iteration count is to stop the procedure entering an infinite loop. If decision block 1970 returns a "yes" then processing continues at step 1985. At step 1985, the optimum truncation points for each block (the $i_n$) are output. Processing then terminates in step 1990. If decision block 1970 returns a no, then processing continues at step 1980. At step 1980 the current slope $\lambda$ is updated and processing resumes at step 1930.

The optimum total rate and associated truncation points are calculated in step 1930 as follows. For block n the optimum truncation point for an operating slope of $\lambda$ is $i_n$, where $$\lambda_{i_n+1}^n \leq \lambda \leq \lambda_{i_n}^n. \quad (6)$$

Note that the optimum $i_n$ is a function of $\lambda$. Hence the rate $r_{i_n}^n$ associated with the optimum truncation point is a function of $\lambda$ and the total optimum rate is given by $$R(\lambda) = \sum_n r_{i_n}^n(\lambda). \quad (7)$$

In the case where there is more than one $i_n$ that satisfies (6) we keep a record of each possible $i_n$. Correspondingly, there is then a set of different possible total optimum rates $\{R(\lambda)$ and within this finite set there is a minimum $R_{min}(\lambda)$ and a maximum $R_{max}(\lambda)$. If at decision block 1970 $R_{min}(\lambda) < R_{desired}$ and $R_{max}(\lambda) > R_{desired}$, then decision block 1970 returns a "yes", and the set of truncation points $i_n$ corresponding to the largest $R(\lambda)$ that is less than or equal to $R_{desired}$ is output at step 1985. Many variations of this procedure exist for solving equation (3) via equation (4), and can alternatively be used.

Associated with a truncation point $i_n$ is a rate-distortion slope $\lambda_{i_n}^n$ (or $\lambda_{i_n+1}^n$) and we say that the rate-distortion slope for code-block n at truncation point $i_n$ is the slope $\lambda_{i_n}^n$.

This optimisation can be used to determine the number of sub-passes to keep for each code-block, in order to "optimally" encode an image for a given rate. These sub-passes can be encoded for each code-block to form a single layer to encode the image. The optimisation technique can also be used to construct several layers for encoding an image. For example two sets of truncation points can be determined: one is the set of sub-pass truncation points optimum for an overall rate of 1 bit per pixel, while the other is is the set of sub-pass truncation points optimum for an overall rate of 2 bits per pixel. For a given code-block the sub-pass corresponding to the second set is the same or a later sub-pass than that corresponding to the first set. The first layer is then constructed by including all determined sub-passes according to the first set. A second layer is then formed by including all sub-passes according to the second set that were not included in the first layer.

In general, this optimisation technique is referred to herein as the PCRD-opt routine as it is a form of post-compression rate-distortion optimisation. This technique is described as a "post-compression" technique as it generally involves determining the optimal set of truncation points after the data has been coded. This has the disadvantage of being a form of over-coding—many bit-planes will be coded to determine their rate-distortion slopes, only to be discarded after the PCRD-opt routine is run.

It should be noted that block truncation at sub-pass termination points after the PCRD-opt routine is performed is a form of quantisation, in that the bit-planes of the block that are coded after the termination points are not present in the stream to be decoded. This is generally more significant than any quantisation that occurs in representing the DWT coefficients in a fixed precision binary format, and usually more significant than the explicit quantization used in JPEG2000 (unless no bit-planes are discarded in the truncation process). Throughout the description, we will generally refer to quantisation meaning the dominant quantisation which is either caused through the truncation of a codestream for a block to a given sub-pass termination point, or through explicit DWT coefficient quantization.

An important aspect of the practical effectiveness of the rate distortion optimisation is the selection of a good distortion function. The human visual weights can be used to weight the mean square error distortion for each code-block, according to the subband to which each code-block belongs. In this way code-blocks from sub-bands that have larger weights are generally coded to a higher quality (that is, with more fractional bit-planes) than those from subbands with smaller weights.

1.4 Coding Passes

The following is a description of the bitplane coding of a code block.

Figure 4:
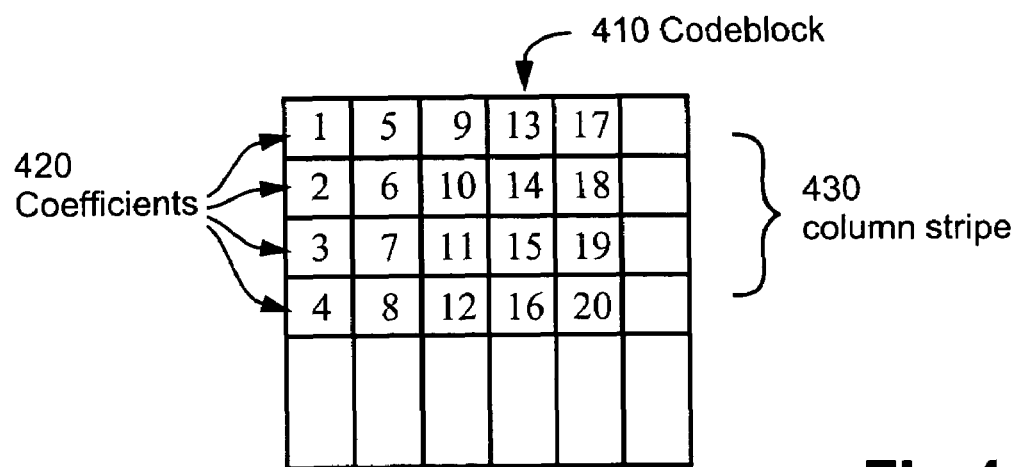
FIG. 4 illustrates the stripe oriented scan of the coding pass in a code block according to the prior art JPEG2000 standard.

Within each bitplane the coding is along a stripe oriented scan as illustrated by FIG. 4. Each stripe 430 contains four rows of bit symbols and within each stripe the bit symbols are scanned column by column from left to right following path 420.

Bitplane coding starts in the most significant bitplane that (generally) contains a nonzero element and works down to the least significant bitplane. Each bit-plane is nominally coded in 3 sub-passes. These are the significance propagation pass, the magnitude refinement pass, and the cleanup pass. Bit-planes are nominally encoded in this order of sub-passes.

A coefficient C is said to be significant at bit-plane l if $2^l \leq |C|$. During encoding or decoding each coefficient has an associated significance state, which has a subtly different interpretation to significance at bit-plane l. In particular the significance state of a coefficient is set (from being insignificant to be significant) immediately after the most significant (1) bit of the coefficient is encoded or decoded. That is, for example, during encoding of bit-plane l if C is significant at bit-plane l, but insignificant at bit-plane l+1, the significance state of C is set immediately after bit l of C is encoded. Thus C is insignificant prior to encoding bit l of C and significant immediately afterwards. This significance state is thus dependent on the coding (and decoding) order.

Each coefficient has an associated context word that contains the significance states of the 8 nearest-neighbour coefficients. For each coefficient the context word is initialized to zero. A coefficient can have 256 possible contexts. These 256 possible contexts are clustered into a smaller number of contexts because it is not necessary to distinguish between 256 different contexts. For each pass there is a different rule of how to cluster the 256 possible contexts. In each bitplane a coefficient is coded in exactly one of the three coding passes.

1.4.1 The Significance Propagation Pass

The significance propagation pass includes those coefficients whose significance state is still set to insignificant but at least one of the 8 nearest neighbours has a significant state. This means that the significance propagation pass includes those coefficients which are likely to become significant.

1.4.2 The Magnitude Refinement Pass

In this coding pass those bit symbols that became significant in a previous bitplane are included. Through this the magnitude of the wavelet coefficient is further refined.

1.4.3 The Cleanup Pass

The cleanup pass is the last pass in a given bitplane. It includes those coefficients that were not coded in the previous coding passes. If a number of coefficients are not significant and have no significant neighbour they are run length encoded otherwise they are coded as in the previous coding passes.

The most significant bitplane that contains a non-zero element only has a cleanup pass and no other coding pass. All other less significant bitplanes first have a significance propagation pass, then a magnitude refinement pass and finally a cleanup pass (unless one or more of these passes is the last pass in the bit-stream for a given code-block).

1.5 Code-Stream Construction

A number of code-blocks in each resolution level is collected within a precinct and the set of block layers within a precinct is arranged into a packet. In a simple case a precinct is a whole resolution level subband (for example the HL1, LH1 and HH1 subbands). A packet can be thought of as the basic building blocks for the JPEG2000 compressed code-stream, where a packet contains all the compressed image data from a particular precinct, block layer, and a resolution level.

The JPEG2000 bit-stream comprises a sequence of packets. Each packet contains encoded image information for a single resolution, (quality) layer, component and spatial region of the image tile. A JPEG2000 code-stream is constructed by a sequence of packets and header information blocks.

1.6 Motion JPEG2000

For several applications it is desirable to encode a video at a fixed bit-rate, for example 24 Mbits per second. An obvious approach to achieve a fixed rate in a video is to compress each frame by the same amount. For example, at 30 frames per second, each frame must be compressed to around 820 Kbits to satisfy the bit rate constraint of 24 Mbits per second.

Motion JPEG2000 is a video compression system that involves independent JPEG2000 compression of each video frame in the video stream. As a wavelet based encoder, non-lossless JPEG2000 compression of a video frame introduces wavelet artefacts into the decompressed output. For a given video frame there will be a level of non-lossless compression that may be considered visually lossless, in that the wavelet artefacts introduced by the coding process will be of a sufficiently small magnitude and quality that they will not be noticed by the viewer. However, in a video stream where each frame has been independently coded using the JPEG2000 encoder, even small changes between frames can lead to quite different sets of wavelet artefacts in consecutive decoded frames due to the non-linear nature of the encoder. Within a decoded video stream, these wavelet artefacts change rapidly in a manner that is not simply related to the changes in the underlying video content, and these changes are often visible and are sometimes visually unacceptable, even when the individual frames of the video could be considered visually acceptable. The problem of these rapidly changing artefacts, which we will henceforth term flicker artefacts, becomes much greater at higher levels of compression, as the artefacts become larger and more obvious at lower bit rates.

2.0 Motion JPEG2000—Block Truncation Flicker

Flicker artefacts in decoded MJ2K videos are a problem that limit the minimum bit rate at which a MJ2K encoded video can be encoded in a visually lossless way, and decrease the quality of encoded video at any bit rate below that. A default prior art option for a Motion JPEG 2000 encoder is to run the rate distortion optimization algorithm for each frame independently. The inventors have ascertained that this could cause flicker because the number of coding passes stored in the bit stream for each code-block may change between frames in a way which is not related to gross changes in the underlying video footage. This means that the truncation point for a given code block may regularly change between different values causing some wavelet artefacts to appear and disappear between subsequent frames. For example, some experiments conducted by the inventors suggest that the truncation point of 25% of the blocks changes every frame, even when there is not a lot of motion in the video.

Thus the default approach suffers in that the resulting decoded video stream contains wavelet artefacts that appear and disappear in consecutive frames due to changes in the bit depth to which the code blocks are coded. Tables 1 to 4 illustrate this point.

TABLE 1

DWT coefficients for a portion of a block in frame 1

| | | |
|---|---|---|
| −2.426220 | −11.162438 | −0.539887 |
| 3.697484 | 16.796406 | 5.798251 |
| −3.639841 | −15.364249 | −7.301143 |

TABLE 2

Quantised DWT coefficients for the coefficients of Table 1 with a quantisation step size of 16

| | | |
|---|---|---|
| 0 | 0 | 0 |
| 0 | 1 | 0 |
| 0 | 0 | 0 |

TABLE 3

DWT coefficients for a portion of a block in frame 2

| | | |
|---|---|---|
| −2.184122 | −11.267410 | 0.155337 |
| 3.005134 | 16.275234 | 4.651533 |
| −2.982268 | −5.198070 | −7.582343 |

TABLE 4

Quantised DWT coefficients for the coefficients of Table 3 with a quantisation step size of 8

| | | |
|---|---|---|
| 0 | −1 | 0 |
| 0 | 2 | 0 |
| 0 | 0 | 0 |

A possible 3×3 subset of DWT coefficients from the first encoded frame are shown in Table 1 with their corresponding quantised values with a quantisation step size of 16 shown in Table 2. In the next frame, the visual content is very similar and the same subset of DWT coefficients is shown in Table 3. These are quantised at a step size of 8 and the results are shown in Table 4. These (effective) quantization step sizes could be the result of explicit quantization in JPEG2000 or in the implicit quantization through bit-plane truncation (of the PCRD-opt process). However, for the purposes of this example, these quantization step sizes are meant to result from bit-plane truncation. The inventors have determined that it is not uncommon for the same block in similar frames to have quantisation thresholds that can differ by a factor of 2. Thus, as can been seen in the differences between the values between Tables 2 and 4 (noting a typical decoder would dequantize the decoded coefficients for each frame to significantly different values), this can lead to the appearance and disappearance of wavelet artefacts (caused by a transition between a zero and non-zero value) and a change in the apparent size and intensity of the wavelet artefact (caused by a change in the magnitude of the coefficient), even when the difference between the DWT coefficients between blocks is quite small.

Apart from causing unwanted visual artefacts, this block truncation flicker presents a problem for writing an efficient encoder in software and implementing such an encoder in hardware. In the default prior art MJ2K encoder described above, the entire frame is encoded at a significant cost in time and memory, thereby determining the rate-distortion curves for use in the PCRD-opt process.

2.1 First Arrangement

The inventors have recognised that to avoid block truncation flicker, the truncation point of the blocks preferably should not change between video frames unless there is a change in the visual content of the frames. The truncation points do change, however, and sometimes when the only change between frames is due to a small amount of sensor noise. A likely cause of the unwanted changes in the block truncation depth lies in the fact that the rate-distortion slopes of the code blocks at their truncation points are very similar to the slopes at nearby truncation points. Because the slopes are similar, even a small change in a block can cause a selection of a different truncation point. Thus, small changes (eg. sensor noise in the image content) between frames can cause a selection of different truncation points for some of the code-blocks.

Figure 5:
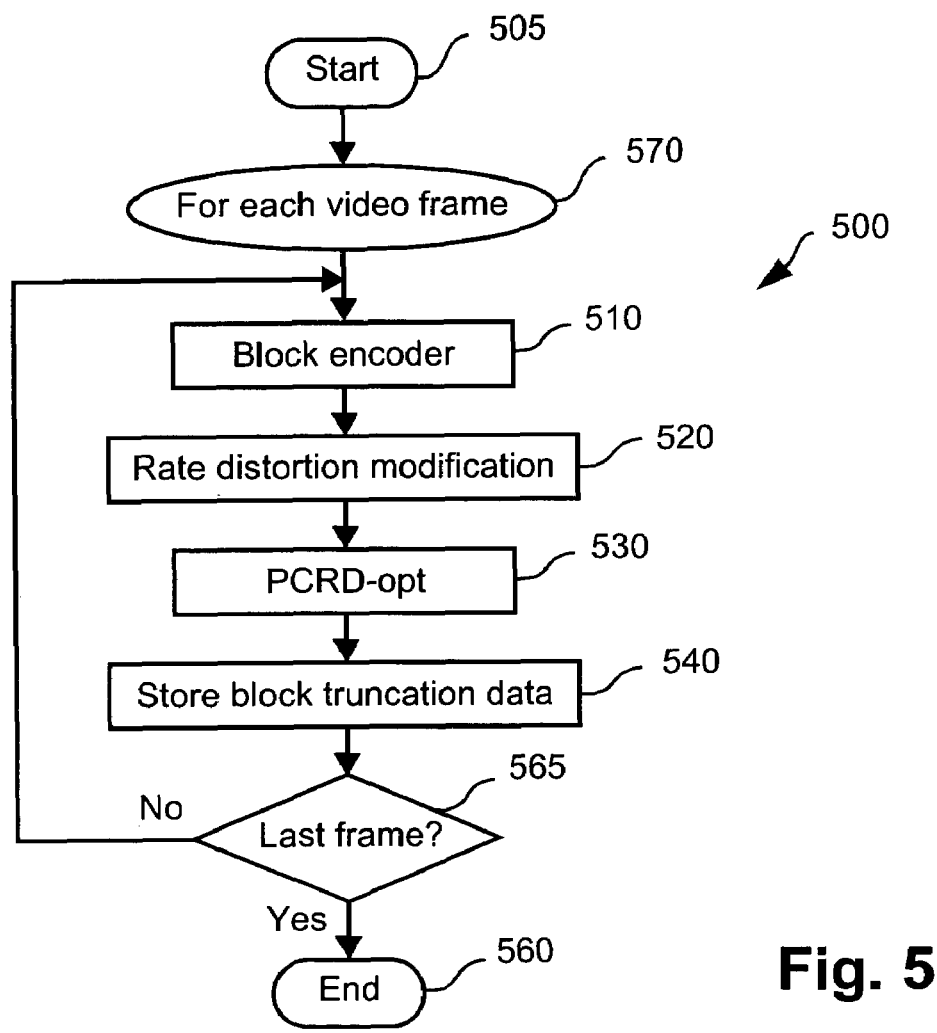
FIG. 5 shows a flow chart of a method of compressing a sequence of frames of a video into Motion JPEG2000 format according to a first arrangement.

Turning now to FIG. 5, there is shown a flow chart of a method 500 of compressing a sequence of frames of a video into Motion JPEG2000 format according to a first arrangement. This method 500 shows how a truncation stabilisation process (steps 520, 540) in accordance with the present arrangement is implemented within the known MJ2K encoding process. The remaining steps of the method 500 may be implemented in the normal manner in accordance with MJ2K.

The method 500 commences at step 505, where any necessary parameters are initialised. The method 500 then enters a loop 570 for compressing one frame after another in the video sequence. The loop 570 during a first pass of the loop processes the first frame of the video, and during subsequent passes processes corresponding subsequent frames of the video. After the loop 570 has processed all the frames of the video, the loop 570 exits at step 565 and the method 500 terminates at step 560.

The loop 510, during any current pass, firstly undertakes encoding at step 510 of each code-block of the corresponding current frame in accordance with JPEG2000. During the execution of the block-encoding step, 510, the rate-distortion curves for each of the blocks are calculated. That is, the rate, $r_i^n$, and distortion, $d_i^n$, for block n and sub-pass i are calculated for all the blocks and passes for the current frame. After completion of the block-encoding 510 step, the loop 570 then proceeds to a distortion modification step 520. In this distortion modification step 520, if block n was truncated at sub-pass $j_n$ in the immediately previous frame, the distortion $d_{j_n}^n$ of the block in the current frame is decreased by some factor α, $$d_{j_n}^n := \alpha d_{j_n}^n. \tag{8}$$

The PCRD-opt routine, 530, is then run using this modified set of distortion values, thereby causing the same set of block truncation points to be used for this frame. These block truncation points are then stored in memory, 540, for use in the next frame.

The precise form of the distortion function used to calculate the unadjusted distortion is not relevant to this method of reducing block truncation related flicker. For instance, this method may be applied to a mean square error distortion estimate or to a visually weighted means square error distortion estimate, two common forms of distortion measure used with MJ2K with equal facility.

The flow control of the rate distortion modification step 520 is further described with reference to FIG. 6. The distortion modification step 520 commences 602 after the completion of the block encoding step 510 (FIG. 5). After step 602, it is first determined at step 610 whether or not this is the first frame in video sequence. If step 610 determines that the current frame is the first frame, then the distortion modification step 520 terminates at step 655 and the method 500 proceeds to step 530. Otherwise if the distortion modification step 610 determines that the current frame is not the first frame, the method 500 enters a loop 620 for processing each code block of the current frame in turn. The loop 620 for a current code block n of the current frame, retrieves from memory at step 630 the truncation point of the corresponding code block n of the previous frame, and reduces at step 640 the distortion for this truncation point in accordance with Eqn (8). After completion of step 640, the method 500 proceeds to step 650, where the method 500 checks if all the code blocks of the current frame have been processed by the loop 620. If all code blocks have been processed, then the distortion modification step 520 terminates at step 655, and the method 500 proceeds to the PCRD-opt step 530 (FIG. 5). Otherwise, the loop 620 processes the next code block in the current frame in similar fashion.

The modification of the rate-distortion curve, 640, can take many forms but will generally involve decreasing the distortion implied by truncating the bit-stream at the same coding pass as the previous frame relative to the distortion implied by truncating the bit-stream at other coding passes. The distortion modification step 520 preferably is implemented utilising equation (5) where the distortion measured for truncation of the block at the same pass as it was truncated at in the previous frame is scaled by a fixed factor of preferably $\alpha=0.5$. Numerous other schemes will have approximately the same effect.

For instance, the distortion may be stored internally within the encoder as distortion differences, $$\delta_j^n = d_{j-1}^n - d_j^n, \quad (9)$$

where $\delta_j^n$ represents the reduction in distortion caused by including sub-pass j of block n in the code-stream and $d_0^n=0$. Rather than decreasing $d_{j_n}^n$ in step 640, one may increase $\delta_j^n$.

$$\delta_{j_n}^n := c\delta_{j_n}^n, \quad (10)$$

with c>1. While not algebraically equivalent to equation (8), the value of c=5 in equation (10) gives results visually similar to those of equation (8), for $\alpha=0.5$.

The method 500 ameliorates the problem of flicker introduced by temporal instability of the block truncation points and is based on the observation that the distortion is perceptually less if a block has the same truncation point in consecutive frames. In the typical JPEG2000 default prior art configuration, the PCRD-opt routine determines an optimal solution in terms of the rate-distortion for a single frame, as the distortion is only dependent on a single frame. This default configuration is not visually optimal in a video sequence as the change in the truncation point causes visual artefacts in the video sequence. As described above, the default rate-distortion calculation is modified in the method 500 to reflect this observation, and thereby eliminate this form of visual flicker in the video stream. Thus, by storing the truncation points for each block between frames during encoding, these stored values can be used in the next frame to lower the distortion for the pass that the block was truncated at in the previous frame and thereby preferentially truncate at the same point as the previous frame while still retaining the ability to adapt the block truncation points to gross changes in the visual content of the video. In this way, the method 500 uses PCRD-opt truncation stabilisation technique to reduce block truncation flicker.

It is important to note that this same effect could be achieved if, rather than reducing the distortion for the block truncation pass of the previous frame, the rate is artificially increased for the block truncation pass of the previous frame. This is because the PCRD-opt routine is dependent on the slope of the rate-distortion curve, and increasing the rate has the same effect as decreasing the distortion on the slope of the rate-distortion curve.

This technique can be used in a number of different situations. For instance, it may be applied to layered MJ2K code-streams. In this case, the truncation point for the end of each layer for each block is stored and the rate distortion curve is modified to decrease the distortion measure at each layer truncation point used in the previous frame. It can also be generalised to involve the truncation points of more than one of the previous frames, thereby ensuring longer-term stability of the truncation points.

As the encoder has an a priori estimate of the block truncation point before the coder and PCRD-opt portion of the motion JP2K process have been executed for this frame, then the encoder only needs to encode a few more passes than that coded in the previous frame, saving execution time and memory. In the case of significant scene change, the encoder would only take a few frames to adjust to the correct truncation points. Alternately, the encoder could monitor for such changes and encode the entire frame in those cases where it detects a major scene change.

It is also very useful to have foreknowledge of the block truncation point during the encoding phase of the method. This gives some information as to the scale of the quantisation errors that are visually acceptable in this code block that is of great utility in other manipulations of the transformed wavelet coefficients.

Preferably, the truncation stabilisation process (steps 520, 540) is applied to all code blocks of the current frame. Alternatively, the method 500 may modify the distortion measures of a predetermined limited selection of code blocks of the current frame, while the distortion measures of the remaining code blocks are not modified. For example, the distortion modification step 520 may be limited to the code blocks of the level 1 subband coefficients, while the distortion measures of the remaining code blocks are not modified. In another example, the distortion modification step 520 is limited to the code blocks of the level 1, 2, and 3 subband coefficients.

3.0 Motion JPEG2000—Significance and Magnitude Refinement Flicker

As noted above, flicker artefacts may be described as temporal changes in the decoded video that are unrelated or only indirectly related to changes in the input signal. In the case of block-truncation flicker as described above, the flicker artefacts were caused by changes in the block truncation depth in consecutive frames of the video. Other flicker artefacts that are ubiquitous in real video footage are now described.

TABLE 5

| 3 × 3 block of DWT coefficients from frame 1 | | |
|---|---|---|
| −4.184 | −11.267 | 1.155 |
| 5.005 | 15.314 | 4.651 |
| −2.782 | −15.198 | −8.582 |

TABLE 6

3 × 3 block of quantized DWT coefficients
from Table 1 with step size of 16

| 0 | 0 | 0 |
|---|---|---|
| 0 | 0 | 0 |
| 0 | 0 | 0 |

TABLE 7

The same 3 × 3 block DWT coefficients as Table 1 from frame 2

| −2.426 | −11.162 | −0.539 |
|---|---|---|
| 3.697 | 16.796 | 5.798 |
| −3.639 | −15.364 | −7.301 |

TABLE 8

3 × 3 block of quantized DWT coefficients
from Table 3 with step size of 16

| 0 | 0 | 0 |
|---|---|---|
| 0 | 1 | 0 |
| 0 | 0 | 0 |

The unwanted behaviour of the MJ2K process is illustrated in Tables 5 to 8. Tables 5 and 7 show a 3×3 block of DWT coefficients in two consecutive frames. Note that these are not real data, and are provided merely as an illustration of the problem. In the JPEG2000 encoding process, these coefficients will be quantized. If, for instance, the quantization threshold were 16, the quantized coefficients as shown in Tables 6 and 8 would result. Thus, even though the unquantized wavelet coefficients are within 2 of each other, the values that are quantized in the encoder and are then dequantized in the decoder may be further apart. In frame 1, shown in Table 6, the MJ2K encoder will mark all the coefficients as insignificant, while in frame 2, the middle coefficient will be marked as significant. In a further frame, it may be insignificant or significant, in a manner, which is dependent on the nature of the noise in the system. A MJ2K decoder will decode the elements in frame 1 to zero while the middle coefficient of frame 2 will be decoded to 16 (24 if a midpoint dequantization method is used). Such a large difference, if it continually changes between frames, will generally be visible in the decoded output video sequence. In this way, the Motion JPEG2000 encoder enhances small changes between wavelet coefficients in a non-linear manner. These small changes that are not apparent in the uncompressed video stream may become apparent in the compressed video stream.

The above example illustrates how sensor noise on the video capture device can indirectly cause a problem as follows. A DWT coefficient may transition in a fixed bit-plane between significant and insignificant in subsequent frames of the video due to the noise in the device. We shall refer to this type of flicker as significance flicker (note: it can occur in the significance propagation pass as well as the cleanup pass of JPEG2000). Sensor noise can however, cause bit transitions over several bitplanes of the DWT coefficients that result in visible flicker artefacts, as well. If the flicker causes bit transitions over several bitplanes we call it magnitude refinement flicker.

3.1 Second Arrangement

As mentioned previously only the significance propagation pass and the cleanup pass can set a coefficient from insignificant to significant. The inventors have observed that the cleanup pass is especially prone to flicker artefacts for three reasons. Firstly, the cleanup pass includes coefficients which are most likely not part of some definite image structure (an example of definite image structure is an edge of an object in a frame). Definite image structure is typically coded in the significance propagation pass. As a consequence significance flicker caused by random noise is more likely to occur in the cleanup pass. Secondly, experiments suggest that the majority of significant coefficients are coded in the cleanup pass. So, changes in the cleanup pass will affect the majority of newly significant coefficients. Thirdly, experiments suggest that 80% of all truncation points occur immediately after a clean up pass. Consequently, the present second arrangement is directed to modifying the cleanup pass for reducing the flicker. However, once the clean up pass flicker is reduced significance propagation pass flicker becomes more important, and can also be addressed in a similar fashion.

Figure 7A:
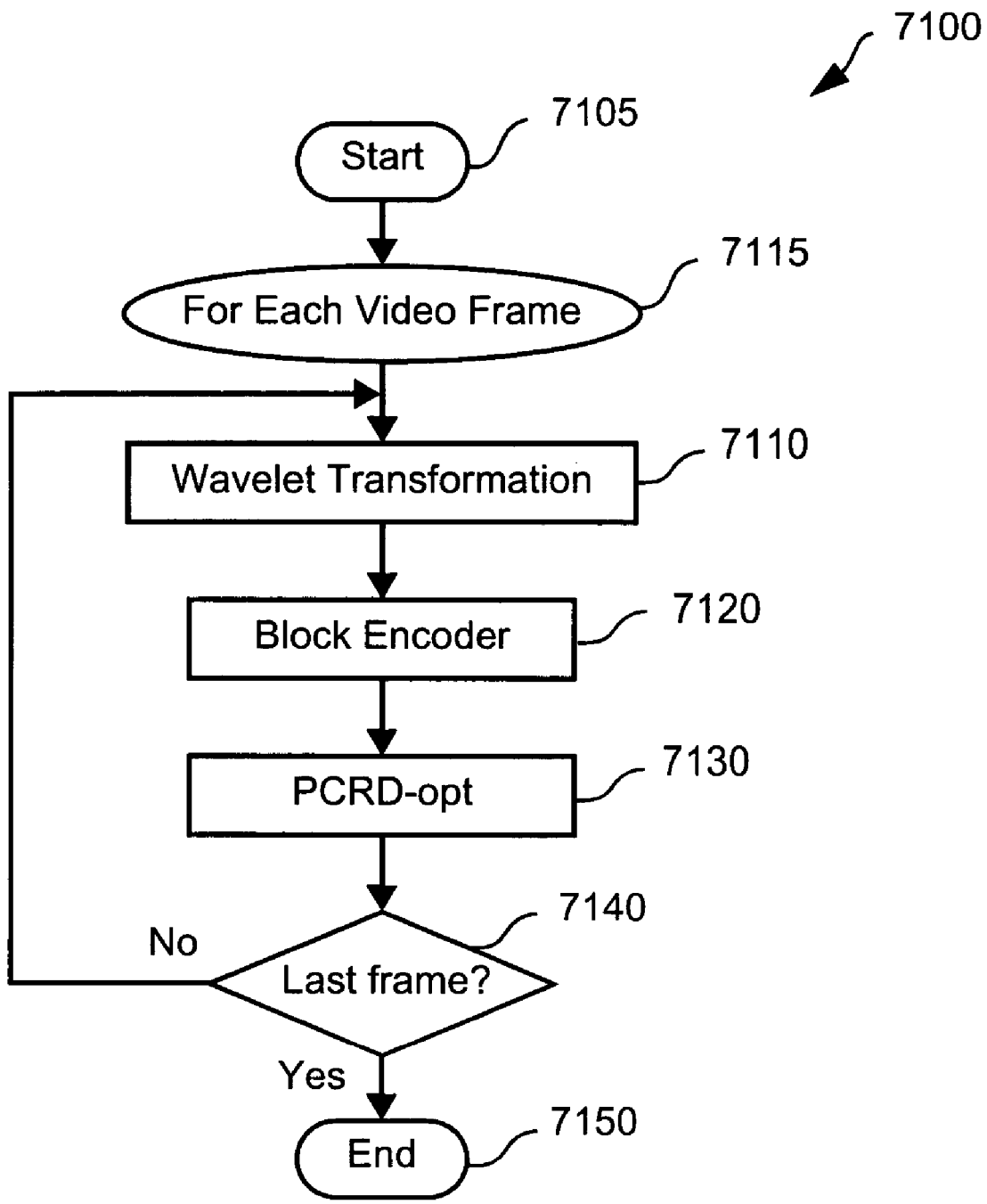
FIG. 7A shows a flow chart of a method of compressing a sequence of frames of a video into Motion JPEG2000 format according to a second arrangement.

Turning now to FIG. 7A, there is shown a flow chart of a method of compressing a sequence of frames of a video into Motion JPEG2000 format according to a second arrangement. The method 7100 is implemented in accordance with the MJ2K encoding method, but with a number of modifications during the block encoding phase. The remaining steps of the method 7100 may be implemented in the normal manner in accordance with MJ2K.

The method 7100 commences at step 7105 and enters a loop 7115 for compressing one frame after another. The loop 7115 during a first pass processes the first frame and during subsequent passes processes corresponding subsequent frames of the video. After the loop has processed all the frames of the video, the loop 7115 exits at step 7140 and terminates at step 7150.

The loop 7115, during any current pass, firstly performs a wavelet transform at step 7110 on the corresponding current frame of the video sequence. These wavelet transform coefficients are quantized to integer values and tiled into code-blocks (not shown). Each code-block of the current frame is encoded in bit-planes, at step 7120 or fractions thereof, down to some minimum fractional bit-plane with an arithmetic coder. After the encoding step 7120, the PRCD-opt routine is run at step 7130 and the output bitstream is constructed for the current frame (not shown). Afterwards, the loop 7115 proceeds to step 7140, where a test is made whether or not the current frame is the last frame of the sequence. If the sequence reveals the current frame is the last frame, then the method 7100 terminates. Otherwise, the method 7100 returns to step 7110 for processing the next frame in the video sequence.

The block encoding step 7120 may be implemented in any known way compliant with JPEG2000, with the following modifications which will now be described with reference to FIG. 7B.

Figure 7B:
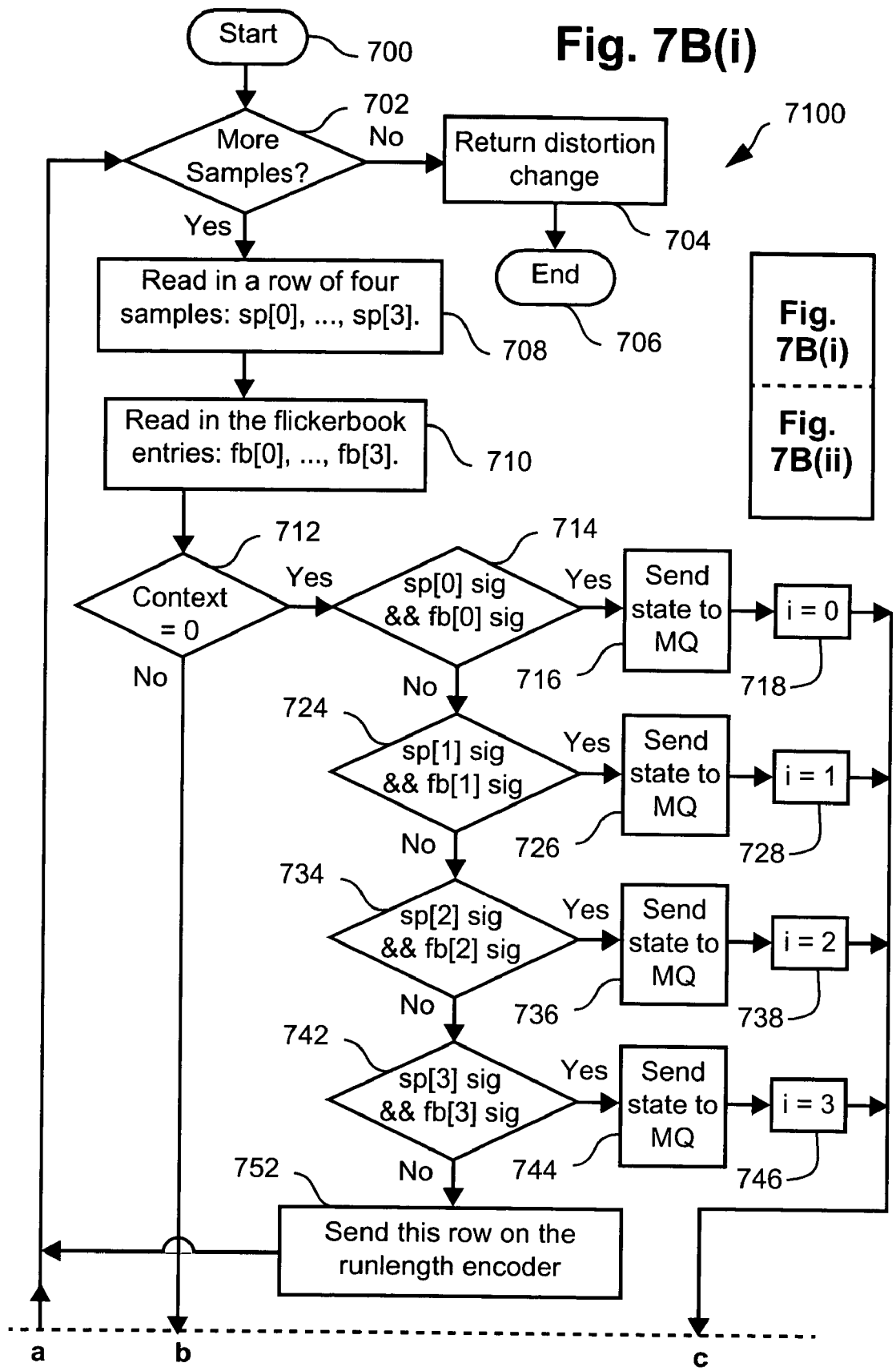
FIG. 7B, which includes FIG. 7B(i) and FIG. 7B(ii), shows a flow chart of a process suitable for use in step 7120 of the method of FIG. 7A.

The process illustrated by the flow chart of FIG. 7B applies to the encoding of a predetermined bitplane for a current code-block. Preferably the predetermined bitplane is the least significant bitplane which is included in the compressed video stream, for the corresponding code-block in the previous frame. (Thus it is preferably determined after the PCRD-opt process for the previous frame). Alternatively, depending on a noise factor, a bitplane higher than the least significant bitplane can be chosen. The preceding bitplanes above the predetermined minimum bitplane of the code block can be encoded according to JPEG2000.

The process shown in FIG. 7B incorporates a significance stabilization process merged into a process for encoding the bit symbols of a bit-plane during the cleanup pass. The code-stream produced by the process described by FIG. 7B (encoder side) is able to be decoded by a standard JPEG2000 decoder.

Processing in FIG. 7B commences at step 700. At step 702 it is checked if there are four bit symbols available, within a stripe column, which can be read in. If there are not enough bit symbols to continue with the process the distortion change is looked up in a table and returned in step 704. The process is stopped in step 706.

If there are enough bit symbols in step 702 to continue with the process then in step 708 a stripe column of four bit symbols sp[0], sp[1], sp[2] and sp[3] is read in and stored in memory. Next, in step 710, the significance states fb[0], ..., fb[3] of the corresponding bit symbols sp[0], ..., sp[3] from the previous frame are read in and stored in memory as well. The bit symbols fb[0], ..., fb[3] indicate whether the bit symbols sp[0], ..., sp[3] were significant in the predetermined bitplane of the previous frame.

The bit symbols in a previous frame corresponding to a set of bit symbols in a current frame refer to the same DWT coefficients in the previous frame as in the current frame. Thus for each code-block in a current frame there is a corresponding code-block in a previous frame, and for each coefficient in a current frame there is a corresponding coefficient in the previous frame. The significance states fb[0], ..., fb[3] are referred to as flicker book bit symbols. A flicker book is the set of flicker book bit symbols for an entire previous frame for the predetermined bitplane. A flicker book can be stored in memory as a sequence of bits, or in a compressed form. Typically most coefficients are insignificant at typical bit rates of interest, so that a reasonable compression of the flicker book is possible.

In step 712 it is checked if the context word of the stripe column of bit symbols is zero or non zero. This context word contains the significance states of the stripe column's fourteen neighbours. If the context is zero the bit symbol has to be coded by the cleanup pass and not by any other coding pass. In this case processing continues at step 714. If the context of the stripe column is nonzero it has to be checked later in step 730 for each single bit symbol if it is included in the cleanup pass.

The purpose of the steps 714, 716, 718 (for bit symbol sp[0]), 724, 726, 728 (for bit symbol sp[1]), 734, 736, 738 (for bit symbol sp[2]) and finally 742, 744 and 746 (for bit symbol sp[3]) is to find the index of the first significant bit symbol in the stripe column sp[0], ..., sp[3] which was significant in the last frame, as well.

In greater detail: In step 714 it is checked if the bit symbol sp[0] in the stripe column is significant and whether it was significant in the last frame as well. If sp[0] is currently significant and was significant as well in the last frame processing continues with step 716. In step 716, the current state is sent to the MQ (arithmetic) encoder. If sp[0] is currently not significant or it was not significant in the first frame processing continues at step 724. Next, in step 718 the index i is set to 0. Although not shown in FIG. 7 preferably sp[0] is set to zero if sp[0] is significant and fb[0] is insignificant, if Step 714 is entered. Setting bit symbols sp[0] to zero means that more bit symbols are run length encoded which improves the compression performance.

The steps 724, 726, 728 (for bit symbol sp[1]), 734, 736, 738 (for bit symbol sp[2]) and 742, 744 and 746 (for bit symbol sp[3]) are analogous.

If there was no significant bit symbol in the stripe column sp[0], ..., sp[3] this stripe column is run-length encoded in step 752 and processing continues at step 702 which checks whether there are more bit symbols (stripe columns) to encode.

If there was a significant bit symbol in the stripe column sp[0], ..., sp[3] this significance (with the knowledge that it is the first significance in the stripe column) is processed in step 758. Step 758 is illustrated in more detail in FIG. 8.

Having processed the significance of bit symbol sp[i] the step 756 checks if this bit symbol was the last in the stripe column of bit symbols (ie. i=3) and if so processing jumps back to step 702 which checks if there are more stripe columns to encode.

If in step 756 the bit symbol sp[i] is not the last bit symbol of the stripe column then the next bit symbol is taken in step 754. Next, it has to be checked whether this new bit symbol is included by the cleanup pass. This is step 730. If in step 730 this new bit symbol is not included in the cleanup pass processing continues at step 722. In step 722 the current bit symbol index i is incremented and processing continues at Step 730. Note although not shown on the flow diagram if i is incremented to 4, processing continues at Step 702. If decision block 730 is true processing continues at step 732.

If the bit symbol is included in the cleanup pass, step 732 investigates if the bit symbol is significant and was significant in the previous frame. If so the significance is processed in step 758. Step 758 is illustrated in more detail in FIG. 8. If the bit symbol sp[i] is currently not significant or was not significant in the previous frame then the bit symbol is set preferably to zero in step 740. Next, the flickerbook is updated in step 748 to indicate that this bit symbol became insignificant.

As already mentioned the bitplane coding procedure of the cleanup pass uses a context label. Experiments conducted by the inventors show that at a bit rate of 1 bit per bit symbol or less the majority of bit symbols never become significant. As a result it is more efficient to broadcast the effect of significance state transitions to each of the neighbours. This context symbol which is derived out of the bit symbol sp[i] is transmitted to the MQ coder in step 750 and step 754 moves on to the next bit symbol in the stripe column sp[0], ..., sp[3] if the bit symbol was not the last in the stripe column (step 754). Because the context symbols are derived after the significance state of the bit symbol was modified the MQ coder gets the correct context label for this modified bit symbol. Without a correct context the MQ decoder would not be able to reconstruct the desired value and as a result the decompressed video stream would suffer very strong distortion.

Figure 8:
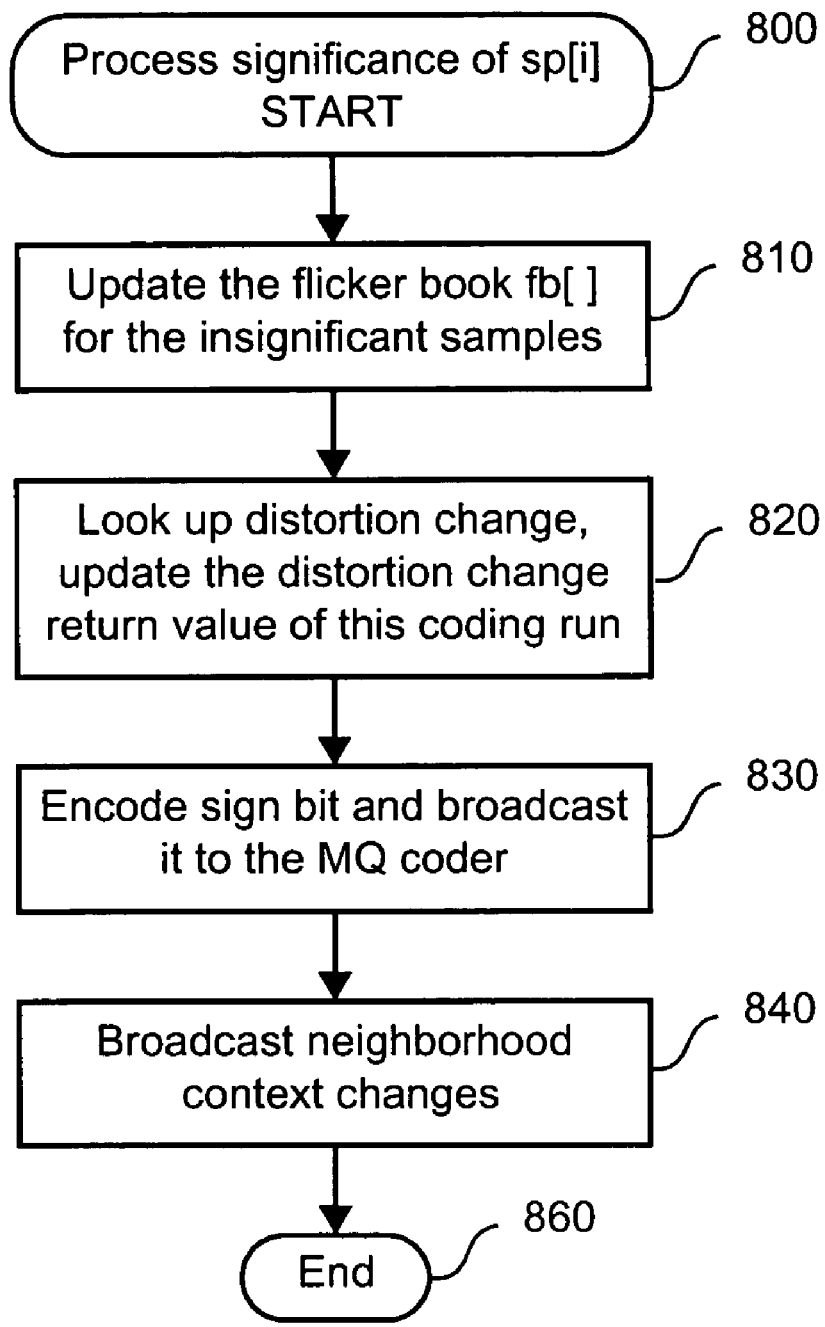
FIG. 8 shows a flow chart of a single significance state step 758 for use in the process of FIG. 7 according to the second arrangement.

Now, referring to FIG. 8 there is shown the steps of processing the significance of bit symbol sp[i]. Processing in FIG. 8 commences at step 800. In step 810 the flicker book is updated for those bit symbols which have not yet been updated. Processing follows at step 820 in which the distortion change due to the latest significance change is updated. After the cleanup pass is completed the distortion change due to this last pass is returned. This is needed in order to associate this last pass with a corresponding rate-distortion-point (See previous section 1.3 entitled "Rate Distortion Optimisation" and for further information see Appendix J.14.1 of the aforementioned JPEG 2000 publication—Part 1). Next, both the sign and magnitude bit are broadcasted to the MQ coder. This is done in step 830. Its context label is updated in step 840.

In this way, the second arrangement reduces flicker in the clean up pass. It does this by stabilising the significance states for corresponding coefficients across adjacent frames in the predetermined bitplane during the cleanup pass. This arrangement can also be applied over a number of bitplanes (with one flicker book per bit-plane stabilized). Thus in this manner, the second arrangement determines for each coefficient C to be coded during the cleanup pass of a predetermined bitplane l if $2^l <= |C| < 2^{(l+1)}$ and $|P| < 2^l$, where P is corresponding coefficient in the previous frame, and if so stabilises the significance of coefficient C by setting the value of the bit symbol of coefficient C in bitplane l to the value of the bit symbol of coefficient P in bitplane l of the previous frame. Flicker reduction can be analogously applied in the significance propagation pass. Similar flicker reduction techniques can also be applied to coefficients in the magnitude refinement pass. For example, in the latter case two flicker books may be stored in memory, one for each of two specific bitplanes. If a coefficient is to be encoded during a magnitude refinement pass for the first time, it is possible by using one of these flickerbooks to determine whether there is flicker in this coefficient in a substantially similar fashion as described above. Then by using the other flickerbook, it is possible to decide whether the detected flicker increased or decreased the wavelet coefficient and modify the wavelet coefficient accordingly.

This process of significance stabilization is applied to the encoder side of Motion JPEG2000. The process of significance stabilization can also be implemented in a Motion JPEG2000 decoder in a simpler manner. For decoding, the least significant bitplane is retrieved from the code-stream (in which it is stored by the Motion JPEG2000 standard decoder) and is signalled to the dequantization. During the dequantization of a previous video frame we can therefore store the significance states in the preferably least significant bitplane of the dequantized wavelet coefficients. During the dequantization of the current video frame in the preferably least significant bitplane we retrieve the flicker book, which contains the corresponding significance states of the previous frame. If the method determines from the flickerbook that the currently dequantised significance of a coefficient differs from the significance of the corresponding coefficient in a previous frame (e.g. the previous significance state is "insignificant" but the current significance state is "significant") then the bit in the predetermined bitplane of the coefficient is set to the same bit as the corresponding coefficient in the previous frame (e.g. set to "insignificant").

Preferably, the significance stabilisation process is applied to all code blocks of the current frame. Alternatively, the method 7100 may apply the significance stabilisation process to those coefficients in a predetermined limited selection of code blocks of the current frame, while the significance states of coefficients in the remaining code blocks are not modified. For example, the significance stabilisation process may be limited to the code blocks of the level 1 subband coefficients, while the significance states of the remaining code blocks are not modified. In another example, the significance stabilisation process is limited to the code blocks of the level 1, 2, and 3 subband coefficients.

In the foregoing description of the second arrangement, the predetermined bitplane l is preferably the least significant bitplane included in the compressed video stream for the corresponding code-block in the previous frame. In the terminology used below in the description of the fifth arrangement, the least significant bitplane of the coefficients of the previous frame (n−1) is L(n−1). Thus, in the second arrangement, bit L(n−1) of a coefficient being coded in a current frame is set to the value of retrieved bit L(n−1) of the corresponding previous frame if $$2^{L(n-1)} <= |C| < 2^{(L(n-1)+1)}$$

and the retrieved bit is zero.

4.0 Motion JPEG2000—Noise Related Flicker

As noted above the non-linear quantisation process in MJ2K effectively amplifies the noise in direct proportion to the quantisation step-size. This can cause transitions beyond the transition between significance and insignificance in that noise can cause transitions over more than one bitplane.

Experiments conducted by the inventors suggest that under certain viewing conditions, in an un-coded video sequence of still smooth objects, uniform random noise becomes visible (primarily on the smooth parts of the image) when the noise has a peak value of approximately ±4 grey levels out of 256. However, under the same viewing conditions, in a non-lossless MJ2K encoded version of the same video sequence compressed to 1 bit per pixel, the noise becomes visible (i.e., causes flicker) when the noise has a peak value of ±1 grey level. This illustrates the extreme sensitivity of MJ2K to noise, where any noise (in this case ±1 grey level) can cause visible flicker in the MJ2K encoded sequences. The visibility of the flicker introduced by noise is dependent on the encoded bit rate: the lower the bit-rate the more visible the noise flicker will be. The inventors observed that if the bit rate is low enough to cause even mild artefacts in a single image frame of a video, then the addition of any noise will cause these artefacts to flicker and hence become more visible in the video sequence. This effect means that the visually loss-less bit rate for a video sequence will be higher than the visually loss-less bit-rate for a single image frame in that video. Reducing this flicker will lead to an increase in the quality of some videos at a fixed bit-rate.

A source of perceivable noise in real video footage is sensor noise. Sensor noise in an inevitable side effect of the sampling process and its magnitude is usually inversely proportional to the level of ambient light (i.e., it is far worse in low ambient light conditions). However, noise from other sources can also be present depending on the type of camera being used, e.g., Bayer pattern noise in single sensor cameras, or fixed pattern noise in cameras with CMOS sensors. Sensor noise is generally uncorrelated between frames and therefore sensor noise causes flicker in videos encoded with the default MJ2K encoder.

4.1 Third Arrangement

The third arrangement reduces flicker, and in particular flicker due to non-linear amplification of small changes in the uncompressed video stream in non-lossless MJ2K video streams.

The challenge of this problem is that it is desirable to remove small changes in the wavelet coefficients due to noise while retaining visually important changes due to motion and scene changes. It is impossible in general to distinguish signal from noise without a priori knowledge, so complete removal of the noise is impossible. We present a method of reducing the visually disturbing elements of the noise in the encoded bit-stream while minimising the visual distortion due to the mislabelling of signal as noise.

Within the MJ2K encoding process, each frame of the video undergoes a wavelet transform, is quantised and encoded. At a given bit rate, the quantisation is typically performed in a way that minimises a visual distortion of the decoded image while satisfying the bit-rate constraint. Any application of this technology must identify the bit-rate that provides a visually acceptable decoded video. That is, the bit-rate must be sufficient that the artefacts introduced by the encoding process are small enough that they are deemed acceptable for the purpose of the decoded video. Thus, the selection of the bit-rate determines an acceptable visual distortion for the encoder. This knowledge of the magnitude of an acceptable distortion can be used to smooth noise related flicker in the temporal domain. In essence the smoothing should not introduce a distortion that is greater than that introduced by the quantisation. If a change, δ, in the wavelet coefficients due to quantisation is visually acceptable for the coding of still images, then it is possible to adjust the wavelet coefficients by amounts smaller than this to reduce noise artefacts in the temporal domain.

As noted above, in a default prior art implementation of the MJ2K encoder, each frame of the video is encoded independently using JPEG2000 compression. On the other hand, in the present third arrangement, we wish to smooth the wavelet coefficients prior to coding them. Before the coder is run the final quantisation step size is not known, as it is not determined until after the PCRD-opt algorithm is run. One approach to determining the quantization step size would be to code the unmodified video frame, determine the final quantization step size, and then recode an appropriately smoothed set of wavelet coefficients. A better approach, when coding the video, is to use the block truncation points of the previous frame to infer the quantization step size for the current frame with the assumption that the truncation points will not change much between frames. Use of the PCRD-opt block truncation stabilization techniques discussed above makes this assumption much better than it is without the use of the stabilization technique. Thus, using the PCRD-opt stabilization technique improves the results of the present third arrangement.

To facilitate our description of the third arrangement the following notation is introduced herein to describe the quantisation of the wavelet coefficients. We assume that the wavelet coefficients are normalised to lie within (−1,1) and describe each coefficient using a fixed-point binary representation with N digits of precision. That is, a coefficient C is given by $$C = s \sum_{p=1}^{N} c_p 2^{-p}, \quad (11)$$

where s=±1 is the sign of the coefficient, and $c_p$ denotes the p th binary digit of the fractional part of C. Note that this representation implies an explicit quantization of the real valued wavelet coefficients to a binary fraction with finite precision. Henceforth, when we discuss quantization thresholds, we are not referring to this explicit quantization, but rather to the implicit quantization caused by the truncation of each code-block at a certain bit-plane after the PCRD-opt routine.

The operation of quantising the coefficient C by bit-plane truncation at bit-plane L may be described as an operator Q[C,L] given by $$Q[C, L] = s \sum_{p=1}^{L} c_p 2^{-p}. \quad (12)$$

That is, Q[C,L], is the quantised value of C where only the first L binary digits of C have been kept.

Figure 9:
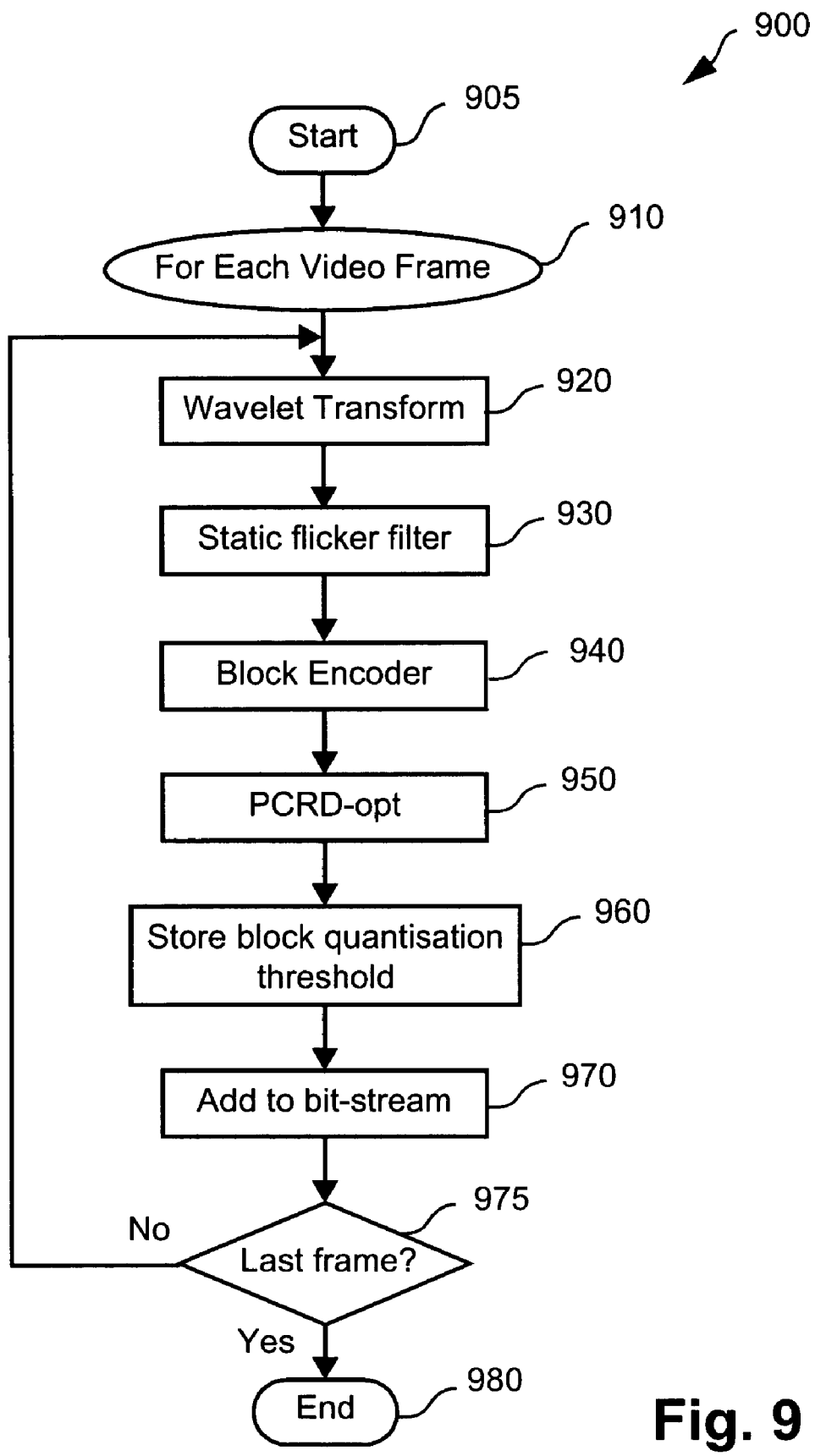
FIG. 9 shows a flow chart of a method of compressing a sequence of frames of a video into Motion JPEG2000 format according to a third arrangement.

Turning now to FIG. 9, there is shown a flow chart of a method 900 of compressing a sequence of frames of a video into Motion JPEG2000 format according to a third arrangement. This method 900 shows how a wavelet coefficient smoothing process 930 in accordance with the present arrangement is implemented within the known MJ2K encoding process. The remaining steps of the method 900 may be implemented in the normal manner in accordance with MJ2K.

The method 900 commences at step 905 where any necessary parameters are initialised, After step 905, the method 900 enters a loop 910 for processing each frame of the video in turn. The loop 910 during a first pass of the loop processes the first frame of the video, and during subsequent passes processes corresponding subsequent frames of the video. After the loop 910 has processed all the frames of the video, the loop 910 exits at step 975 and the method 900 terminates at step 980.

The loop 910, during any current pass, firstly performs a wavelet transform on the corresponding current frame. The loop 910 then proceeds to a static flicker filter step 930, which smooths these wavelet coefficients. After this smoothing step 930, these smoothed coefficients of the current frame are then encoded, at step 940. After the encoding step 940, the PCRD-opt routine is run, at step 950, and the quantization threshold (truncation point) for each code block of the current frame calculated by the PCRD-opt routine is stored in memory, at step 960. The output bit-stream is next constructed for the current frame, at step 970. Afterwards, the loop 910 proceeds to step 975, where a test is made whether or not the current frame is the last frame of the video sequence. If the test reveals the current frame is the last frame, then the method 900 terminates 980. Otherwise, the method 900 returns to step 920 for processing of the next frame in the video sequence.

The quantization threshold for each code block calculated by the PCRD-opt routine that is stored in memory in step 960 may be stored as the threshold value $T=2^{-L}$, or equivalently as the bit-plane truncation depth, L.

Although the representation of the process shown in FIG. 9 is linearly ordered, various schemes for pipelining the MJ2K encoding process exist, and the static flicker filter, 930, can be incorporated in such pipelined architectures.

Figure 10:
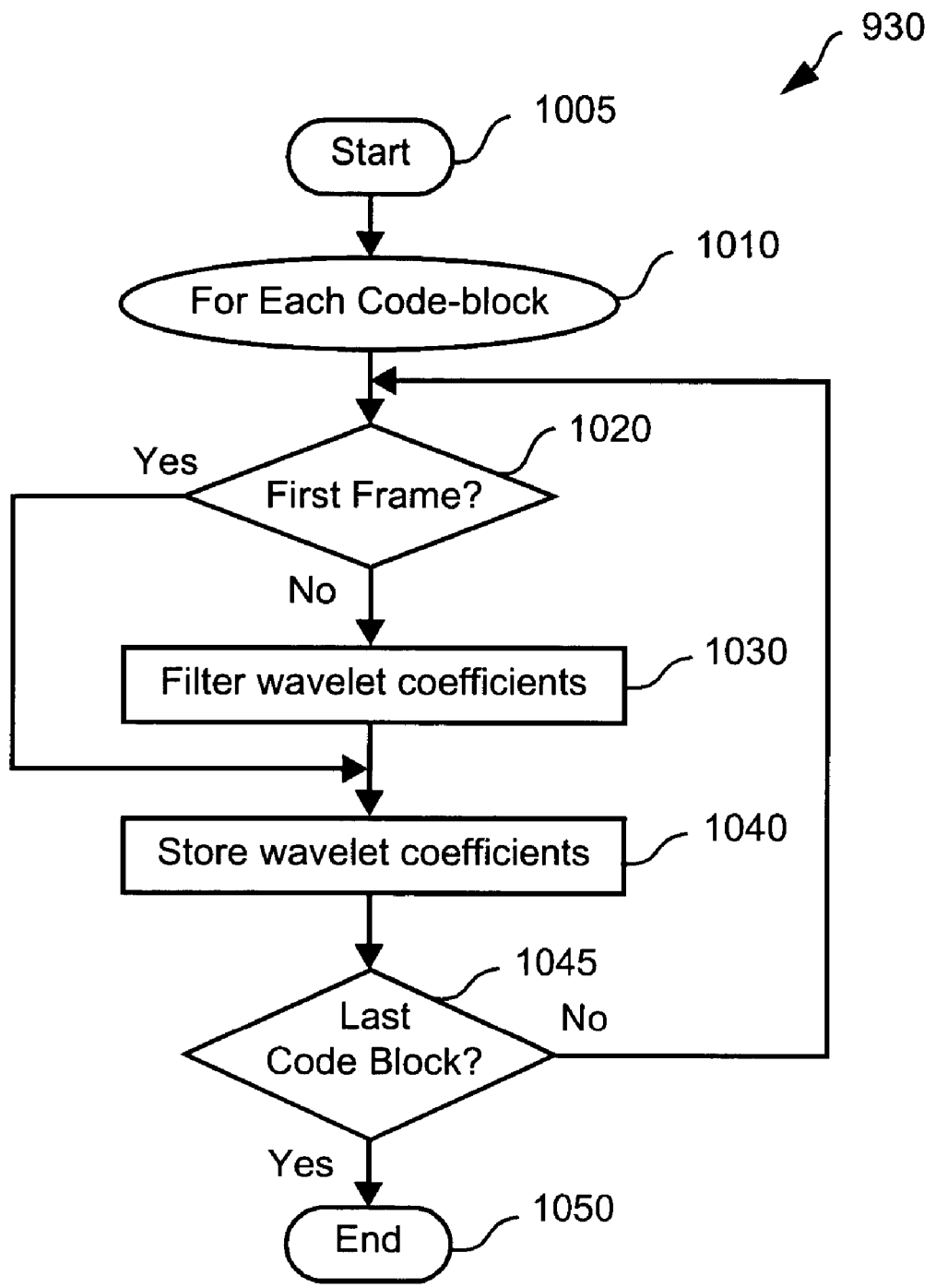
FIG. 10 shows a flow chart of the static flicker filter step 930 for use in the method of FIG. 9 according to the third arrangement.

Turning now to FIG. 10, there is shown a flow chart of the static flicker filter step 930 of FIG. 9 according to the third arrangement. The static flicker filter step 930 commences at step 1005 after the completion of the wavelet transformation step 920.

After commencing at step 1005, the static flicker filter step 930 enters a loop 1010 for processing each code block of the current frame in turn. The loop 1010 processes a first code block during a first pass of the loop, and processes subsequent code blocks during corresponding subsequent passes of the loop. After the loop 1010 has processed the code blocks of the current frame, the loop 1010 exits and the static flicker filter step 930 terminates at step 1050, and the method 900 then proceeds to the encoding step 940.

The loop 1010 initially tests at step 1020 as to whether or not the current frame is the first frame of the video. If the test 1020 reveals that the current frame is not the first frame of the video, then the wavelet coefficients of the current code-block are smoothed, at a next step 1030, based on the coefficients of the same code-block in the previous frame. These modified coefficients are then stored in memory, at step 1040, for use in the next frame. If the test reveals that the current frame is the first frame of the video, the loop 1010 proceeds directly to step 1040, where the wavelet coefficients of the code block are stored without modification. After step 1040, the loop 1010 proceeds to step 1045, where a test is made whether or not the current code block is the last code block in the current frame. If the test reveals the current code block is the last code block in the current frame, then the static flicker filter step 930 terminates 1050. Otherwise, the static flicker filter step 930 returns to step 1020 for processing the next code block.

Figure 11:
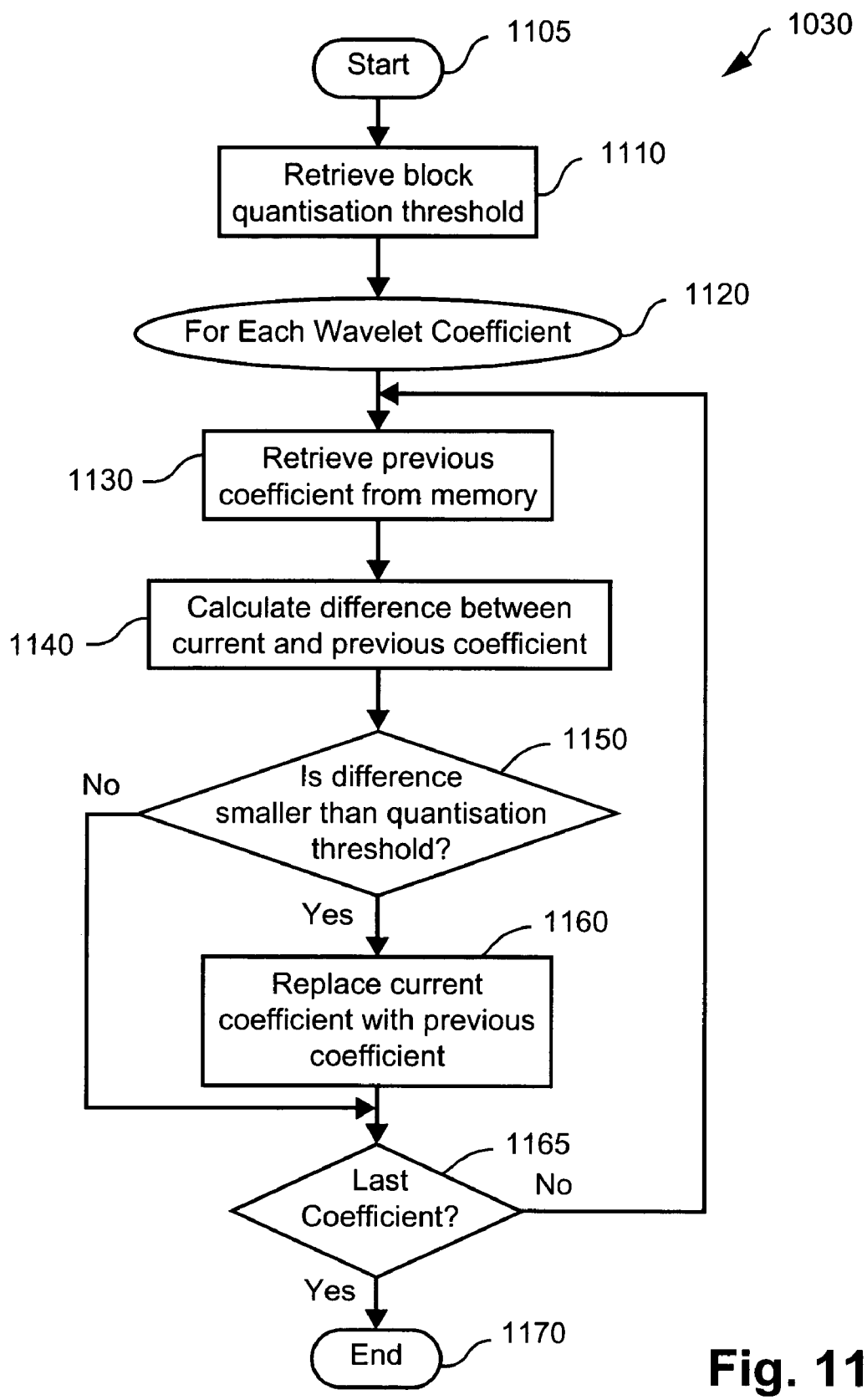
FIG. 11 shows a flow chart of the wavelet coefficient filter step 1030 for use in static flicker filter step of FIG. 10 according to the third arrangement.

Turning now to FIG. 11, there is shown the flow chart of the wavelet coefficient filter step 1030 of FIG. 10 according to the third arrangement. The wavelet coefficient filter step 1030 commences at step 1105 and proceeds to step 1110 where a threshold value, T, is retrieved from main memory. Preferably, T is the block quantization threshold from the previous frame stored in step 960 (FIG. 9). The wavelet coefficient filter step 1030 then enters a loop 1120 for processing each wavelet coefficient in the current code-block of the current frame in turn. The loop 1120 processes a first coefficient during a first pass of the loop, and processes subsequent coefficients during corresponding subsequent passes of the loop.

The loop 1120 during a current pass retrieves at step 1130 a corresponding current wavelet coefficient C from the current code-block of the current frame. The loop 1120 also at step 1130 retrieves the value of the corresponding coefficient P in the previous frame, from main memory, where it was stored in step 1040. The magnitude of the difference between the current coefficient and the previous coefficient, $D=|C-P|$, is then calculated at step 1140. This difference is then compared to the threshold T at step 1150. If this test 1150 reveals that the difference is smaller than the threshold, D<T, then the current coefficient C is replaced at step 1160 with the previous coefficient P, and the loop 1120 proceeds to step 1165. On the other hand if the test reveals that $D \geq T$, then the current coefficient remains unchanged and the loop 1120 proceeds directly to step 1165.

During step 1165, a test is made whether or not there are any more coefficients to be processed from the current code block in the current frame. If the test 1165 reveals there are no more coefficients in the current code block, then the wavelet coefficient filter step 1030 terminates 1170 and the method 900 proceeds to step 1040 (FIG. 10). Otherwise, the wavelet coefficient filter step 1030 returns to step 1130 for processing the next coefficient in the current code block.

Figure 12:
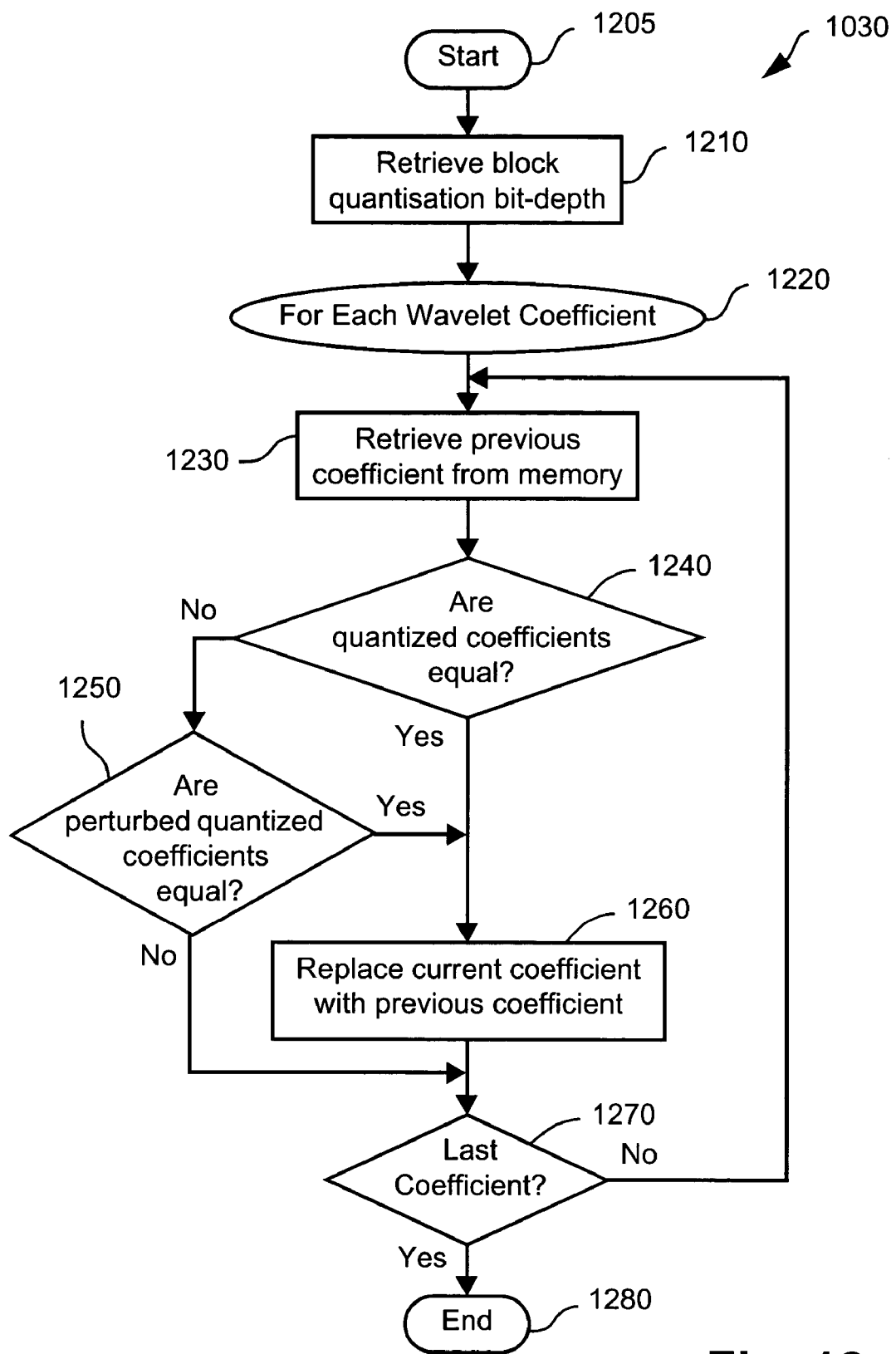
FIG. 12 shows a flow chart of an alternative wavelet coefficient smoothing filter step 1030 for use in the static flicker filter step of FIG. 10 according to the third arrangement.

Turning now to FIG. 12, there is shown a flow chart of an alternative wavelet coefficient smoothing filter step 1030 of FIG. 10 according to the third arrangement. The wavelet coefficient filter step 1030 commences at step 1205 and proceeds to step 1210 where a bit-depth, is retrieved from main memory, L, which is preferably a block quantisation bit-depth which is preferably stored in step 960 (FIG. 9). The wavelet coefficient filter step 1030 then enters a loop 1220 for processing each wavelet coefficient in the current code-block of the current frame in turn. The loop 1220 processes a first coefficient during a first pass of the loop, and processes subsequent coefficients during corresponding subsequent passes of the loop.

The loop 1220 during a current pass retrieves at step 1230 a corresponding current wavelet coefficient C from the current code-block of the current frame. The loop 1220 also at step 1230 retrieves the value of the corresponding coefficient P in the previous frame, from main memory, where it was stored in step 1040. After the retrieval step 1230, the loop 1220 proceeds to step 1240, where a comparison test is made for determining the equality between the quantised values of the current wavelet coefficient and the previous wavelet coefficient. This test 1240 may be expressed as $$Q[C,L]=Q[P,L] \qquad (13)$$

according to the notation introduced in equation (12). If the test 1240 reveals that the quantised coefficients are equal, then the loop 1220 proceeds to step 1260, where current coefficient is replaced by the previous coefficient. On the other hand, if the test 1240 reveals that the quantised coefficients are not equal, the loop 1220 proceeds to step 1250. During step 1250 a further comparison is made, determining if a small perturbation, of magnitude δ, of the value of the current wavelet coefficient makes its quantized value the same as the quantized value of the previous wavelet coefficient $$Q[C+\delta,L]=Q[P,L] \text{ or,}$$

$$Q[C-\delta,L]=Q[P,L]. \qquad (14)$$

Preferably the magnitude of the perturbation is related to the block-truncation threshold by $$\delta=2^{L-1}=T/2. \qquad (15)$$

If the further comparison, 1250, shows that a perturbation of the current wavelet coefficient results in a quantised value equal to the quantised value of the previous coefficient, then the current coefficient is replaced by the previous coefficient at step 1260, and the loop then proceeds to step 1270. On the other hand, if test 1250 is not true then the current coefficient remains unchanged and the loop proceeds to step 1270.

During step 1270, a test is made whether or not there are any more coefficients to be processed in the current code block in the current frame. If the test 1270 reveals there are no more coefficients in the current code block, then the wavelet coefficient filter step 1030 terminates 1280 and the method 900 proceeds to step 1040 (FIG. 10). Otherwise, the wavelet coefficient filter step 1030 returns to step 1230 for processing the next coefficient in the current code block.

The techniques used above to implement the wavelet coefficient smoothing process, 1030, do not take into account the fact that generally the magnitude of the noise is limited to a certain value due to the nature of the recording process. For example, the noise may have a characteristic amplitude that depends on the lighting conditions under which the video is taken. A further variation is realised by the camera supplying to the encoder a parameter that describes the magnitude of the noise, then either the threshold, 1110, or the bit-plane quantisation level, 1210, could be limited to this magnitude. The inventors have determined that if this information relating to the magnitude of the noise is available to the encoder, then limiting these thresholds reduces the number of unwanted motion artefacts produced by the smoothing, especially in the lowest levels of the wavelet transform where the quantisation threshold is largest.

In step 1040 of the above procedure, the possibly modified wavelet coefficient is stored. This coefficient could have originated from a much earlier frame than just the previous frame and may have been copied across over many consecutive frames. One variation of this method would be to store the unmodified wavelet coefficient rather than the possibly modified coefficient. This would lead to a smaller reduction in flicker but would still improve the video quality. Further variations would involve storing more than one frame's wavelet coefficients to use in the smoothing process or storing both the unmodified and possibly modified coefficients for use in the smoothing. Each extra frame that is stored could improve the quality of the output video at the expense of extra storage. For more frames more sophisticated low-pass filtering can be used.

A further variation on this method that could decrease the storage requirements would be not to store the entire wavelet coefficient in step 1040, but only to store zero or more bits of precision than that coded in the output stream. The stored wavelet coefficients may themselves be compressed. In this case the comparisons in steps 1150, 1240 and 1250 could still be carried out sufficiently accurately, but with a reduced memory requirement for the encoder. The wavelet coefficients are preferably compressed in sub-blocks of code-blocks. Each compressed sub-block comprises a number representing the number of significant bit-planes, and then the given number of bit-planes are stored, along with a sign bit for each non-zero coefficient.

One further thing to note is that due to the 3 passes per bitplane employed in the JPEG2000 encoder, it is not always possible to determine what the exact quantisation step size is for a given wavelet coefficient just from the pass at which it was truncated. If a bitplane is truncated after a significance propagation pass, certain coefficients within the block will have been coded in that significance propagation pass, while other will not have been coded until either the magnitude refinement pass or the cleanup pass which are not included in the bit stream. So, the quantisation threshold for two coefficients within the same code block may differ by a factor of two. This difficulty can be mitigated by storing a flag for each wavelet coefficient that says whether its value was encoded in the last bit-plane or not. The threshold used in the comparisons in steps 1150, 1240 and 1250 could then be adjusted for this correction on a per wavelet coefficient basis. If the last sub-bit-plane encoded for the current block is on bit-plane L and a given wavelet coefficient was not included in the last bit-plane, then steps 1150, 1240 and 1250 are performed with a threshold based on L−1 rather than L. The inventors consider that the improvement to the visual quality of the encoded video due to this refinement of the smoothing process is not worth the extra storage and processing requirements required to implement it, though it may be implemented as an extension to the current arrangement.

Preferably, the DWT smoothing process is applied to all coefficients in all code blocks of the current frame. Alternatively, the method 500 may filter only those DWT coefficients of a predetermined limited selection of code blocks of the current frame, while the DWT coefficients of the remaining code blocks are not filtered. For example, the filter step 930 may be limited to coefficients of the code blocks of the level 1 subband coefficients, while the coefficients of the remaining code blocks are not filtered. In another example, the filter step 930 is limited to the code blocks of the level 1, 2, and 3 subband coefficients.

5.0 Motion JPEG2000—Ringing Flicker

Visual artefacts in compressed images take on a variety of forms that generally reflect the underlying transform used to form a compact representation of the image. For instance, in block discrete cosine transform based image compression schemes such as JPEG, the visual artefacts in compressed images take characteristic forms such as block artefacts where the block boundaries become visible, and a lack of sharpness in edges in the image. In JPEG2000 compression, the visual artefacts introduced by compression reflect the fact that a discrete wavelet transform is used in the compression algorithm. For instance, the visual artefacts due to compression can vary in size over an order of magnitude due to the multi-resolution nature of the DWT. The property of the DWT and its associated unwanted visual artefacts that the inventors wish to emphasize here is its translation sensitivity. The wavelet coefficients that represent an image or part of an image and the wavelet coefficients that represent a translated version of this image or part of an image can be very different. This means that the wavelet artefacts introduced in compressing an image and a translated version of the image can also be very different. In the context of still image compression, this is not a very important issue. However, in the case of video compression, where capturing motion is often the very purpose of video, and small translations of objects between frames abound, such changes in compression artefacts can be very noticeable and can be a great disadvantage.

Figure 13A:
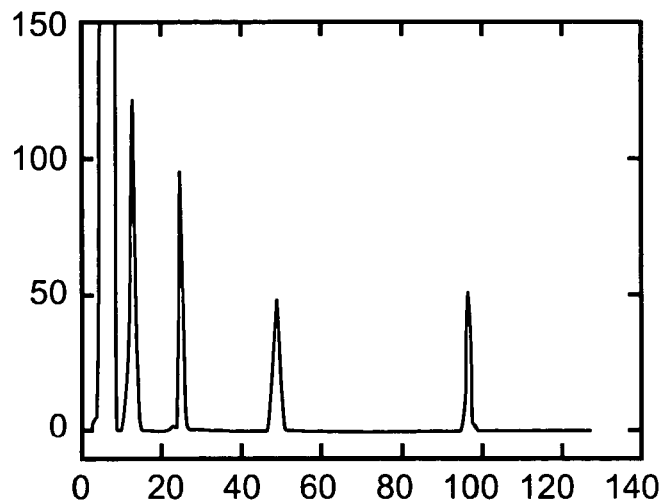
FIGS. 13A, 13B, 13C illustrates the magnitude of the DWT coefficients of a 1-dimensional edge moved a single coefficient to the left in each frame, in accordance with the prior art Motion JPEG2000 standard.
Figure 13B:
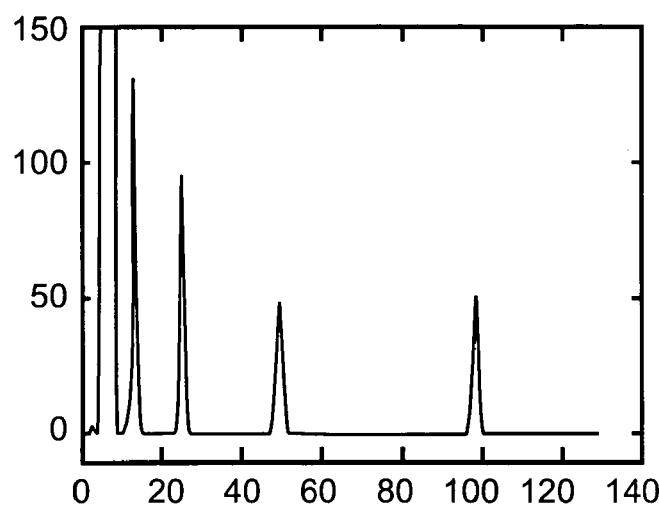
Figure 13C:
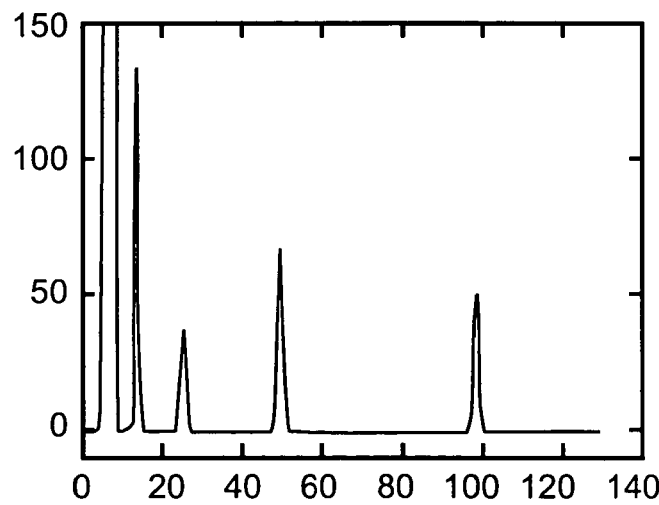
Figure 14A:
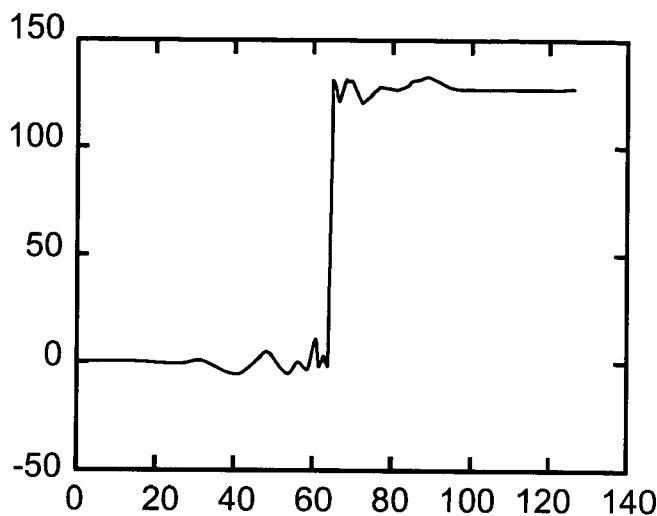
FIGS. 14A, 14B, 14C illustrates the reconstructed edges from coefficients in respective FIGS. 13A, 13B, 13C after dead-zone quantisation, in accordance with the prior art Motion JPEG2000 standard.
Figure 14B:
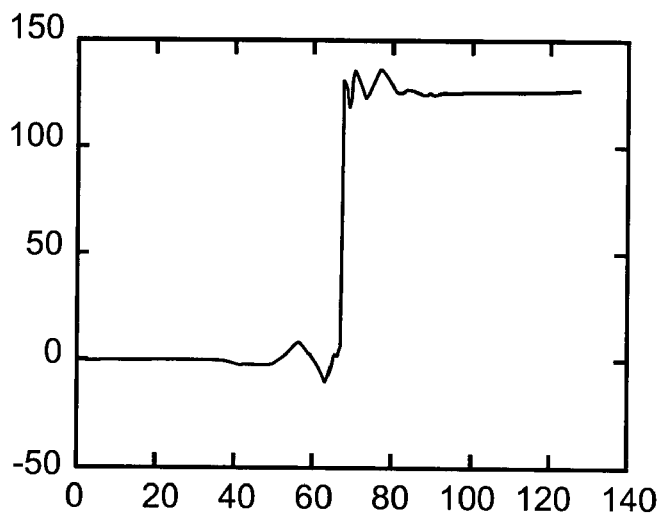
Figure 14C:
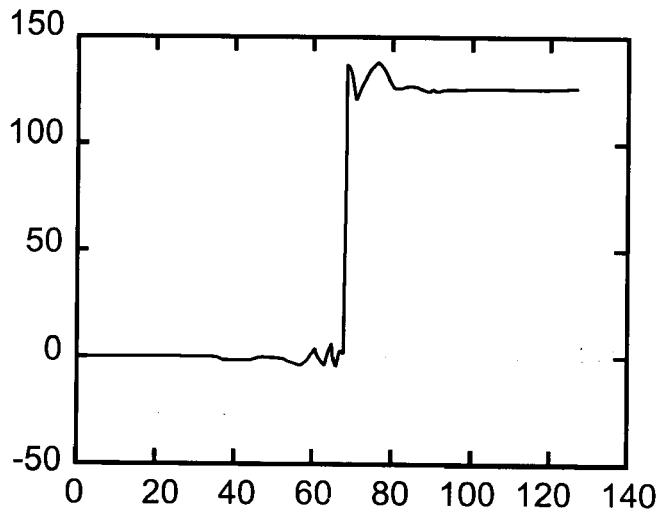

FIGS. 13A, 13B, and 13C and FIGS. 14A, 14B, and 14C demonstrate an effect that is illustrative of this point. FIGS. 13A, 13B, 13C illustrates the magnitude of DWT coefficients of a 1-dimensional edge moved a single bit symbol to the left in each frame respectively, in accordance with the prior art Motion JPEG2000 standard. More specifically, FIGS. 13A, 13B, and 13C shows the magnitude of three sets of DWT coefficients that are the 1 dimensional, 4 level, DWTs of a step function (edge) moved to the right at one bit symbol per frame. A comparison of FIGS. 13A, 13B, and 13C demonstrates the translation variance of the DWT, where small translations of the input signal produce (potentially large) non-translation differences in the wavelet coefficients. FIGS. 14A, 14B, and 14C illustrate the reconstructed edges from coefficients in the respective FIGS. 13A, 13B, 13C after dead-zone quantisation, in accordance with the prior art Motion JPEG2000 standard. More specifically, FIGS. 14A, 14B, and 14C show the edge in respective frames that would be reconstructed from the respective sets of coefficients in FIGS. 13A, 13B, and 13C after the coefficients had been quantized to a certain quantization threshold. This quantization mimics the compression process used in JPEG2000. Each frame illustrated in FIGS. 14A, B, and C shows a certain set of compression artefacts known as ringing artefacts. An important point to note here is that the compression artefacts in each frame are substantially different, and have no obvious simple relation between them.

In relation to image compression, this means that the magnitude of the DWT coefficients of an image feature, such as an edge, will vary in an unpredictable manner when the image feature moves in the input video sequence. This variation means that different coefficients will be above or below the quantisation threshold in subsequent frames of the video and so will be coded to different bit-depths (or not coded at all) in subsequent frames. The outcome of this variation is that the compression artefacts associated with the quantization process will vary in each frame, thus giving them an increased visibility compared to their stationary counterparts (as they are seen to flicker).

This ringing flicker, as it will be termed here, increases the bit-rate necessary to code a video sequence in a visually loss-less way. Consequently, ameliorating this problem of ringing flicker may produce a visually improved video at a fixed bit-rate, or allow a greater compression to be achieved for the same visual quality.

5.1 Fourth Arrangement

The inventors have determined through experimentation that the problem of ringing flicker is most evident in smooth areas of a video near moving edges. A possible explanation for this is described above with reference to FIGS. 13A, 13B, and 13C and 14A, 14B, and 14C. Further noise tends to be more visually perceptible in smooth areas. Thus varying (flickering) noise tends to be particularly visible in smooth areas near moving edges.

At a fixed bit-rate, the block truncation points for a JPEG2000 code-stream may be determined by the PCRD-opt routine. This routine will allocate a certain budget of bits to a block based on the approximate distortion caused in the final image by truncation of the block at that bit-plane. In a default prior art implementation, JPEG2000 determines the approximate distortion for a block through weighted mean square error (WMSE) estimate. However, a JPEG2000 encoder is free to use any distortion metric it chooses as long as the distortion (or change in distortion) can be calculated for each code-block individually and the measure is additive across the code-blocks. A JPEG2000 decoder does not need to know what distortion metric was used to form a bit-stream, just that the bit stream has valid syntax and progression order. Therefore, the inventors propose that utilising a distortion metric that favours either strong edges or moving edges next to smooth regions (i.e., increasing the distortion in these areas so that more coding passes are included in the final bit-stream) reduces one source of inter-frame flicker in MJ2K, namely the ringing flicker artefacts.

This change in the distortion measure does not come without cost—encoding smooth regions around edges with a higher precision means that there are less bits available for coding busy regions. While this may be visually more appealing there is a trade-off between reducing edge flicker artefacts and the visual quality of the busy regions of the image.

A noted above, a default JPEG2000 method of calculating the distortion measure for a block is to calculate the weighted mean square error caused in the decoded image through the truncation of the block at the end of each sub-pass in the code-stream. If the image to be encoded is a N by M single channel image and the original image samples are denoted $O_{ij}$ and the reconstructed image samples are denoted $R_{ij}$ then the MSE is defined by $$MSE = \frac{1}{NM} \sum_{i=0}^{N-1} \sum_{j=0}^{M-1} (O_{ij} - R_{ij})^2. \tag{16}$$

Rather than decompressing the image multiple times to measure the MSE, the MSE is generally approximated by measuring the mean squared error on a per code-block basis, and summing the mean squared errors of each code block individually. That is $$MSE \approx \sum_{b=0}^{N_{blocks}-1} D_b, \tag{17}$$

where $D_b$ is a measure of the contribution to the mean squared error in the decoded image from block b. This is in turn approximated by calculating the mean squared error in the truncated wavelet coefficients compared to the unmodified coefficients in the block and scaling this by the energy of the wavelet synthesis basis vectors for the sub-band in which the block lies. That is, if $C_{ij}$ are the truncated wavelet coefficients of block b and $D_{ij}$ are the original wavelet coefficients of block b, and $X_b$ denotes the energy of the wavelet synthesis vector of the sub-band in which block b lies, then $$D_b = X_b \sum_{i=0}^{S_b-1} \sum_{j=0}^{S_b-1} (C_{ij} - D_{ij})^2 \tag{18}$$

where $S_b$ is the dimension of the (square) block.

A standard technique in J2K encoding is to perform visual weighting of the block distortion measure, whereby the distortion of a block is weighted according to the sub-band and wavelet decomposition level on which it lies. Thus, equation (17) becomes, $$MSE \approx \sum_{b=0}^{N_{blocks}-1} W_b D_b, \tag{19}$$

where $W_b$ is the block weighting coefficient which depends on the block sub-band and wavelet level and is commonly determined through visual experiments.

There has been a fair amount of research into the inclusion of visual masking effects into the distortion metric used in JPEG2000. However, these methods have not been targeted at image sequences, so have no temporal component, and also have used a conventional definition of visual masking that weights coefficients based purely on their magnitude (or magnitude in a neighbourhood). For example, the conventional MSE distortion for a block, $D_b$, may be modified by the masking in a local neighbourhood:

$$D'_b = \frac{D_b}{M_b}, \tag{20}$$

where the local masking threshold, $M_b$, is estimated by a non-linear (usually square root) summation of the magnitude of the coefficients in a local neighbourhood:

$$M_b = A \cdot \sum_{i=0}^{S_b-1} \sum_{j=0}^{S_b-1} \sqrt{|C_{ij}|}. \tag{21}$$

Here, $M_b$, may be calculated on non-overlapping (8 by 8) sub-blocks within each code-block and A is an arbitrary scaling constant.

The fourth arrangement significantly generalizes such approaches by extending the masking analysis to the time domain to produce masking techniques appropriate for video, and by presenting two masking techniques designed to reduce ringing flicker.

In principle, the distortion may be modified in any way, as it does not affect the decoding procedure at all. If the method chosen models the human visual system's perception of distortion then a visually pleasing image sequence is likely to result. The WMSE measure used in JPEG2000 does not model the fact that quantisation of the wavelet coefficients in smooth regions (e.g. flat regions) next to moving edges represent a greater visual distortion than the same changes would in a busy region of the image. To reduce this problem, the present fourth arrangement weights the distortion based on the temporal and spatial nature of the image. In particular, if the region of the image that is being coded contains smooth regions (e.g. flat regions) next to edges then the visual distortion is modified in such a way as to generally increase the coded bit depth in these areas.

Figure 15:
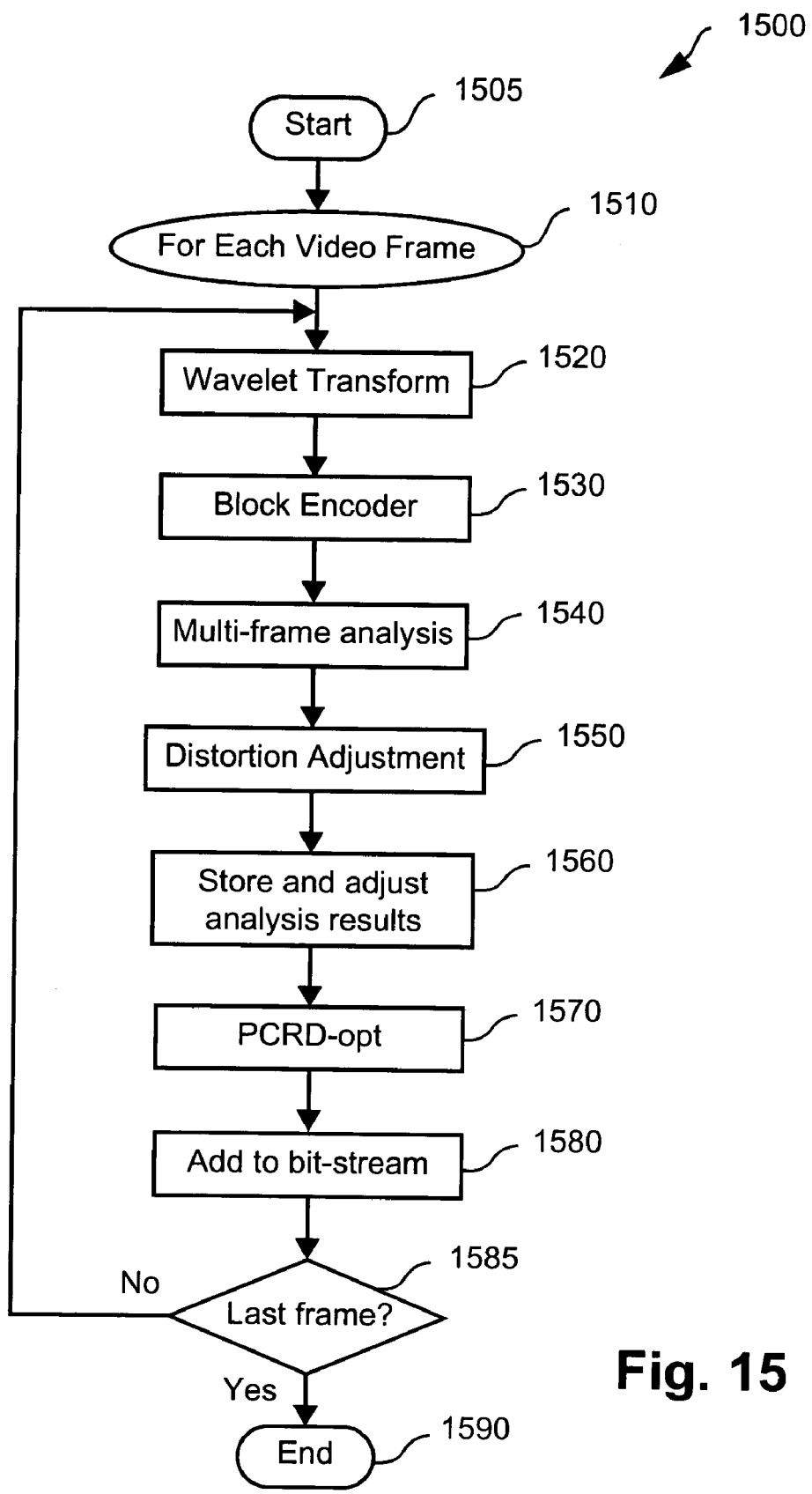
FIG. 15 shows a flow chart of a method of compressing a sequence of frames of a video into Motion JPEG2000 format according to a fourth arrangement.

Turning now to FIG. 15, there is shown a flow chart of a method 1500 of compressing a sequence of frames of a video into Motion JPEG2000 format according to a fourth arrangement. This method shows a simplified structure of a modified MJ2K encoding method. This method is an improvement over the MJ2K encoding method in that it includes a number of steps 1540, 1550, 1560 for reducing the aforementioned flicker. The remaining steps of the method 1500 may be implemented in the normal manner in accordance with MJ2K. It will become apparent, that the exact sequence of steps as shown in FIG. 15 is not important, and other sequences of these steps are possible, and in particular a pipelined approach is possible.

The method 1500 commences at step 1505 where any necessary parameters are initialised. After step 1505, the method 1500 enters a loop 1510 for processing each frame of the video in turn. The loop 1510 during a first pass of the loop processes the first frame of the video, and during subsequent passes processes corresponding subsequent frames of the video. After the loop 1510 has processed all the frames of the video, the loop 1510 exits at step 1585 and the method 1500 terminates at step 1590.

The loop 1510, during any current pass, firstly performs at step 1520 a wavelet transform on a corresponding current frame. The loop 1510 then block encodes at step 1530 the wavelet coefficients of the transform of the current frame, wherein an unmodified distortion measure for each code block of the current frame is also calculated. The loop 1510 then performs a multi-frame analysis step 1540 on the current frame and previous frame.

This multi-frame analysis step 1540 identifies those regions of the current frame that must be coded more faithfully to reduce the ringing flicker. The multi-frame analysis step 1540 can either be performed in the spatial domain or alternatively in the DWT domain. If the analysis is performed in the spatial domain, then the analysis can be performed prior to (or independently of) the DWT in Step 1520. On the other hand, if the multi-analysis step 1540 is performed in the DWT domain, then the analysis can be performed after the DWT in step 1520.

In the step 1550 the distortion of each block of the current frame is modified based on the results of the multi-frame analysis step 1540. The term distortion of a block as used herein refers to the set of distortion measures corresponding to each sub-pass of the code block. In the next step 1560, data obtained from multi-frame analysis step 1540 that is to be used in the analysis of the next frame is then stored in memory. In a variation of this fourth arrangement, this data can be adjusted before storing, which will be described in more detail below. After step 1560, the loop 1510 then performs at step 1570 the PCRD-opt routine on the encoded blocks of the current frame using the modified set of distortion values determined in step 1550 to determine the truncation points. The loop 1510 then adds at step 1580 the truncated encoded blocks of the current frame to the bitstream. After step 1580, the loop 1510 proceeds to step 1585, where a test is made whether or not the current frame is the last frame of the video sequence. If the test reveals the current frame is the last frame, then the method 1500 terminates 1590. Otherwise, the method 1500 returns to step 1520 for processing of the next frame in the video sequence.

Figure 16:
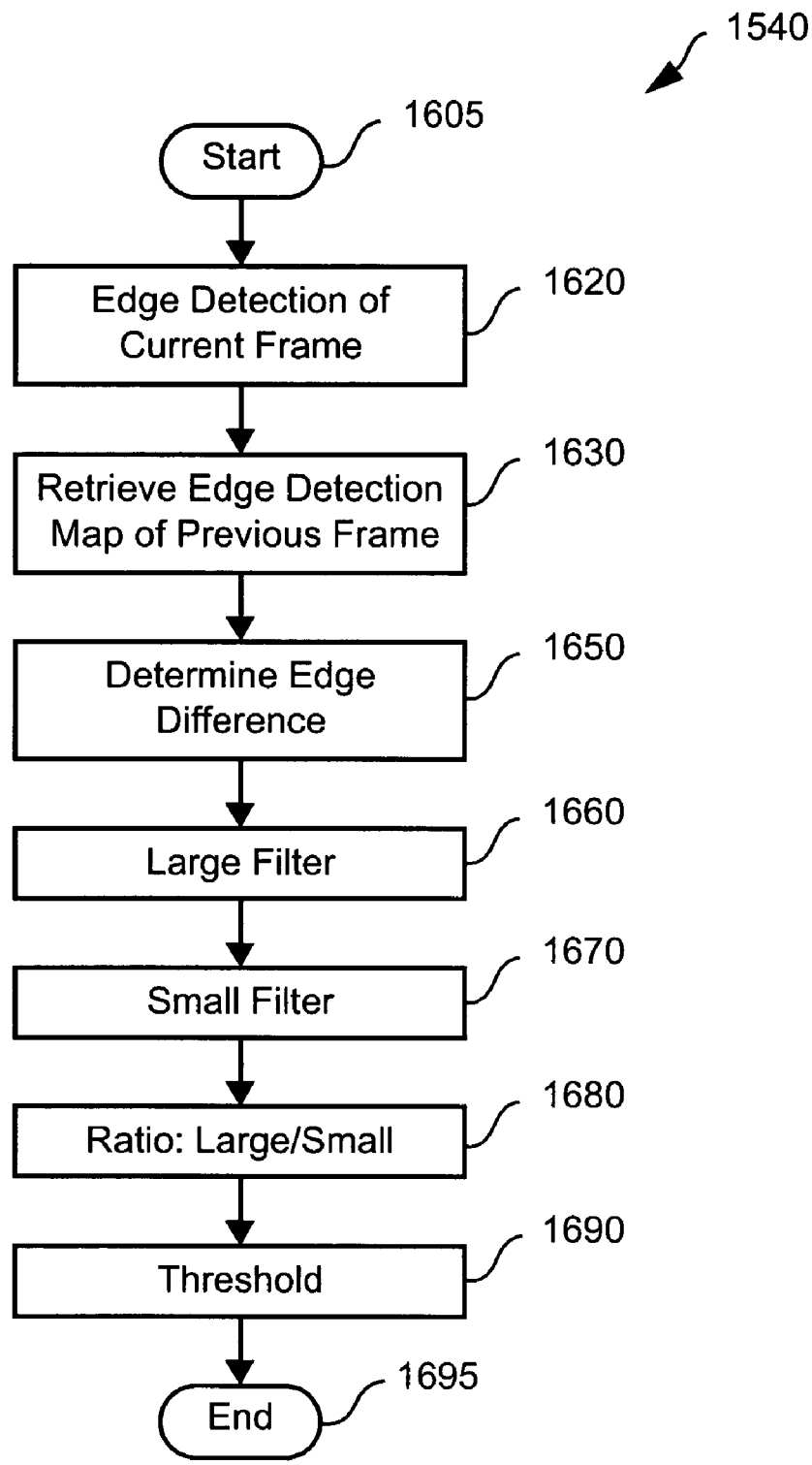
FIG. 16 shows a flow chart of the multi-frame analysis step 1540 for use in the method of FIG. 15 according to the fourth arrangement.

Turning now to FIG. 16, there is shown in more detail the flow chart of the multi-frame analysis step 1540 in FIG. 15 according to the fourth arrangement. This particular multi-frame analysis step, 1540 operates in the spatial domain in that it involves analysis of the pixels of the frames. Thus, the current frame of pixels is preferably buffered for its subsequent processing during the multi-analysis step 1540. The multi-analysis step 1540 commences at step 1600 and then proceeds to step 1620, where the current frame is then edge detected, 1620. The edge detection process used is preferably a simple differencing of vertically and horizontally adjacent pixels in the intensity channel, $Y_{ij}$, of the frame, $$E_{ij}=(Y_{ij}-Y_{i+1,j})^2+(Y_{ij}-Y_{i,j+1})^2. \tag{22}$$

After step 1620, the multi-analysis step 1540 then proceeds to step 1630, where edge detection of the previous frame is retrieved from main memory where it was stored after generation during the processing of the previous frame. Alternately, a similar edge detection process may be directly applied to the previous frame. After the edge detections are generated, the difference between the two edge maps is taken, at step 1650, through the operation $$D_{ij}=|E_{ij}^{(current)}-E_{ij}^{(previous)}| \tag{23}$$

This produces a map of the edges that have moved between the frames. This moving edge map is then filtered over two different scales, using a large scale filter, at step 1660, and a small scale filter, at step 1670. Preferably, the large-scale filter used is a 19 by 19 box filter, and the small-scale filter is a 9 by 9 box filter. These filtering operations may be denoted $$F_{ij}^{large}=D_{ij}*B_{19}$$

and $$F_{ij}^{small}=D_{ij}*B_9 \tag{24}$$

where * denotes the convolution operation and $B_x$ denotes an x by x box filter.

After these filtering operations 1660 and 1670 have been completed, a ratio of these two filtered moving edge maps is taken, at step 1680, where the result of the large filter is divided by the result of the small filter in accordance with:

$$M_{ij}=\frac{F_{ij}^{large}}{F_{ij}^{small}}. \tag{25}$$

This produces a mask that is large in smooth regions (e.g. flat regions) near moving edges and small in busy regions. This mask is then thresholded at step 1690, where 1.0 replaces any value of the mask less than 1.4. This mask is then used in the distortion adjustment procedure, 1550. After step 1690, the multi-frame analysis step 1540 is completed and the method 1500 proceeds to step 1550.

Figure 17:
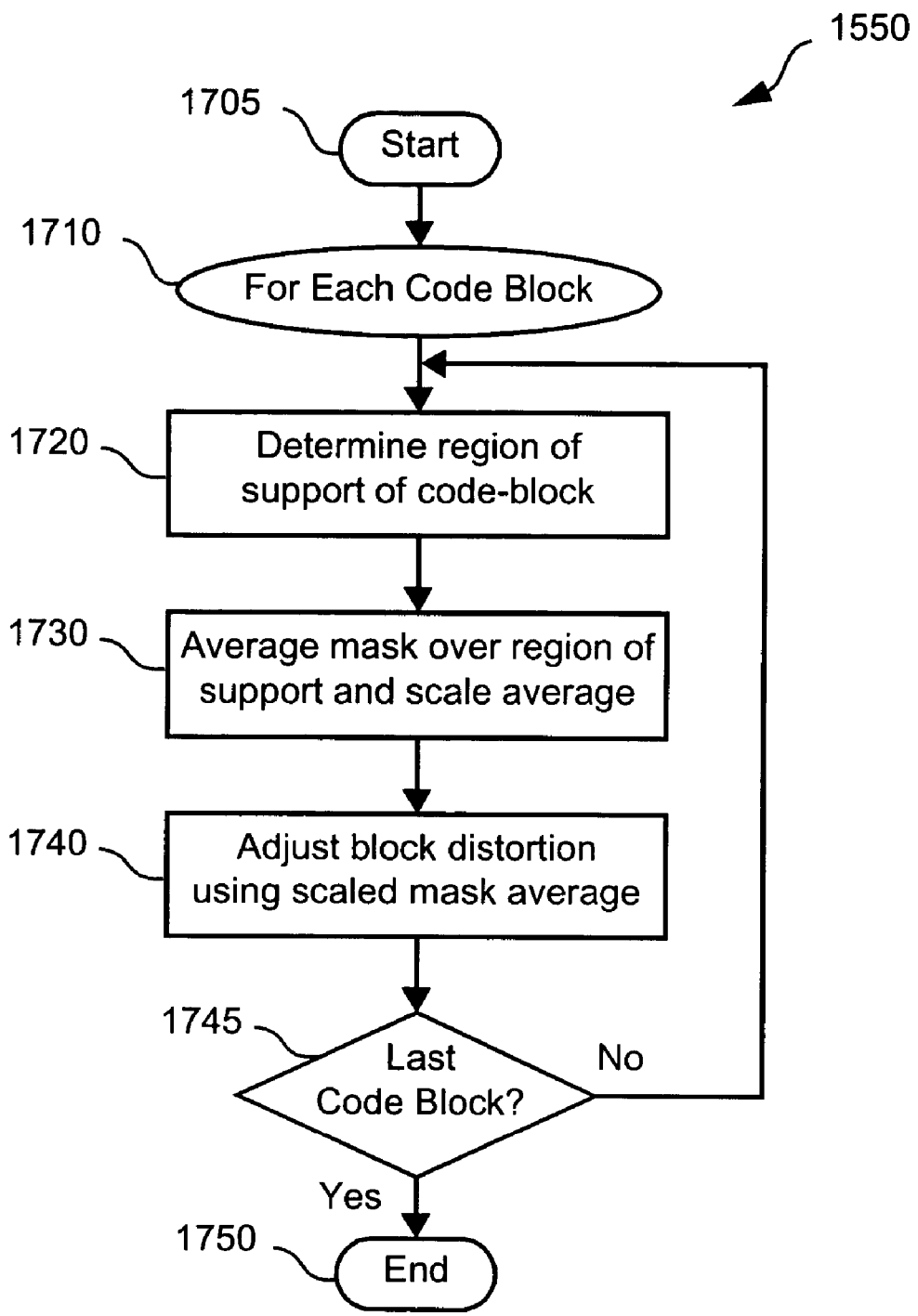
FIG. 17 shows a flow chart of the distortion adjustment step 1550 for use in the method of FIG. 15 according to the fourth arrangement.

FIG. 17 shows a flow chart of the distortion adjustment step 1550 in FIG. 15 according to the fourth arrangement in more detail. As mentioned previously, the method 1500 operates in the spatial domain in that it involves analysis of the frames that enter the encoder before the wavelet transform is performed.

The distortion adjustment procedure, 1550, commences at step 1705 and then enters a loop 1710 for processing each code block of the current frame in turn. The loop 1710 processes a first code block during a first pass of the loop, and processes subsequent code blocks during corresponding subsequent passes of the loop. After the loop 1710 has processed all the code blocks of the current frame, the loop 1710 exits at 1745 and the distortion adjustment step 1550 terminates at step 1750, and the method 1500 then proceeds to the storing step 1560.

The loop 1710 during any current pass firstly determines at step 1720 a region of support for the corresponding current code block. Each code-block has a region of support in the spatial domain where changes in that region lead to changes in the wavelet coefficients that are encoded in that code block. Preferably the region of support is approximated as follows. For the case of a N by M code block that lies at $(n_0, m_0)$ in a sub-band which is X by Y samples in dimension from a image component that is H pixels wide and V pixels high, the region of support may be specified as a rectangle from $$(i_0, j_0) = \left( \left\lceil \frac{n_0}{X} H \right\rceil, \left\lceil \frac{m_0}{Y} V \right\rceil \right) \quad (26)$$

to $$(i_1, j_1) = \left( \left\lceil \frac{N + n_0}{X} H \right\rceil, \left\lceil \frac{M + m_0}{Y} V \right\rceil \right).$$

After completion of step 1720, the loop 1710 proceeds to step 1730. In step 1730, the mask generated in step 1520 (FIG. 16) is averaged over the region of support for the current code block that was determined in step 1720. The average is performed through $$A_b = \frac{1}{(i_1 - i_0)(j_1 - j_0)} \sum_{i=i_0}^{i_1-1} \sum_{j=j_0}^{j_1-1} M_{ij} \quad (27)$$

and scaled to produce the final masking value $$M_b = A_b^\alpha \quad (28)$$

where α is an exponential scaling factor. The inventors have determined that α=3 or 4 produces visually pleasing results. After completion of step 1730, the loop proceeds to step 1740. In step 1740 the block distortion measures for the current code block are modified by this mask value through $$D'_b = D_b M_b. \quad (29)$$

Preferably step 1560 in the main routine 1500, where analysis results are stored for later processing, is used to store the coefficients of the edge mask for the current frame, $E_{ij}$, for use in the next frame's mask generation procedure.

Figure 18:
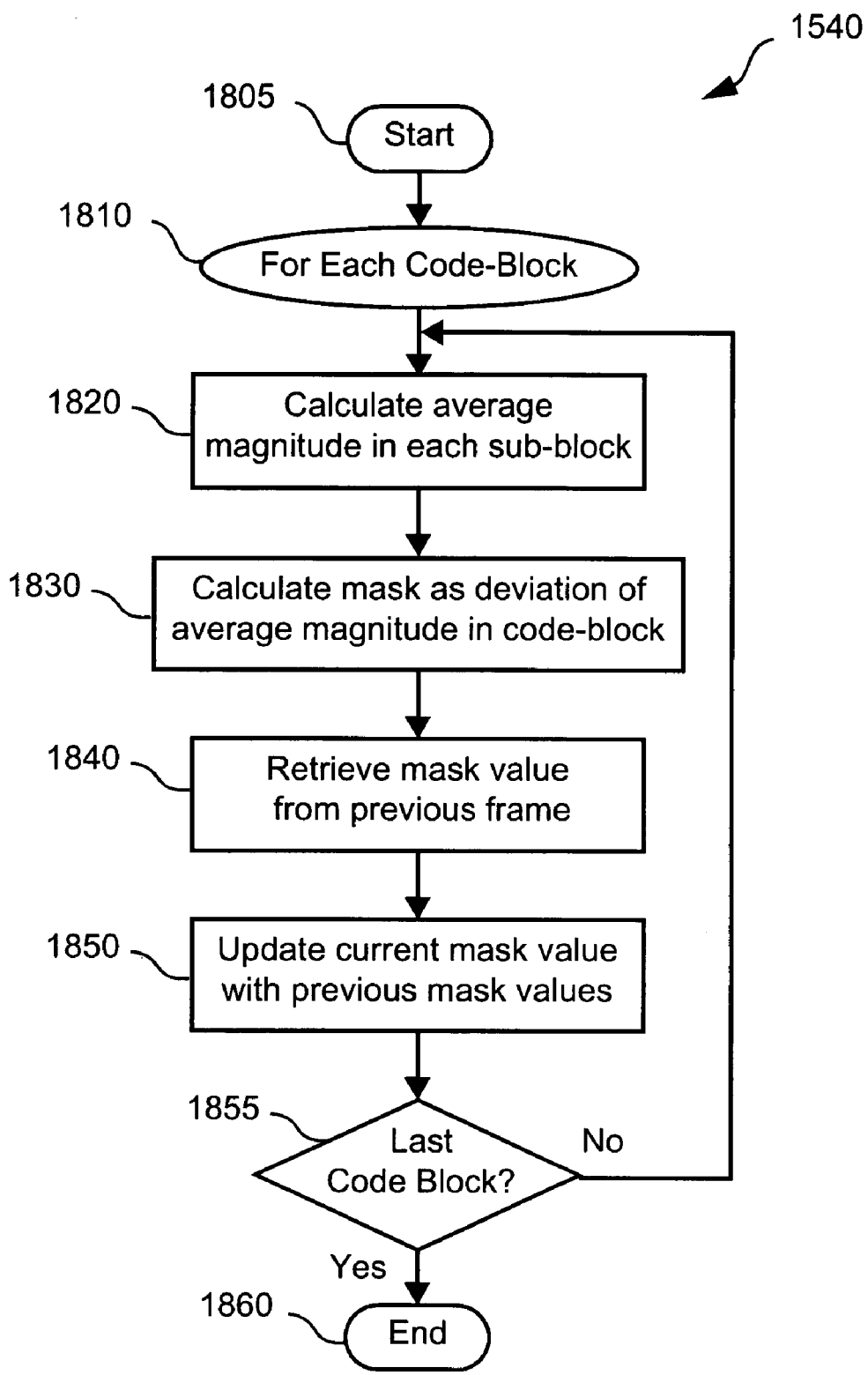
FIG. 18 shows a flow chart of an alternative multi-frame analysis step 1540 for use in the method of FIG. 15 according to the fourth arrangement.

Turning now to FIG. 18, there is shown a flow chart of an alternate multi-frame analysis step 1540 in FIG. 15 according to the fourth arrangement. In this arrangement, the analysis is performed in the wavelet domain, and the temporal and spatial analysis of the multi-frame analysis step 1540 is done on a per code-block basis rather than a per frame basis. Thus in this alternate arrangement, the code blocks of wavelet coefficients are preferably buffered for subsequent processing during the multi-frame analysis step 1540.

The alternate multi-frame analysis step 1540 commences at step 1805 and then enters a loop 1810 for processing each code block of the current frame in turn. The loop 1810 processes a first code block during a first pass of the loop, and processes subsequent code blocks during corresponding subsequent passes of the loop. After the loop 1810 has processed all the code blocks of the current frame, the loop 1810 exits at 1855 and the multi-frame analysis step 1520 terminates at step 1860, and the method 1500 then proceeds to the block encoding step 1540.

The loop 1810 during any current pass firstly sub-divides during step 1820 the corresponding current code block into a number of sub-blocks. The current code block is divided into $N_s$ by $N_s$ sub-blocks, where $N_s$=4 or 8 is preferable. Also during step 1820, the average magnitude of the wavelet coefficients in each sub-block of the current code block is calculated, through $$A_s = \frac{1}{N_s^2} \sum_S |C_{ij}|. \quad (30)$$

A masking value for the current code block of the current frame, $M_b$, is then calculated, at step 1830, as the deviation of the sub-block averages, through $$M_b = B - \min\left[B, f\left(\underset{s}{Dev} A_s\right)\right] \quad (31)$$

where B is a constant, f is a non-linear scaling function which emphasises larger values, and Dev is a deviation measure. Preferably, B=255, $f(x)=x^{1.4}$, and Dev is the inter-quartile range. In this way, code-blocks that contain predominantly similar coefficients have their distortions decreased and are therefore are preferentially excluded from the bit-stream.

Next, the masking value for the corresponding code block generated in the previous frame, $M'_{(prev)}$, is then retrieved from memory, at step 1840, and then the final masking value for the current code block is updated, at step 1850, through the use of an auto-regressive temporal masking filter, $$M'_b = \alpha \cdot M_b + (1-\alpha) \cdot M'_{(prev)} \quad (32)$$

where α=0.25, so as to produce a low-pass filter with unity gain in the pass band. This updated masking value is stored in memory for use during the processing of the next frame.

After the completion of step 1850, the loop 1810 proceeds to step 1855, where a test is made whether or not the current code block is the last code block to be processed. If the test reveals the current code block is the last code block, then the multi-frame analysis step 1540 terminates 1860 and the method proceeds to the distortion adjustment step 1550. Otherwise, the method 1500 returns to step 1820 for processing of the next frame in the video sequence.

In this alternate arrangement, the block distortion adjustment step, 1550, takes the form of, where the distortion measures of the current code block are adjusted by $$D'_b = \frac{D_b}{1 + M'_b}. \quad (33)$$

In this alternative arrangement, if the code-block size is 32 by 32 the sub-blocks are preferably 8 by 8, whereas if the code-block size is 16 by 16 then the sub-blocks are preferably 4 by 4. Therefore, there are 16 sub-blocks in both cases and the inter-quartile range within a code-block is always calculated as the difference between the average magnitude values of the $12^{th}$ and $5^{th}$ sub-block, after they have been sorted into rank order. The inventors have determined that calculating the average magnitude in sub-block blocks rather than individual coefficients has at least two advantages: firstly it explicitly takes advantage of the spatial averaging effect known to occur in visual masking and secondly, it reduces (to some extent) the effects of the translation variance of the DWT as image contents move between frames (the auto-regressive temporal filter is also designed to reduce this effect by stabilising the masking thresholds between frames).

There is however, one problem with this alternate masking distortion technique. M' is calculated independently on each code-block and so there are no constraints on how M' varies between adjacent code-blocks. So, in a still further alternative arrangement, step 1560 is used to smooth the mask between adjacent code blocks and then to store this adjusted result in main memory for use in the next frame. In this way the initial analysis results are modified, before storage for use in future frames. If If the masking value for the current code-block is denoted M, then the smoothing operation is done with an adaptive filter that smooths adjacent code-blocks (the 8 nearest neighbours, $M'_k$, where $0 < k \leq 8$) depending on the differences in their values:

$$M'_k = (1-\beta) \cdot M'_k + \beta \cdot M'$$

Where $$\beta = \max\left(0, \frac{M'_K - M'}{2A}\right). \tag{34}$$

The specific techniques outlined above are illustrative of the general technique of reducing ringing flicker. Clearly, in the spatial domain arrangement (FIG. 15), many other spatially averaging filters can be used, and it is not necessary to apply the filters to the full sized image frame. Rather, a sub-sampled version of the image could be used (eg. one of the intermediate or final DWT LL subbands). In the wavelet domain embodiment (FIG. 18), statistics other than the inter-quartile range of sub-blocks can be used to determine if the block has a large number of small and large coefficients that tends to be a signature of the presence of an edge in the block.

In either the DWT or spatial domain arrangements the distortion weighting factor, regarding ringing reduction, is preferably applied to the distortion for a whole code-block. In further arrangements, a distortion weighting factor can be applied on a sub-block or even a coefficient level. Thus, for example, a different weight can be applied to the $(C_{ij} - D_{ij})^2$ term in equation (3).

Preferably, the distortion adjustment step 1550 is applied to all code blocks of the current frame. Alternatively, the method 1500 may modify the distortion measures of a predetermined limited selection of code blocks of the current frame, while the distortion measures of the remaining code blocks are not modified. For example, the distortion modification step 1550 may be limited to the code blocks of the level 1 subband coefficients, while the distortion measures of the remaining code blocks are not modified. In another example, the distortion modification step 1550 is limited to the code blocks of the level 1, 2, and 3 subband coefficients.

6.0 Flicker Reduction Using Two-Bit Coefficient Smoothing

The second arrangement described above made use of a flicker book in smoothing the DWT coefficients of a current frame, where the flicker book relates to the significance states of coefficients in a specific bitplane of a previous frame. As mentioned above, such arrangements can also be used over a number of bitplanes. The fifth arrangement described below enables flicker reduction through coefficient smoothing, where two bits of a corresponding coefficient from a previous frame are used in smoothing a current coefficient.

6.1 Fifth Arrangement

The non-linear quantization process of Motion JPEG 2000 amplifies the sensor noise that is present in the original video sequence. It is desirable to stabilise this noise amplification. Smoothing techniques have been used in Motion JPEG 2000 wherein wavelet coefficients of a previous frame are used to smooth the wavelet coefficients of the current frame. However, the memory cost associated with coefficient storage can be significant.

The inventors have recognised that to avoid flicker artefacts, it is not necessary to store the entire wavelet coefficient of the previous frame. Instead, smoothing can be achieved using only two bits of a coefficient. Thus, if 32 bits were ordinarily to be used in storing the coefficients of a previous frame, then the 2-bit smoothing technique described below reduces the memory requirement to store an entire previous frame by a factor of 16.

The non-linear amplification of noise can be regarded as the propagation of noise within the bit patterns of a wavelet coefficient. The technique described below with reference to FIGS. 21-23 smooths the amplification that propagates through the bits of the wavelet coefficient of the current frame. Only two bits of the corresponding coefficient in the previous frame are required.

The inventors have found that under certain constraints applying the following formula to the current wavelet coefficients smooths the flicker:

$$|C^n| = |C^n| + (c_{L(n)}{}^n - c_{L(n)}{}^{n-1})*(2*|c_{L(n)-1}{}^n - c_{L(n)-1}{}^{n-1}| - 1)*2^{-L(n)} \tag{35}$$

where $|C^n|$ denotes the magnitude of the coefficient and $c_p \in \{0,1\}$.

As defined in equations (11) and (12), the values $c_p$ denote the $p^{th}$ binary digit of the fractional part of the coefficient. The index n refers to the current frame and (n−1) refers to the previous frame.

The truncation bitplane L(n) is a key parameter of equation (35), because it is used as a reference to smooth the coefficient. L(n) is the truncation bitplane in the current frame. However, the truncation bitplane may not be available until encoding of the code-block is complete. Consequently, the inventors instead make use of the truncation bitplane of the corresponding previous code-block, L(n−1). This heuristic modification is most appropriate when a truncation-point stabilisation technique is used, for example the first arrangement described in Section 2.1 above. Thus, using a truncation-point stabilisation technique improves the results of the fifth arrangement.

The modified version of equation 35 is:

$$|C^n| = |C^n| + (c_{L(n-1)}{}^n - c_{L(n-1)}{}^{n-1})*(2*|c_{L(n-1)-1}{}^n - c_{L(n-1)-1}{}^{n-1}| - 1)*2^{-L(n-1)}. \tag{36}$$

Figure 21:
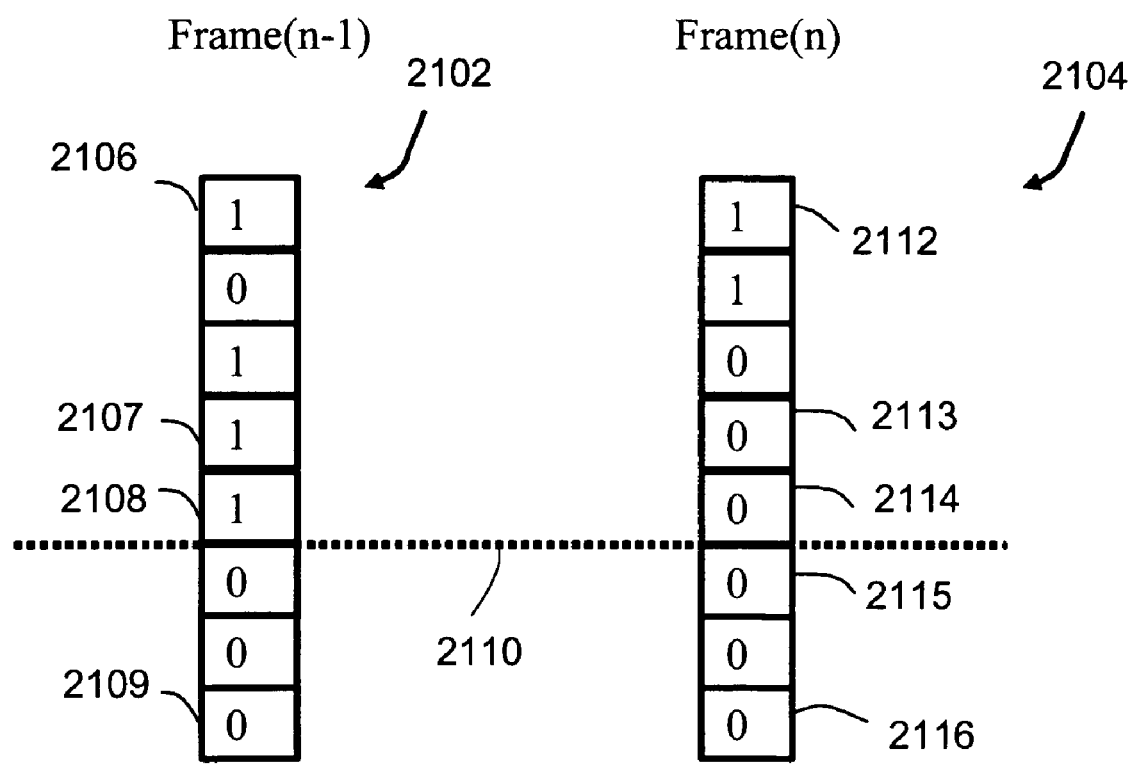
FIG. 21 is an example of two corresponding coefficients in successive frames.

FIG. 21 is a schematic diagram that illustrates the position of the binary digits used in the smoothing technique of the fifth arrangement. FIG. 21 shows a coefficient 2104 in the current frame n, and a corresponding coefficient 2102 in the previous frame, (n−1). For illustrative purposes, the two coefficients are shown as having 8 bits. The most significant bit of coefficient 2102 is bit 2106, and the least significant bit of coefficient 2102 is bit 2109. The indexing of the bits commences at the most significant bit and is incremented until the least significant bit is reached.

The line 2110 denotes the truncation bitplane L(n−1) of the coefficient in frame (n−1). In the example, the three least significant bits of coefficient 2102 are discarded.

Bit 2107 is $c_{L(n1)-1}^{n-1}$. Bit 2108 is $c_{L(n-1)}^{n-1}$. Bits 2107 and 2108 are the two least-significant bits of the truncated form of coefficient 2102.

In coefficient 2104 of the current frame n, bit 2113 is $c_{L(n-1)-1}^{n}$. Bit 2114 is $c_{L(n-1)}^{n}$. Bit 2115 is $c_{L(n-1)+1}^{n}$. Thus, if coefficient 2104 is truncated at bitplane L(n−1), then bit 2115 is the most significant discarded bit, and bits 2113 and 2114 are the two least-significant bits remaining in the truncated form of coefficient 2104.

The technique of the fifth arrangement makes no distinction between signal and noise. As a result, when a wavelet coefficient in the current frame n differs from the corresponding wavelet coefficient in the previous frame n−1, the current coefficient will be smoothed, even though the difference is genuinely present in the signal and is not a result of noise. However, the inventors have observed that the change to the magnitude of the wavelet coefficient is so small that it is not noticeable.

Figure 22:
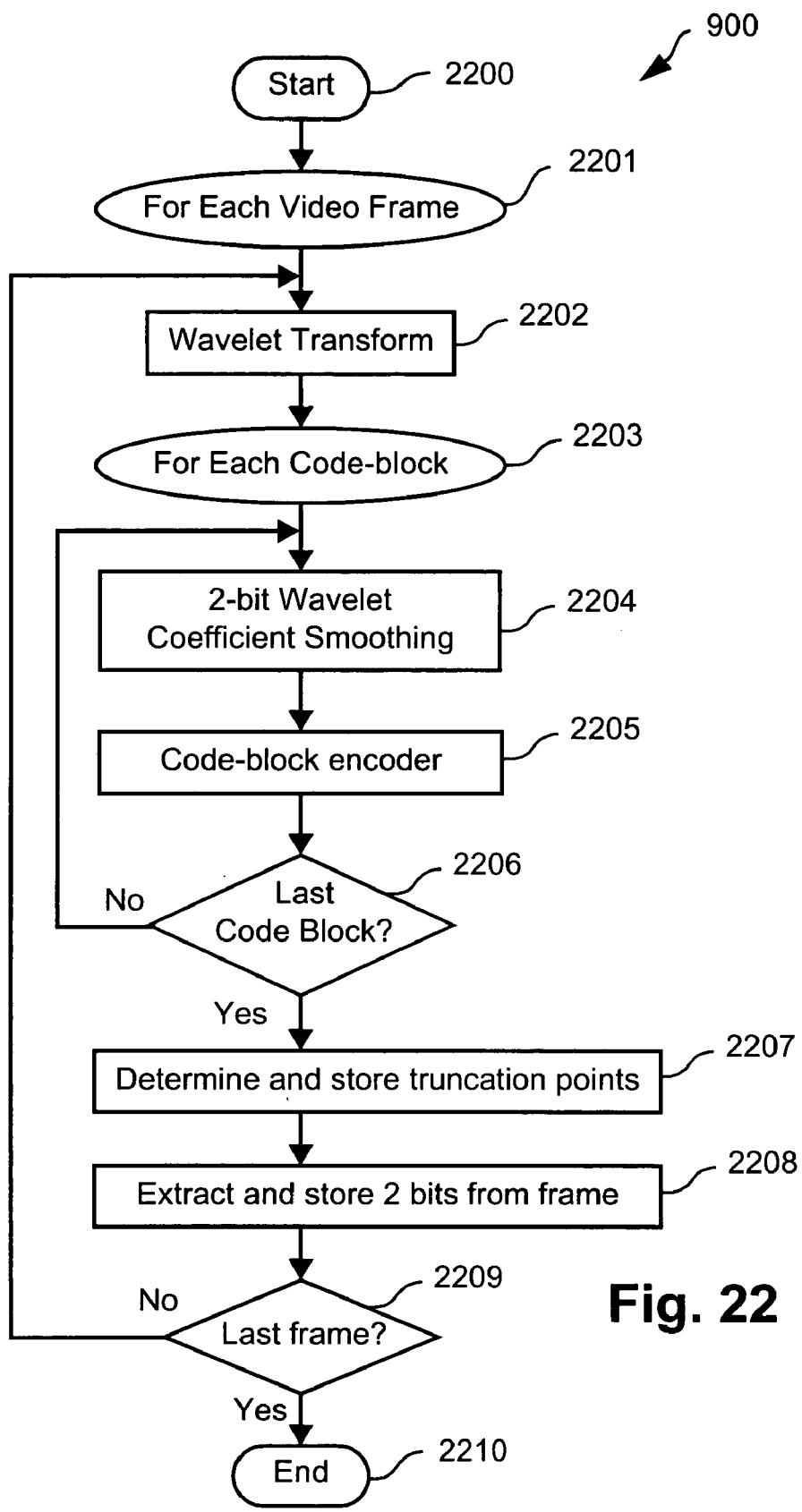
FIG. 22 shows a flow chart of a method of compressing a sequence of frames of a video into Motion JPEG2000 format according to a fifth arrangement using two-bit smoothing.

FIG. 22 shows a flow chart of a technique for flicker reduction of a Motion JPEG2000 video sequence using two bits per coefficient from the previous frame. The flicker smoothing is effected in steps 2204 and 2208 of the process. The remaining steps of FIG. 22 can be implemented using standard Motion JPEG2000 encoding techniques.

The method begins at step 2200, in which any necessary variables are initialised. Next, a loop 2201 commences for compressing one frame at a time in the video sequence. Once the loop 2201 has processed all the frames, the loop exits at step 2209 and processing terminates at step 2210.

Within the loop 2201, a discrete wavelet transform (DWT) is applied to the current frame in step 2202. Next, a loop 2203 is entered wherein each iteration encodes a code-block of the current frame.

In step 2204 the two-bit flicker-smoothing technique is applied to the wavelet coefficients in the current code-block. Step 2204 will be described in more detail with reference to FIG. 23.

Next, in step 2205, the arithmetic encoding of the current code-block is processed. Then, in step 2206, the processor checks whether the current code-block is the last code-block in the frame. If there are still code-blocks within the frame (the NO option of step 2206), process control returns to step 2204, in which the next code-block is processed. If the current block is the final block in the current frame (the YES option of step 2206) then process flow proceeds to step 2207.

In step 2207 the truncation depths of all the code-blocks are determined in order to fit the targeted bit-rate. A suitable technique for step 2207 is the PCRD-opt algorithm recommended by the JPEG2000 Standard and described above with reference to FIG. 19. Other bit-rate control techniques may be used to provide truncation point information. This truncation point information is a requirement for decoders compliant with the Motion JPEG 2000 Standard. The truncation points for the code-blocks of the current frame are stored in memory to be used for encoding the next frame.

In step 2208 the two bits $c_{L(n)}^{n}$ and $c_{L(n)-1}^{n}$ of each wavelet coefficient in the current frame are extracted. The two extracted bits for each coefficient are stored in memory for use in processing the following frame in the video sequence.

Next, in step 2209, the processor checks whether the current frame is the last frame in the video sequence. If there are frames remaining (the NO option of step 2209), process flow returns to step 2202, in which the DWT is applied to the next frame. If, however, the current frame is the final frame (the YES option of step 2209), then processing terminates in step 2210.

Figure 23:
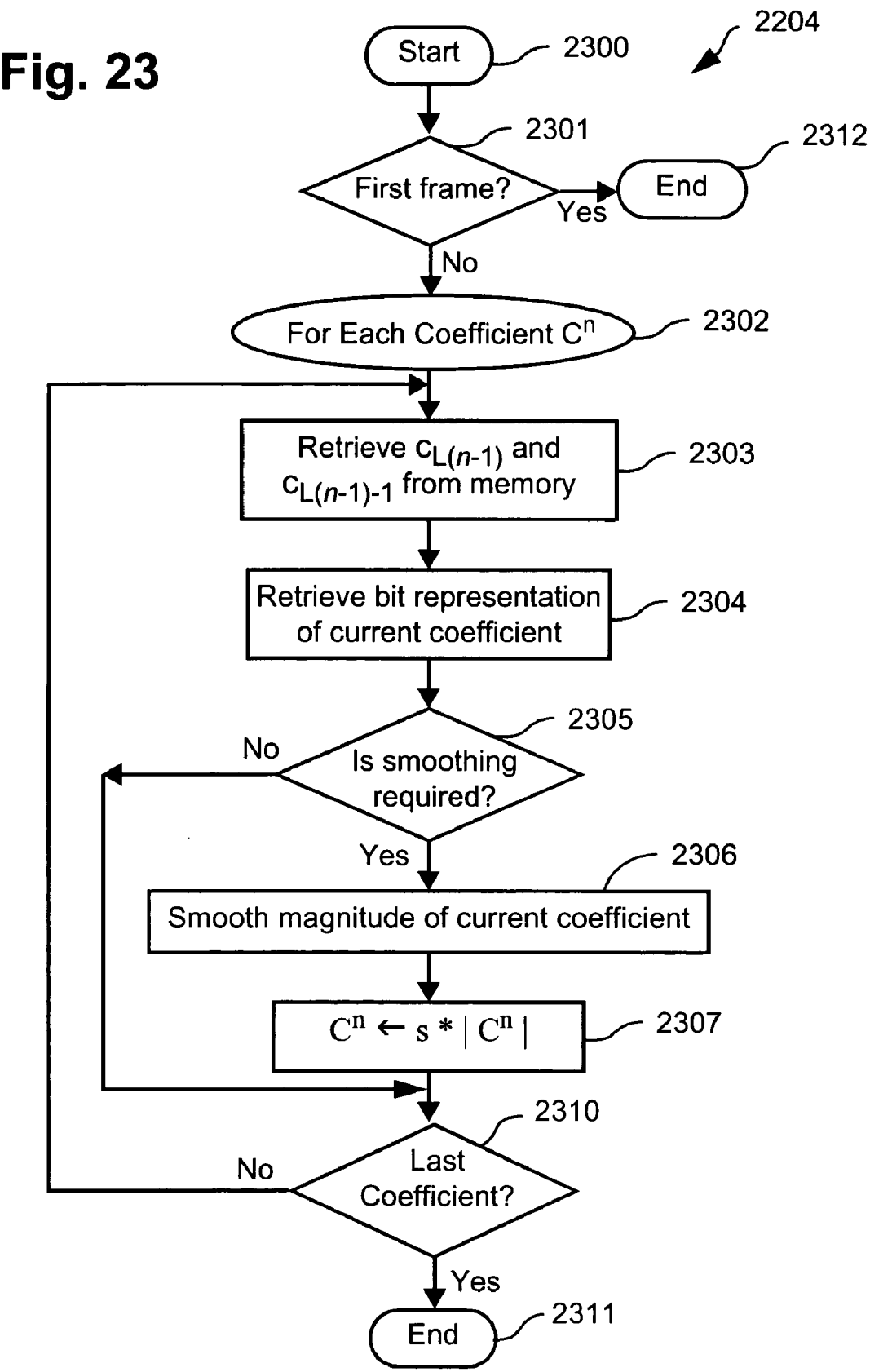
FIG. 23 shows a flow chart of the coefficient smoothing step 2204 for use in the method of FIG. 22 in accordance with the fifth arrangement.

FIG. 23 is a flow chart that shows in greater detail the two-bit wavelet coefficient smoothing of step 2204. The two-bit flicker-smoothing technique commences at step 2300. Next, step 2301 tests whether the current frame is the first frame in the sequence. The first frame cannot be smoothed by the two-bit smoothing technique as there is no available information relating to earlier frames. If the current frame is the first frame (the YES option of step 2301), control flow terminates in step 2312. The overall algorithm thereby bypasses the steps of the smoothing algorithm and continues with step 2205.

If the current frame is not the first frame in the sequence (the NO option of step 2301), then control flow proceeds to step 2302, entering a loop in which each coefficient within the current code-block is considered. As before, each wavelet coefficient may be described with an equation of the form of equation (11). Equation (12) describes the operation of quantizing a coefficient C by bit-plane truncation at bit-plane L.

In step 2303, the first step within loop 2302, two stored bits ($c_{L(n-1)}$ and $c_{L(n-1)-1}$) of the corresponding coefficient in frame (n−1) are retrieved from memory. In the illustrative example of FIG. 21, the two bits retrieved in step 2303 are bits 2107 and 2108, i.e. the two least-significant bits of the corresponding coefficient of the previous frame.

Step 2303 also retrieves the truncation point T of the corresponding code-block of frame (n−1). This previous truncation point T(n−1) was stored in memory as described in step 2208. The truncation bitplane L(n−1) may be obtained by applying the following equation:

$$L(n-1) = 2 + \text{floor}[(T(n-1)+2)/3], \quad (37)$$

where floor is an operator such that any real number is approximated by the lower nearest integer.

Next, in step 2304, the binary digits of the current coefficient $C^n$ are retrieved. Step 2305 then determines whether the current coefficient requires smoothing.

A suitable test for use in step 2305 is:

$$(Q[|C^n|, L(n-1)] > 0) \| (Q[|C^n|, L(n-1)] == 0 \,\&\&\, Q[|C^n|, L(n-1)+1] \,!0 \,\&\&\, c_{L(n-1)}^{n-1} == 1), \quad (38)$$

where the operator $\|$ is a logical OR; == is an operator that returns TRUE if both operands have the same value; && is a logical AND; and != (i.e. not equal to) is an operator that returns TRUE if the operands are different from one another.

The operand to the left of the logical OR examines the magnitude of the current coefficient, truncated at bitplane L(n−1). This corresponds to the summation:

$$Q[|C^n|, L(n-1)] = \sum_{p=1}^{L(n-1)} c_p 2^{-p} \quad (39)$$

If the summation of equation (39) is greater than zero, it implies that at least one binary digit of the current coefficient, truncated at bitplane L(n−1), is 1. In the illustrative example of FIG. 21, the expression on the left of the logical OR tests whether at least one of bits 2112-2114 is nonzero. If the expression of equation (39) is TRUE, it implies that the current coefficient is likely to be encoded into the bitstream, and accordingly it is appropriate to apply two bit smoothing to the current coefficient.

The expression to the right of the logical OR in equation (38) is TRUE when the current coefficient is unlikely to be coded when the truncation bitplane remains the same as that of the previous frame. However, the expression to the right of the logical OR identifies a particular constellation of bits that makes it desirable to apply the two-bit smoothing technique to the current coefficient.

The expression first checks whether the summation of equation (39) is equal to zero. This implies that, if the current coefficient is truncated at bitplane L(n–1), all the remaining binary digits of the current coefficient are zero. In the example of FIG. 21 this condition would be satisfied if all bits 2112-2114 are equal to zero. When this is the case, the current coefficient is unlikely to be coded.

The second term of the expression looks at the significance of the current coefficient when the next most significant bit is added to the truncated form of the current coefficient. In the example of FIG. 21, this additional bit considered is bit 2115. The second expression involves the summation:

$$Q[|C^n|, L(n-1)+1] = \sum_{p=1}^{L(n-1)+1} c_p 2^{-p} \quad (40)$$

With reference to FIG. 21, the particular constellation of bits identified by the expression on the right of the logical OR in equation (38) arises when bit 2108 is "1", bit 2115 is "1" and bits 2112-2114 are all "0".

If the current coefficient does not require smoothing (the NO option of step 2305), then control flow proceeds to step 2310, bypassing the smoothing steps 2306 and 2307. If, however, smoothing is required (the YES option of step 2305) the control flow proceeds to step 2306, in which the magnitude of the current coefficient is smoothed.

The smoothing of step 2306 is performed by application of equation (36). Alternatively, the following look-up table can be used for the smoothing step 2306:

TABLE 9

Look-up table for modifying current coefficient.

| $c_{L(n-1)}{}^n$ | $c_{L(n-1)-1}{}^n$ | $c_{L(n-1)-1}{}^{n-1}$ | Add to current coefficient at L (n – 1) truncation bitplane |
|---|---|---|---|
| 0 | 0 | 0 | +1 |
| 0 | 0 | 1 | –1 |
| 0 | 1 | 0 | –1 |
| 0 | 1 | 1 | +1 |
| 1 | 0 | 0 | –1 |
| 1 | 0 | 1 | +1 |
| 1 | 1 | 0 | +1 |
| 1 | 1 | 1 | –1 |

In Table 9, when the condition specified in the first three columns is satisfied, the quantity shown in the fourth column is added to the L(n–1) truncation bitplane of the current coefficient. Table 9 is only applied in cases where $c_{L(n-1)}{}^n$ and $c_{L(n-1)}{}^{n-1}$ are different. As may be seen from equation (36), when the bits at the truncation bit plane L(n–1) are the same in frames n and (n–1), the current coefficient is unchanged.

In the following step, 2307, the sign of the wavelet coefficient is restored.

Next, in step 2310 the processor checks whether the current coefficient is the last coefficient in the code-block. If there are still coefficients remaining in the code-block (the NO option step of 2310), process flow returns to step 2303 to process the next coefficient. If, however the current coefficient is the last coefficient of the code-block (the YES option of step 2310), then the two-bit wavelet coefficient smoothing terminates in step 2311 and the overall algorithm proceeds to step 2205 of FIG. 22.

Other conditions can be added to step 2305. For example, the following condition may be tested:

$$L(n-1)==L(n-2).$$

This condition is used to ensure that the truncation bitplane of the code-block has not changed from frame (n–2) to frame (n–1). This makes it more likely that the truncation bitplane has not changed from frame (n–1) to the current frame n. In order to use this condition, one could store the truncation points of each code-block of frame (n–2). Alternatively, one could store a flag that indicates whether the change took place.

Additionally, the conditions $Q[|C^n|, L(n-1)]==0$ and $$Q[|C^n|, L(n-1)] \neq \sum_{j=1}^{L} 2^{-j}$$

can be used in step 2305 to avoid some undesired artefacts.

The inventors have noticed that it is possible to further reduce the memory needed for storing the two bits of the current coefficient. In step 2208, only four kinds of two-bit words are stored: (0,0), (0,1), (1,0) and (1,1). In relevant applications, the inventors have observed that more than 80% of the two-bit words which are stored are (0,0). Consequently, by storing the (0,0) word using a single bit zero and by storing the other words as 101, 110 and 111 respectively, the memory needs can be further reduced to 1.4 bits per wavelet coefficient on average. It may be possible to further reduce this figure using other techniques.

The two-bit wavelet coefficient smoothing technique is preferably applied to all the components of a frame. Nevertheless, some experiments carried out by the inventors showed that, using the $YC_bC_r$ colour space, smoothing only the Y component was enough to significantly reduce the visual artefacts caused by flicker. Smoothing only the Y component could result in reducing the memory requirement to less than one bit per wavelet coefficient (for example, 0.95 bits per wavelet coefficient using the 4:2:0 $YC_bC_r$ colour space.

The two-bit wavelet coefficient smoothing technique is preferably applied to all the code-blocks of a component of a frame. However, it is possible to apply the smoothing technique only to levels 1, 2 and 3 of the DWT resolution level. This would further reduce the memory required to store the bits while significantly reducing the flicker artefacts.

In one implementation of the method, the truncation bitplane L used to truncate the coefficients may be selected as a function of sensor noise.

As outlined above, the modification of wavelet coefficients in the current frame N is based on two bits per wavelet coefficient from the previous frame (n–1). Note that in computing the correlation coefficient Md, the wavelet coefficients of the last frame (n–1) are also needed. The correlation coefficient is used to indicate changes between corresponding code-blocks due to motion. The correlation coefficient will still indicate changes to motion if it is computed with only two bits of precision per wavelet coefficient. Accordingly, the two bits which are used in filtering the current coefficient by the method of FIG. 23 are also sufficient to compute the correlation coefficient.

6.1.1 Two-Bit Flicker Reduction in a Decoder

The fifth arrangement described above relates to flicker reduction in an encoder, using two-bit coefficient smoothing. Analagous flicker artefacts arise in adjacent frames of a video sequence when the sequence is decoded from a compressed bitstream. The two-bit smoothing described in equations (35) and (36) can also be applied to corresponding coefficients in adjacent frames when decompressing a Motion JPEG2000 bitstream.

During the dequantization of a video frame the two least-significant bits of the DWT coefficients are stored for use in decoding subsequent frames. During the dequantization of a subsequent frame, the stored bits are retrieved and, if appropriate, used to smooth the DWT coefficients of the subsequent frame. After smoothing, the DWT coefficients are inverse transformed in accordance with the JPEG2000 standard.

7.0 Further Arrangements

Further arrangements are also possible to reduce flicker. For example, the first arrangement (truncation point stabilisation) and the third arrangement (DWT stabilisation) can be combined. Alternatively, the first arrangement (truncation point stabilisation) and the second arrangement (significance stabilisation) can also be combined, or the first arrangement (truncation point stabilisation) and the fourth arrangement (ringing reduction) can be combined. Moreover, the first arrangement and the fifth arrangement can be combined. Further combinations of the arrangements described herein may be readily applied.

8.0 Implementation

The aforementioned methods of encoding a sequence of video frames are preferably implemented in dedicated hardware such as one or more integrated circuits performing the functions or sub functions of methods. Such dedicated hardware may include graphic processors, digital signal processors, or one or more microprocessors and associated memories.

Figure 20:
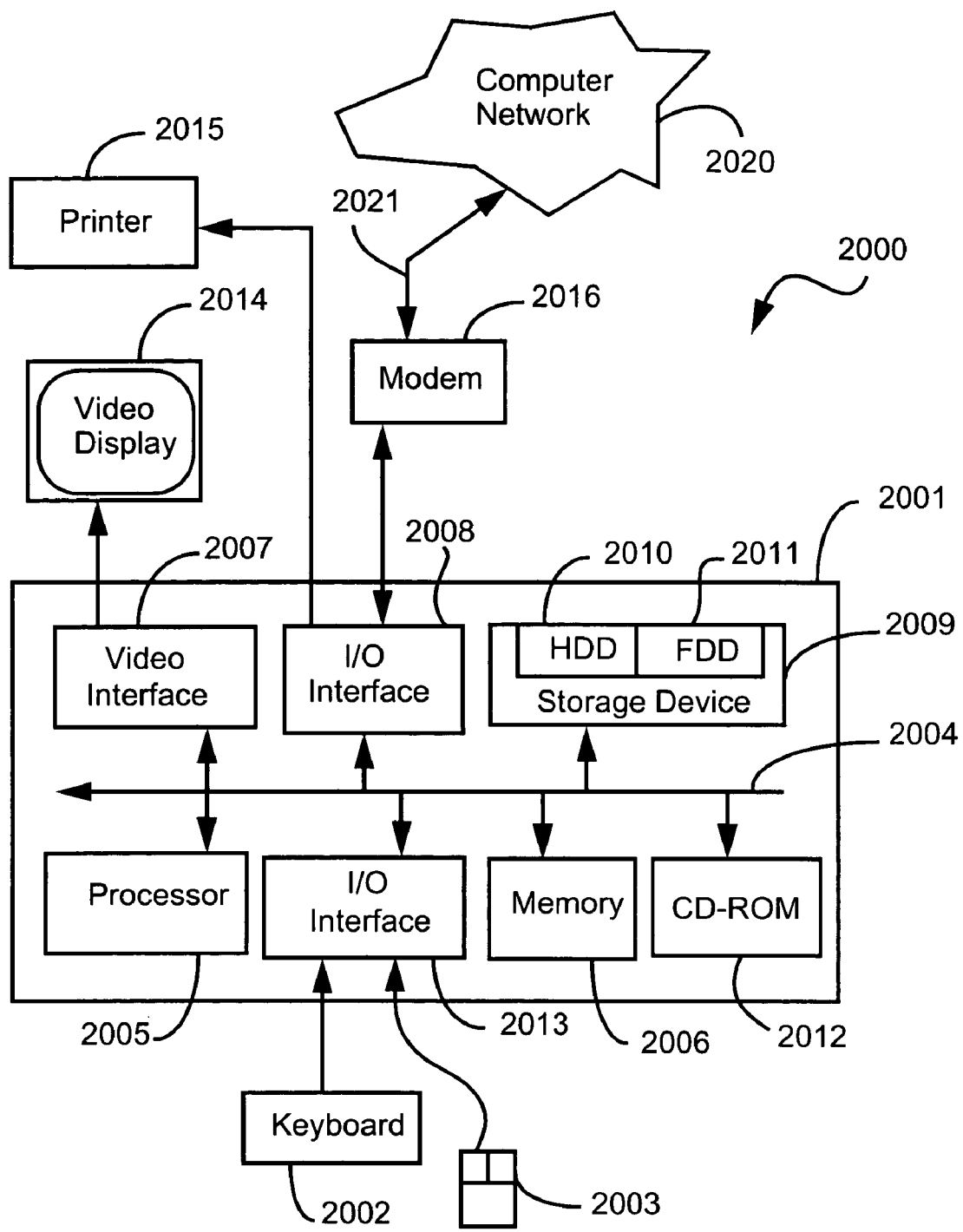
FIG. 20 is a schematic block diagram of a general-purpose computer upon which arrangements described can be practiced.

The aforementioned methods of encoding a sequence of video frames may also be practiced using a general-purpose computer system 2000, such as that shown in FIG. 20 wherein the processes of FIGS. 5, 6, 7, 8, 9, 10, 11, 12, 15, 16, 17, 18, 19, 22 and 23 may be implemented as software, such as an application program executing within the computer system 2000. In particular, the steps of the methods of 5, 7, 9, 15 or 23 are effected by instructions in the software that are carried out by the computer. The instructions may be formed as one or more code modules, each for performing one or more particular tasks. The software may also be divided into two separate parts, in which a first part performs the encoding methods and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for of encoding a sequence of video frames.

The computer system 2000 is formed by a computer module 2001, input devices such as a keyboard 2002 and mouse 2003, output devices including a printer 2015, a display device 2014 and loudspeakers 2017. A Modulator-Demodulator (Modem) transceiver device 2016 is used by the computer module 2001 for communicating to and from a communications network 2020, for example connectable via a telephone line 2021 or other functional medium. The modem 2016 can be used to obtain access to the Internet, and other network systems, such as a Local Area Network (LAN) or a Wide Area Network (WAN), and may be incorporated into the computer module 2001 in some implementations.

The computer module 2001 typically includes at least one processor unit 2005, and a memory unit 2006, for example formed from semiconductor random access memory (RAM) and read only memory (ROM). The module 2001 also includes an number of input/output (I/O) interfaces including an audio-video interface 2007 that couples to the video display 2014 and loudspeakers 2017, an I/O interface 2013 for the keyboard 2002 and mouse 2003 and optionally a joystick (not illustrated), and an interface 2008 for the modem 2016 and printer 2015. In some implementations, the modem 20116 may be incorporated within the computer module 2001, for example within the interface 2008. A storage device 2009 is provided and typically includes a hard disk drive 2010 and a floppy disk drive 2011. A magnetic tape drive (not illustrated) may also be used. A CD-ROM drive 2012 is typically provided as a non-volatile source of data. The components 2005 to 2013 of the computer module 2001, typically communicate via an interconnected bus 2004 and in a manner, which results in a conventional mode of operation of the computer system 2000 known to those in the relevant art. Examples of computers on which the described arrangements can be practiced include IBM-PCs and compatibles, Sun Sparcstations or alike computer systems evolved therefrom.

Typically, the application program is resident on the hard disk drive 2010 and read and controlled in its execution by the processor 2005. Intermediate storage of the program and any data fetched from the network 2020 may be accomplished using the semiconductor memory 2006, possibly in concert with the hard disk drive 2010. In some instances, the application program may be supplied to the user encoded on a CD-ROM or floppy disk and read via the corresponding drive 2012 or 2011, or alternatively may be read by the user from the network 2020 via the modem device 2016. Still further, the software can also be loaded into the computer system 2000 from other computer readable media. The term "computer readable medium" as used herein refers to any storage or transmission medium that participates in providing instructions and/or data to the computer system 2000 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 2001. Examples of transmission media include radio or infra-red transmission channels as well as a network connection to another computer or networked device, and the Internet or Intranets including e-mail transmissions and information recorded on Websites and the like.

9.0 INDUSTRIAL APPLICABILITY

It is apparent from the above that the arrangements described are applicable to the video and computer industries.

The foregoing describes only some embodiments of the present invention, and modifications and/or changes can be made thereto without departing from the scope and spirit of the invention, the embodiments being illustrative and not restrictive. For example, the methods have been described in the context of applying a discrete wavelet transform (DWT) to input images. However, the methods described herein can also be used when different transforms, such as the discrete cosine transform (DCT), are applied to the input images.

In the context of this specification, the word "comprising" means "including principally but not necessarily solely" or "having" or "including", and not "consisting only of". Variations of the word "comprising", such as "comprise" and "comprises" have correspondingly varied meanings.

I claim:

1. A method of compressing a current image of a sequence of images, the method comprising the steps of:
   (a) transforming the current image with a predetermined transform to provide a set of transform coefficients:
   (b) retrieving, for at least one transform coefficient of the current image, two bits only of a corresponding transform coefficient of a previously compressed image of the sequence, wherein the corresponding transform coefficient is truncated at a truncation bitplane and the retrieved bits comprise the least significant bit of the truncated corresponding transform coefficient;
   (c) setting the at least one transform coefficient of the current image to a new value that is a function of the retrieved bits;
   (d) storing the two bits of the at least one transform coefficient for use in compressing one or more subsequent images of the sequence; and
   (e) coding the transform coefficients of the current image to provide a compressed bitstream of the current image.

2. A method according to claim 1, wherein said setting step is only performed if a predetermined criterion is satisfied, the predetermined criterion depending on the truncation bitplane of the corresponding transform coefficient of the previous image.

3. A method according to claim 2, wherein the predetermined criterion is:

$$(Q[|C^n|,L(n-1)]==0 \&\& Q[|C^n|,L(n-1)+1]!= 0 \&\& c_{L(n-1)}^{n-1}==1) || Q[|C^n|,L(n-1)]>0,$$

where $C^n$ is the transform coefficient of the current image n, $L(n-1)$ is the truncation bitplane of the previous image $(n-1)$, and $c_{L(n-1)}^{n-1}$ is the least significant bit of the retrieved bits.

4. A method according to claim 3, wherein the predetermined criterion further comprises one or more conditions selected from the set comprising:

$$Q[|C^n|,L(n-1)]==0;$$

and $$Q[|C^n|, L(n-1)] \neq \sum_{j=1}^{L} 2^{-j};$$

and $$L(n-1)==L(n-2).$$

5. A method according to claim 1, wherein the new value of the at least one transform coefficient is set by:

$$|C^n|=|C^n|+(c_{L(n-1)}^{n}-c_{L(n-1)}^{n-1})*(2*|c_{L(n-1)-1}^{n}-c_{L(n-1)-1}^{n-1}|-1)*2^{-L(n-1)}.$$

6. A method according to claim 1, wherein the predetermined transform is a discrete wavelet transform (DWT).

7. A method according to claim 1, wherein each image of the sequence is compressed substantially at the same predetermined rate.

8. A method according to claim 1, wherein the compressed bitstream is substantially conformant with Motion JPEG 2000.

9. A method according to claim 6, wherein the at least one transform coefficient is a member of a subset of transform coefficients, wherein the subset is selected from the group comprising:
   (i) all transform coefficients of the current image;
   (ii) all transform coefficients of predetermined Motion JPEG 2000 code blocks;
   (iii) all transform coefficients in the level 1 subband; and
   (iv) all transform coefficients in the level 1, 2, and 3 subbands.

10. A method according to claim 1, wherein, said storing step includes storing the bits of the transform coefficients of the current image in a compressed form.

11. A method according to claim 1, wherein the truncation bitplane is a function of sensor noise.

12. A method according to claim 1, wherein each image of the sequence is decompressible independently of the other images.

13. A method of compressing a current image of a sequence of images, the method comprising the steps of:
   (a) transforming the current image with a predetermined transform to provide a set of transform coefficients:
   (b) retrieving, for at least one transform coefficient of the current image, only one bit of a corresponding transform coefficient of a previously compressed image of the sequence, wherein the corresponding transform coefficient is truncated at a truncation bitplane and the retrieved bit comprises the least significant bit of the truncated corresponding transform coefficient;
   (c) setting the at least one transform coefficient of the current image to a new value that is a function of the retrieved bit;
   (d) storing the bit of the at least one transform coefficient for use in compressing one or more subsequent images of the sequence; and
   (e) coding the transform coefficients of the current image to provide a compressed bitstream of the current image.

14. A method according to claim 13, wherein said setting step comprises setting bit $L(n-1)$ of the at least one transform coefficient of the current image to the value of the retrieved bit if $$2^{L(n-1)}<=|C|<2^{(L(n-1)+1)}$$

and the retrieved bit is zero, where $L(n-1)$ is the truncation bitplane of the previously compressed image and C is the at least one transform coefficient.

15. A method according to claim 14, wherein a significance of each coefficient is stored for bitplane L between the coding of each frame in the sequence and is used to determine if $|P|<2^L$.

16. A method according to claim 15, wherein the significances are compressed before storage.

17. A method according to claim 1, wherein the set of transform coefficients is arranged in a set of blocks and the method further comprises the steps of:
  determining truncation points of the blocks in the compressed bitstream of the current image, wherein a truncation point of at least one of the blocks of the current image is selected according to the current image and a truncation point selected for a corresponding block of one or more previous images; and
  truncating the compressed bitstream of the current image at the determined truncation points to provide a further compressed representation of the current image.

18. A method according to claim 17, wherein associated with each block of the current image is a set of rate and distortion points, and wherein said step of determining truncation points comprises the sub-step of:
  determining the truncation points of the blocks of the current image that minimize a function of the distortion points while a function of the rate points satisfies a rate constraint.

19. A method according to claim 18, wherein said step of determining truncation points further comprises the sub-step of:
  weighting, for each block of the current image, a distortion value corresponding to the truncation point of the corresponding block in a previous image.

20. A method according to claim 18, wherein step of determining truncation points further comprises the sub-step of:
  weighting, for each block of the current image, a rate value corresponding to the truncation point of the corresponding block in a previous image.

21. A method according to claim 1, wherein the method further comprises the step of determining regions of a current image with respect to a previous image that represent smooth areas near moving edges,
  and said coding step includes encoding the transform coefficients representative of the determined regions of the current image to greater accuracy than the remaining transform coefficients.

22. A method according to claim 21, wherein said determining step of determining regions of the current image representing smooth areas near moving edges is performed in the spatial domain.

23. A method according to claim 22, wherein said determining step comprises the following sub-steps:
  a first filtering sub-step for filtering a moving edge map of corresponding blocks of the current and previous images, wherein the first filtering sub-step is of a large spatial extent;
  a second filtering sub-step for filtering a moving edge map of corresponding blocks of the current and previous images, wherein the second filtering sub-step is of a small spatial extent; and
  a determination step for determining a ratio of the first filtered moving edge map and the second filtered moving edge map.

24. A method according to claim 21, wherein the predetermined transform is a discrete wavelet transform (DWT) and said determining step of determining regions of the current image representative of smooth areas near moving edges is performed in the wavelet domain.

25. A method according to claim 24, wherein said determining step comprises the sub-step of generating a plurality of masks for respective blocks of the DWT coefficients of the current image for excluding predominantly similar DWT coefficients in a block from the bitstream.

26. A method according to claim 17, further comprising the step of determining regions of a current image with respect to a previous image that represent smooth areas near moving edges,
  wherein said coding step includes encoding the transform coefficients representative of the determined regions of the current image to greater accuracy than the remaining transform coefficients.

27. A method of decompressing a compressed bitstream representative of a sequence of images, comprising the steps of:
  decoding the compressed bitstream to provide transform coefficients of a current image in the sequence;
  retrieving, for at least one transform coefficient of the current image, only one bit of a corresponding transform coefficient of a previously decompressed image in the sequence;
  setting the at least one transform coefficient of the current image to a new value that is a function of the retrieved bit; and
  inverse transforming the current image with a predetermined inverse transform.

28. A method of decompressing a compressed bitstream representative of a sequence of images, comprising the steps of:
  decoding the compressed bitstream to provide transform coefficients of a current image in the sequence;
  retrieving, for at least one transform coefficient of the current image, two bits of a corresponding transform coefficient of a previously decompressed image in the sequence;
  setting the at least one transform coefficient of the current image to a new value that is a function of the retrieved bits; and
  inverse transforming the current image with a predetermined inverse transform.

29. An apparatus for compressing a current image of a sequence of images, comprising:
  (a) means adapted to transform the current image with a predetermined transform to provide a set of transform coefficients;
  (b) means adapted to retrieve, for at least one transform coefficient of the current image, two bits only of a corresponding transform coefficient of a previously compressed image of the sequence, wherein the corresponding transform coefficient is truncated at a truncation bitplane and the retrieved bits comprise the least significant bit of the truncated corresponding transform coefficient;
  (c) means adapted to set the at least one transform coefficient of the current image to a new value that is a function of the retrieved bits;
  (d) means adapted to store the two bits of the at least one transform coefficient for use in compressing one or more subsequent images of the sequence; and
  (e) means adapted to code the transform coefficients of the current image to provide a compressed bitstream of the current image.

30. A computer program product comprising machine-readable program code recorded on a machine-readable recording medium, for controlling the operation of a data processing apparatus on which the program code executes to perform a method of compressing a current image of a sequence of images, the method comprising the steps of:
  (a) transforming the current image with a predetermined transform to provide a set of transform coefficients;

(b) retrieving, for at least one transform coefficient of the current image, two bits only of a corresponding transform coefficient of a previously compressed image of the sequence, wherein the corresponding transform coefficient is truncated at a truncation bitplane and the retrieved bits comprise the least significant bit of the truncated corresponding transform coefficient;

(c) setting the at least one transform coefficient of the current image to a new value that is a function of the retrieved bits;

(d) storing the two bits of the at least one transform coefficient for use in compressing one or more subsequent images of the sequence; and (e) coding the transform coefficients of the current image to provide a compressed bitstream of the current image.

31. A computer-readable medium storing a computer program which, when executed, performs a method for compressing at least one image according to any one of claims 1 to 26.

* * * * *

UNITED STATES PATENT AND TRADEMARK OFFICE
CERTIFICATE OF CORRECTION

| | | |
|---|---|---|
| PATENT NO. | : 7,308,146 B2 | |
| APPLICATION NO. | : 10/673862 | |
| DATED | : December 11, 2007 | |
| INVENTOR(S) | : Axel Becker et al. | |

It is certified that error appears in the above-identified patent and that said Letters Patent is hereby corrected as shown below:

ON THE TITLE PAGE [56] REFERENCES CITED:

Other Publications, "Tubman, "High performance Scalable Image Compression with EBCOT" Proceedings of the 1999 International Confrence on Image processing vol. 3 p. 344-348, 1999.*" (sic) should be deleted (duplicate).

Figure 6:
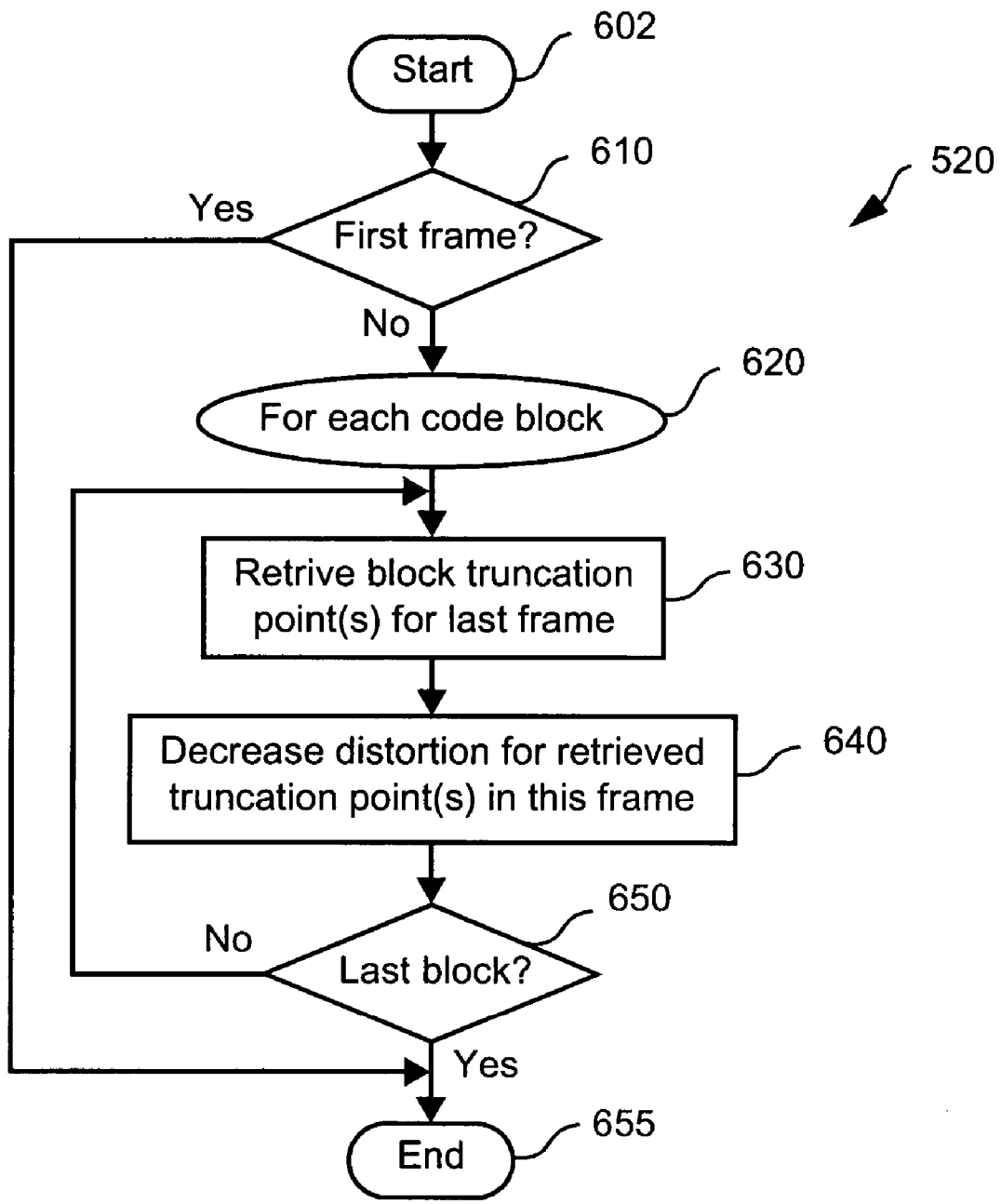
FIG. 6 shows a flow chart of the rate distortion modification process 520 for use in the method of FIG. 5 according to the first arrangement.

IN THE DRAWING SHEET 4:

Figure 6, "Retrive" should read --Retrieve--.

COLUMN 3:

Line 66, "According" should read --¶ According--.

COLUMN 5:

Line 5, "illustrates" should read --illustrate--; and
Line 9, "illustrates" should read --illustrate--.

COLUMN 9:

Line 10, "$\geq \lambda_{M+} 1^{n}$" should read --$\geq \lambda_{N+1}^{n}$--;

Line 51, "$\lambda_{i_n+1}^{n} \leq \lambda \leq \lambda_{i_n}^{n}$." should read --$\lambda_{i_n+1}^{n} \leq \lambda \leq \lambda_{i_n}^{n}$.--;

Line 54, "$r_{i_n}^{n}$" should read --$r_{i_n}^{n}$--; and

Line 65, "$\{R(\lambda)$" should read --$\{R(\lambda)\}$--.

COLUMN 10:

Line 7, "$\lambda_{i_n}^{n} (or\ \lambda_{i_n+1}^{n})$" should read --$\lambda_{i_n}^{n} (or\ \lambda_{i_n+1}^{n})$--;

Line 8, "$\lambda_{i_n}^{n}$." should read --$\lambda_{i_n}^{n}$.--; and

Line 17, "other is" should read --other--.

UNITED STATES PATENT AND TRADEMARK OFFICE
CERTIFICATE OF CORRECTION

PATENT NO. : 7,308,146 B2
APPLICATION NO. : 10/673862
DATED : December 11, 2007
INVENTOR(S) : Axel Becker et al.

It is certified that error appears in the above-identified patent and that said Letters Patent is hereby corrected as shown below:

COLUMN 12:

Line 48, "JPEG 2000" should read --JPEG2000--.

COLUMN 14:

Line 46, "$d_{j_n}{}^n$" should read --$d_{j_n}^n$--; and

Line 49, "$d_{j_n}{}^n := \alpha d_{j_n}{}^n .$" should read --$d_{j_n}^n := \alpha d_{j_n}^n .$--.

COLUMN 15:

Line 32, "$\delta_j{}^n = \delta_{j-1}{}^n - \delta_j{}^n ,$" should read --$\delta_j^n = \delta_{j-1}^n - \delta_j^n ,$--;

Line 35, "$d_0{}^n = 0 .$" should read --$d_0^n = 0 .$--;

Line 36, "$d_{j_n}{}^n$" should read --$d_{j_n}^n$--; and

Line 37, "$\delta_{j_n}{}^n := c\delta_{j_n}{}^n ,$" should read --$\delta_{j_n}^n : c\delta_{j_n}^n ,$--.

COLUMN 24:

Line 9, "initialised," should be --initialised.--.

COLUMN 28:

Line 15, "illustrates" should read --illustrate--;
Line 19, "shows" should read --show--; and
Line 36, "B, and C" should read --14B, and 14C--.

COLUMN 29:

Line 35, "a" should read --an--.

UNITED STATES PATENT AND TRADEMARK OFFICE
CERTIFICATE OF CORRECTION

PATENT NO. : 7,308,146 B2
APPLICATION NO. : 10/673862
DATED : December 11, 2007
INVENTOR(S) : Axel Becker et al.

It is certified that error appears in the above-identified patent and that said Letters Patent is hereby corrected as shown below:

COLUMN 33:

Line 12, "a" should read --an--; and
Line 44, "$D'_b = D_b M_b$ ,." should read --$D'_b = D_b M_b$ .--.

COLUMN 34:

Line 21, "$M_b = B - \min\left[B, f\left(\frac{DevA_s}{s}\right)\right]$" should read --$M_b = B - \min\left[B, f\left(\frac{Dev\,A_s}{s}\right)\right]$--;

Line 30, "therefore are" should read --therefore--; and
Line 37, "$M'_b = \alpha \cdot M_b + (1 - \alpha) \cdot M'_{(prev)}$" should read
--$M_b' = \alpha \cdot M_b + (1 - \alpha) \cdot M'_{(prev)}$--.

COLUMN 35:

Line 17, "If If" should read --If--; and
Line 22, "$M'_k = (1-\beta) \cdot M'_k + \beta \cdot M'$" should read
--$M_k' = (1-\beta) \cdot M_k' + \beta \cdot M'$--.

COLUMN 36:

Line 7, "JPEG" should read --JPEG2000--;
Line 8, "2000" should be deleted; and
Line 11, "JPEG 2000" should read --JPEG2000--.

COLUMN 37:

Line 4, "$C_{L(n1)-1}{}^{n-1}$." should read --$C_{L(n-1)-1}{}^{n-1}$.--; and
Line 57, "JPEG 2000" should read --JPEG2000--.

UNITED STATES PATENT AND TRADEMARK OFFICE
CERTIFICATE OF CORRECTION

PATENT NO. : 7,308,146 B2  Page 4 of 4
APPLICATION NO. : 10/673862
DATED : December 11, 2007
INVENTOR(S) : Axel Becker et al.

It is certified that error appears in the above-identified patent and that said Letters Patent is hereby corrected as shown below:

COLUMN 41:

Line 66, "of" should be deleted.

COLUMN 42:

Line 20, "an" should read --a--; and
    Line 26, "20116" should read --2016--.

COLUMN 43:

Line 20, "I claim:" should read --We claim:--.

COLUMN 44:

Line 13, "JPEG 2000." should read --JPEG2000.--;
    Line 20, "JPEG 2000" should read --JPEG2000--; and
    Line 36, "coefficients:" should read --coefficients;--.

COLUMN 45:

Line 27, "wherein" should read --wherein said--.

Signed and Sealed this

Second Day of September, 2008

JON W. DUDAS
*Director of the United States Patent and Trademark Office*